(12) United States Patent
Ben Khaled et al.

(10) Patent No.: US 12,454,697 B2
(45) Date of Patent: Oct. 28, 2025

(54) METHOD OF MODULATING THE ALKALOID CONTENT OF A PLANT

(71) Applicant: BRITISH AMERICAN TOBACCO (INVESTMENTS) LIMITED, London (GB)

(72) Inventors: Sara Ben Khaled, London (GB); Francisco Anastacio De Abreu E Lima, London (GB)

(73) Assignee: BRITISH AMERICAN TOBACCO (INVESTMENTS) LIMITED, London (GB)

(*) Notice: Subject to any disclaimer, the term of this patent is extended or adjusted under 35 U.S.C. 154(b) by 93 days.

(21) Appl. No.: 17/309,153

(22) PCT Filed: Oct. 31, 2019

(86) PCT No.: PCT/GB2019/053101
§ 371 (c)(1),
(2) Date: Apr. 30, 2021

(87) PCT Pub. No.: WO2020/089645
PCT Pub. Date: May 7, 2020

(65) Prior Publication Data
US 2022/0002743 A1    Jan. 6, 2022

(30) Foreign Application Priority Data
Nov. 2, 2018    (GB) ..................... 1817971

(51) Int. Cl.
*C12N 15/82*     (2006.01)
*A01H 6/82*      (2018.01)
*A24B 15/16*     (2020.01)
*C07K 14/41*     (2006.01)
*C07K 14/415*    (2006.01)

(52) U.S. Cl.
CPC ......... *C12N 15/8243* (2013.01); *A01H 6/823* (2018.05); *A24B 15/16* (2013.01); *C07K 14/415* (2013.01); *C12Y 207/11001* (2013.01)

(58) Field of Classification Search
CPC .. C12N 15/8243; A24B 15/16; C07K 14/415; A01H 6/823
See application file for complete search history.

(56) References Cited

U.S. PATENT DOCUMENTS

| | | |
|---|---|---|
| 8,106,174 B2 | 1/2012 | Kovalic et al. |
| 2003/0041345 A1 | 2/2003 | Schmulling et al. |
| 2003/0135888 A1 | 7/2003 | Zhu et al. |
| 2008/0292735 A1 | 11/2008 | Hashimoto et al. |
| 2010/0281574 A1 | 11/2010 | Zheng et al. |
| 2010/0293665 A1 | 11/2010 | Puzio et al. |
| 2014/0099666 A1 | 4/2014 | Rossomando et al. |
| 2015/0152432 A1 | 6/2015 | Schon et al. |
| 2016/0010103 A1 | 1/2016 | Kudithipudi et al. |
| 2016/0374387 A1 | 12/2016 | Adams et al. |
| 2018/0155734 A1 | 6/2018 | Guo et al. |
| 2018/0237847 A1 | 8/2018 | Culler et al. |
| 2019/0194269 A1 | 6/2019 | Facchini et al. |
| 2019/0203218 A1 | 7/2019 | Drake Stowe et al. |

FOREIGN PATENT DOCUMENTS

| | | |
|---|---|---|
| EP | 2090662 A3 | 10/2012 |
| JP | 2007003905 A | 1/2007 |
| JP | 2017052931 A | 3/2017 |
| WO | 2016124932 A1 | 8/2016 |
| WO | 2018045140 A1 | 3/2018 |

OTHER PUBLICATIONS

Miller, R.D., 1991, Registration of 'TN90' burley tobacco. Crop Sci. 31: 852. (Year: 1991).*
Variant Definition & Meaning—Merriam-Webster, accessed, Jun. 7, 2023 (Year: 2023).*
Guo et al., 2004, Protein tolerance to random amino acid change. Proceedings of the National Academy of Sciences, 101(25), 9205-9210. (Year: 2014).*
Jin et al. 2003, Function of a mitogen-activated protein kinase pathway in N gene-mediated resistance in tobacco. The Plant Journal, 33(4), 719-731. (Year: 2003).*
Sierro et al., 2014, The tobacco genome sequence and its comparison with those of tomato and potato. Nature communications, 5(1), 3833. (Year: 2014).*
De Boer et al., 2011, APETALA2/ETHYLENE Response Factor and basic helix-loop-helix tobacco transcription factors cooperatively mediate jasmonate-elicited nicotine biosynthesis. The Plant Journal, 66(6), 1053-1065. (Year: 2011).*
Xu et al., 2008, Activation of MAPK kinase 9 induces ethylene and camalexin biosynthesis and enhances sensitivity to salt stress in Arabidopsis. Journal of Biological Chemistry, 283(40), 26996-27006 (Year: 2008).*
Paul et al., 2017, A differentially regulated AP 2/ERF transcription factor gene cluster acts downstream of a MAP kinase cascade to modulate terpenoid indole alkaloid biosynthesis in Catharanthus roseus. New Phytologist, 213(3), 1107-1123. (Year: 2017).*
Predicted: serine/threonine-protein kinase STY46-like isoform X1 [Nicotiana tabacum] (Year: 2016).*

(Continued)

*Primary Examiner* — Amjad Abraham
*Assistant Examiner* — Santosh Sharma
(74) *Attorney, Agent, or Firm* — McKee, Voorhees & Sease, PLC

(57) ABSTRACT

The present invention provides a method for modulating the alkaloid content of a plant (e.g. a tobacco plant), the method comprising modifying said plant by modulating the activity or expression of at least one protein kinase. The present invention also provides for the use of at least protein kinase gene for modulating the alkaloid content of a plant, as well as tobacco cells, plants, plant propagation materials, harvested leaves, processed tobaccos, or tobacco products obtainable in accordance with the invention.

21 Claims, 6 Drawing Sheets
Specification includes a Sequence Listing.

(56) References Cited

OTHER PUBLICATIONS

Baldwin et al., 1989, Mechanism of damage-induced alkaloid production in wild tobacco. Journal of Chemical Ecology, 15, 1661-1680. (Year: 1989).*
Dong et al., 2020, A cytosolic protein kinase STY46 in Arabidopsis thaliana is involved in plant growth and abiotic stress response. Plants, 9(1), 57. (Year: 2020).*
Sierro et al., 2014, The tobacco genome sequence and its comparison with those of tomato and potato, Supplementary Information. Nature communications, 5(1), 3833. (Year: 2014).*
Burner et al., 2022, Analyses of diverse low alkaloid tobacco germplasm identify naturally occurring nucleotide variability contributing to reduced leaf nicotine accumulation. Molecular Breeding, 42(1), 4. (Year: 2022).*
Xing et al., 2009, Recovery and purification of nicotine from waste tobacco by aqueous two-phase system/reverse extraction. Natural Product Communications, 4(8), 1934578X0900400815; (Year: 2009).*
Lyu et al., 2021, Reprogramming plant specialized metabolism by manipulating protein kinases. Abiotech, 2(3), 226-239 (Year: 2021).*
Digard et al., 2012, Determination of nicotine absorption from multiple tobacco products and nicotine gum. Nicotine & Tobacco Research, 15(1), 255-261. (Year: 2012).*
Rushton et al., "Tobacco Transcription Factors: Novel Insights into Transcriptional Regulation in the Solanaceae 1[C][W][OA]", Plant Physiology, vol. 147, pp. 280-295, May 2008.
Saitoh et al., "The Alkaloid Contents of Sixty Nicotiana Species", Phytochemistry, vol. 24, No. 3, pp. 477-480, 1985.
Voelckel et al., "Anti-sense expression of putrescine N-methyltransferase confirms defensive role of nicotine in Nicotiana sylvestris against Manduca sexta", Chemoecology, vol. 11, pp. 121-126, 2001.
European Patent Office, "Written Opinion of the International Searching Authority" based on PCT/GB2019/053101, filed Oct. 31, 2019, 6 pages, mailed Feb. 3, 2020.
ELIXIR database submission of A0A1S4BUI4_TOBAC, "Serine/threonine-protein kinase STY46-like isoform X1", accession No. A0A1S4BUI4, integrated into UniProtKB/TrEMBL on Apr. 12, 2017.
Office Action in P00202103175, mailed Aug. 18, 2022, 4 pages.
Zhao et al., "Research Progress of Plant Protein Kinase Mediated Abiotic Stress and Hormone Signal Transduction Pathway," Journal of Plant Genetic Resources, Feb. 22, 2017, vol. 18, No. 2, pp. 358-366.

* cited by examiner

FIGURE 3A

Nitab4.5_0003679g0060.2 Genomic sequence: SEQ ID NO: 1

```
ATTCATCACCTAAATTTTGCCAAAGCTAAGAATATTAAGCAAAGCAAAAAAAAAGGGGAATGTAATTAGCAC
GCAAAAAAAGCAGATCGAAGATAAGCAGATCCACGTCAACTTGACTGTGCCAATTAAAATCCCACCTTTACCC
CGAGTCAAAAAAGGGTTATACAATACATACATACATGATTCATTTCATGTACCCACCCCCCCCACACACAGAGA
GAGGGAAAAACGATATGACCAATGGGAATGAAACCTTCCTCAAAACCACTCCCCCCACCGCCATTTGTTTCTTA
ATAATTCTTCTCAGTTTTCTTTCACAAATTAAACATGCATCTTTGATATAAAGTAGAATTTGAATTCTGTAATTTT
CCATCTCCATAACGAAGATTCACTTTACGTAAACTGCACCGCGGCCATTATTTTTCATTCCGGAGGAATTTAAG
ACTAGTGAGAGAGGTGAAATGGCGATAGAGGATAACGAGAGTTGTGGGAGTAGAGTGGTGGATTCGGCGA
CTACCAGTGGTCGTCATCAGAGAAAAAAATTGGAGGTCTACAATGAGGTTTTACGGAGGCTTAAGGAATCAA
ACAACGTCGAGGCTTTAGAACCTGGATTTGACGATGAACTTTGGGCTCACTTCAATCGTCTACCTACTCGGTAA
CTTTACCTTTCTACCTCTCTCTATGTATTAATCCGTACAATTATATACGTTTATGCGGTTTTCTATAGACGATAA
TATATGACTACTGACATATGATCTCAAATGTACCGTTGTCGTTCGCATTTGTTGTGCCTTTGGGAGATTGGATT
ATTTTTGGTCGACAGTTTCAATCTTCTTATCAAGTTAGAAGTCGATAATGCCAGTTATCGTTTCCAGCTTCCTCT
TCTGGTCTTAAATTTTTAGGTTTTACTTGCCGAAAAGTTTGCTATCTTAGCTTGTTAAAATTTCGATGAACCAGT
TGAATTTGCTAAGCAGTTCACATTTGTGCAGATGTATTAATGTGCGTGTTTTAGATGCACGACGTTGCGAAAC
GCTGAATACTTTTTTTTTTGGAGAAGTGCATACTTATGTGCCGCCAAAATTGATTGATCAATAAACGAATACC
TTATTTTTGCATTTAAGGTACGCAATAGATGTGAATGTCGAAAGGGCAGAAGATGTACTCACACACAAGCGAT
TGCTACATCTTGCACATGTTCCAGCTAATAGACCTGCCTTTGATGTCCGGTTGGTGCAGGTAATTAAACTACTC
TTGCAAGATAACACCTTTTAGTTGCTTTGCTCTTGATATCGCATACATTTAAATCAAGCATGCCTTTTCTGGAG
TTAAGGAGGATATTTTAGATGTTCGTTCACTCTGACTAGCTAGTTCAATAGACCAACACATCTCCGTGTAATCTT
GGTCCTTTGTATTTTTTGTTTATTGTTGCTTGTCCAGTACCTAATTATTCCCAGTATATGCTAGTTATGGATTGAA
TCAAACTTGGCATTGTGCAGGTTGCTTCGGTTCCTGATGGAAACTTAAGAGATTCTTTTCATTCGAGCTTTGCA
AAGAAGGAAGTTAGCAGAAGGTATCACCTTCGTGACATTCTACCTGAAAACGATTTCCCATAGGACGCTGTAT
TTCTTTGGTTACTTAGTGATTCATTGAAGCCTTTTTCTGTTGTTTAATATAATCTTGAATTCTTACTTGTCATTGA
CTGTGCTAAATAACCGCTTCCATTTTGATACATAGTGTCCATCCTCCACCTGCCTTTGGTTCTTCTCCTAATCTCG
AAGCCCTTGCTTGTGAAGCAATCAAATCTGAAGTTCAAGACGAAGATACTGCTGCTCCTTGTGCAAATTTTTCG
CGGTATAGAATTTTTTTTCTTTTTGTGCATTCCGCTTCGACGAGTATATATTATGAAGCATAAAATTGTAAATAA
TTTTGCAGGCCCATGCATGAAATTACATTTTCAACAGATGACAAGCCAAAGCTTCTTAGCCAGGTAATTGATGT
GCTTATTTATTCAATACACTATCTGCTTGATAGAAATGTACTCTATCTGTTGGCAGAGGTGGGATGTGGTAAGC
TTTTTATTTGACATTGAAAAAATGTCCATTTATTATTGAAACCAATTGTTGACCCATGAACATGTATAATATTTA
ATTCTTTATGTAGAAATGTAATTCAGGGACCTTGATGTATGAAGGGCTGAGGCTTTTGTCTGTTCCTTTGTTTC
ATGAAAGAACACAACTCTCATCTTGCTGCAGATTTCAAAATGATGCATGATTTGGAATGTGCAAGTAAAACAG
ACATAATTGTATTTGGTGACACCAAAATTGATAAATATTGCCTGCCTACTTGGCATTGTGATGCAGTGAGAAA
GGATTGTGTATTGCAAGAAAAGAAGTAGTTCTTTATATCAGTTTATATCTCATGATAAGGAAATCTGAGACAAT
AATGAACCTTTGAATATGACAGTTAACTTCATTACTAGCTGAGCTTGGGCTGAACATCCAGGAAGCGCATGCC
TTTTCCACTGTGGATGGCTACTCCCTAGATGTCTTTGTTGTTGATGGTTGGCCCTATGAGGTACATCTCTGACGT
TATATCCTCACTTTGATCTGGGTTCGCTTAGGTGCCTGTTATATTTTGTGACCTAACATCAAGAAGTGACAGAT
AATGTATGCATGGTTTAAAGTTCTGTATTATGGTCGCTTTCAGCTCAACTAAAAATTGAGTAACCACTTTTAAAC
TATGTAAAGTTTATGAGAATTTCATCAAATTATTTAGGCTACATAATTTAAAAGGAATTTGATAATTCTGATTAA
AAAATAATATAAAGGATTTGTACTTGTACATCTAGAAAATTCAGTTATAAATACTTTTAACATTAAGATTTCAAT
AAATCAAAGTGCATAAAGGTTTACGTATGACAATCGACTATGATAAAACATATTGGAGTATAACTATGTTGAA
TTCAATGAGAGTATATCATACACTTTCATTTAACTATTATTATGTCATTAGGTTTTTGTTTTGTTTTTTTGTTATTT
CGTAAGAAAAATGTGACATAAATTTAATAAGAGTGTCCCGCTTTCAGCTTACCTTGGGAAATGATTATGTCTT
GCTTTCTTGATTATTACTTTGTATATATCACAGTCATGATTCTCTACTTCACTTATTAGGAAATGAGTTTTAAAAG
GTCTACAGTAAAATAATCTTTTTGAAGTGTTGGTTCGCCAATTAACTTTTTCCGGCATAGGAATCCTTTCTGTAG
TTGGCTTGTTGAGTTCTAGGCTACACTGTTGCACCTCTAAATTCAGTGCATAAACTGGGAGTATTTTACATTTCA
AACAGAAGTGAATGAAATTCTGTGCTCCAATGCTTCATATTTGTAGCACCAATTCCAGCATTCAGTGTGAGCCC
CATGGTAGGTGCCAATTTTTATTTTTTTTCTAATTGAAAAAGTAAAATCACTCTGTTATGGTTTCTCGGTCATG
GTCGGGGTTGTCTATTATATTCCTTCTGATGTCATGTGTCCAATGGAACATTTATTTCTGTTTCTTATCAGGAAG
TTGTGCGACTTCGAACTGCATTGGAGAGGGAAATCTTGAGAAATGAGGTACTTTCCTGTTATTTTGTTCTATAT
```

FIGURE 3B

```
AATGACATTTGATATTCTGCCGAGATTTCTGGATATGTTTTTTCTGCACTAGTTAAATCCCAACTAATGTACAAA
GGACTTTGGTAAGAACAGATTTCTGGTCGTTTTCTGAATGATTATACTTTTGGAGTTACTAGGATTAGTCATTT
CCTTGTTCTCCTCGACGAGCAATATAAGATTTAGCCAGTTGTCTGTAAGTTTTGTGTACTTATCATTTAACGAGG
TGTAGCTCCATTCAGAAATCATGGCCAAGCCCGTCACAATCGTTCATAAAGCAGGAGCAAGACTTGATCAAAC
GTGAATTTGACCATTTGACAATACCTTTTGATGGCATTGACGTCTGGGAAATTGATCATCAGCTTTTAAAATTT
GAATACAAGATTGCATCTGGTTCATATGGTGACTTGTAAGTTTGTTATGAGCTATATCATTCCTCTGACCATTTT
AGTTTCCTGGAGACTTAATTAATTAGGTAATTGTTTCAGATACAAAGGTACATACTGCAGTCAGGATGTAGCTA
TCAAAATCCTAAAATCTGAGCGCTTGAACACAGAATTGCAGACGGAGTTTGCCCAAGAAGTGTATATCATGAG
GTCTGTCTGGTTATACCTCCCTATGAAGCTTATGGCTATTATCTTTGATTTCTTTCTCTATGCTTAAAATATGTTC
AGACAATATATGGTATTATTGTCACATTGCTATATCCTTTACTTTTCAGGACAAGTATAAGATTACACACCATGT
CAAGTCGTTATCTTTCCTCTGATACTGTATTTCTTTTGTACTTGCAGAAAAGTTCGTCACAAAAATGTTGTCCAA
TTCATAGGGGCTTGTACCAGGCCTCCCAACTTGTGTATAGTAACAGGTAGTAAATGTCGTATTCAGATCACCCA
ACTTGCAGAATTGTTTCAAAATCGCCGACTATCACTGTTTTCAAAACCATTTCCTGTATCAGTTTCAGTAGGAGT
TCACTTAATGTTTATTTATCTTTCATTTCTTTGACTGTAGAGTACATGTCTGGGGGAAGCGTATATGACTATTTA
CACAAACGAAAGGGCAGTTTTAAACTACCTACCCTGCTTAAAGTAGCGATTGATGTAGCTAAAGGGATGAACT
ACCTGCATCAAAATAATATTATACATAGGGACTTGAAGGCTGCCAATCTACTGATGGATGAAAATGAAGTAAG
ACGCAATTTTCAGTAAGGCTGAAAATCTTATACTTTGTGTGCTGTCTTATTGCTAGATGTTTTTAGTCGCTGATG
TTACGTATATTGATGATTGATCAACTTTCTAGAGTAATTTTTATCATGTCCAACTAACTATGCTTGTAAATATTG
ATTTCCCATTTTCATTTGCAAATGTAGAACCATTAGCTAGTACACAAGGCCCTACCACATGAAAGAGGTTTATT
TCTGAACGACTATAGGGAAGTTATTGGAGATGCCACCACAGGATACGGAGCGCTGCGTATTTTATATACCACT
GATAACATTTTGTTATCACTCTTTTGCTTAGCGATAATGGGCTGCTTGAACTTTGGGACATTTTCCAAAGTTTTT
ATTATCAGCCTATAGGAAATCTGCTAAAGGCAAATCATTGTGGTTGCATTAGATCTATGAAATAGGATATGAC
TGTGTTTTATTTCGAGTCCGTGAAAAACATATTGCTTTTCTTGAAAATATTGAGAACACAAGCAGGTTGAAACA
CACTGACGATCTGTCCTCATCGTGGTCTTTTAGTGATAGAACCAGGATGGAAAGAACTGAGAGGCACTTAAGG
CTATTTTTGTATAAAGATAGGAAAGAATTAAATGCTAAAGCGGAAGTAACAAAACATTAGCAAGTCCAAAGCC
TCCTTGACTGAAAAACAGTGTCTAAAAGGCAGACATGATGTAATTCAATTTGTAGTTTCTGTTACCTCCGTGTC
TGAGATTGTAGAACGACTCCACTTCTCCCTTACAGCCAGATTCTAATATTGGTGACCAAATTGCGCGAAATGCA
TTAATGATGCAATTGCCATCTTTTATCCCAAAATTTCATTGTTGTAGCTTTCAATTAAGCTTCAGCTTGAAATTCA
GTTCATAACAGTGGAGTTCAAAGTGTGCCAAATTAAGGGTGTAATCTTTCATTCATCCCATGTTCTTTCAATTGT
ACTCTAGTTTTCAACTAAGTTTCACTTTGAAATCCCTTTTAATTTGACTTAAATCATTTGGTTAGTGTACTTAGAC
ATAATAAAATATGTGTTGTAGGCATGTGTGGGTTCATTAGTCCTTCATCCACCTTATGTTCTGAATCAGTTAGT
GGTAAATTTTGAGTCTAAAATTAGTTTTCAGCTGTTTGTAATCAATAGTTTGCTATAATTTTCTCGCAGAATATA
TCGATCATGTTATTTTTTCAACTGAGAATTACTCATTGATGCTTCACTATGGGTTAAATTACCCAATACACCTTTT
TATCCGCTTTTATTTTCTTAAGTGGGTTTCAAAAATAATTATATTCAAGCTCTCTTTTGTTAGTTTAGTCTAGGCC
AATCTTAACCCAAATTAGTTGGTTGCTTATCAAGTTTTACCTAATGTCTTTTTTCAGGTCATTAAAGTGGCTGAT
TTTGGTGTTGCCAGAGTGAAGGCACAAACAGGTGTAATGACGGCAGAAACCGGGACTTATAGATGGATGGCC
CCGGAGGTAGGCCTATCATTCAAATCTTAAGATAGGAAATTTAATCCGAAATCTCCCAAACCAGGCTTAAGCC
TTAAGATAGAAGTTAGTTATGAGTGAGCAGAATTTTGGTGCAGATCTTAAATTTAGCCATCTATATTGTTTAGG
ATTTAGGCGGTATTAATTGATTGTACACACAGTAGTGAGTAGACTGTTGAAGGTGATTTAAGAGAAGGAAGG
GATGGAAGAAGAGGAATAGAGAGAGGGAGCAGTCCTTATGTCAAGAGGGTGGAGTCTTAACTAAGATTTGT
TCATTATAAGAATTATATAATACAAAGACGTGTAGACTCTATTTGATCTCTCAAAGAATTCGATAGCTTGTGGT
ACCAATTATGAATCCATTCAAGGTAACAGCAGTTGTTACAATGGAGGCTGAAGGTACTAAAGTTATGTGTGAA
GGCAGACCAATACGAAAGCAATATGCGACATGGTTCCTCTAAATAGATACAGAAAGAGCTACATACATATGAT
AGGTGTAGTATCAGAGGTATATGTTGCATCATATTTACCAAGAACTAGATAGCTAGTACTACCAATCATGACTT
GTGTTAGGTAAGAGAGTCTGCAATTACTGACACAAGCTTTCCTTCTGGACCTCCCCATCCAAATAACTCGCGTG
AGTCCTAGATAATGTGCCGAGATGTTACGTTATTAAATTGCTGCATGGCAAGTCTCTAGTGATCTTGGCAAAG
GATATTTTGTTTTTTTAGTACCAGAATTGTGTGTTACTAGAATCAGAGAGCTGACTGTGGGGTACCTTACTGCA
CCATTTTGGGCTGCAACTGCATAAGGGATGAGTATCAGAAAAAGTTTTGTGCTTTCTAAAGCTCTAATATCCTT
TCTTGTAGATTCTAGATACAAACTTATCAAAAATGGTTAAATTGGGAACAAAACACAGTTTATGATGGAGCAT
GAGTTTTCTCATATTTCCATAACTGGAATTAGAGGCAATTGAAACTGTACCTTTTAGCTTTTTCTTGTTTGAATTT
TGTTTCATTGGAGTGTTGTGAGATACAAGCACTGATATCAACTCTCTGCCCAGTTGATTGATGCACAACAACAA
```

FIGURE 3C

```
CAAACCCAGTGAAGGTGTGGGGAGGATAATGTGTACACAGACCTTACCCCTACCCCGGAAGGTCAGAGAGG
GAGAGGTTGTTTCTGATAGACCCTCGACTAGAGAGTAGATGAAATGCGCTTTATAGGAATATCACATATACAT
AAAGAAGCATAGGCCACAAGTAGTAACAACAACAGTATATTAAAAAACCAAAGCGAAAGATGCCAATCAAAC
AACAAGTAAAGATAGCAGTCTATGAGTAAAAGGGATACCATACTAATACTAATGCTATAGGTCTGGAAAAGA
AAGAGCAGCGCGCTCGACTACCCACTAGCCTTCTACCCTAATACTCGACCTCCACAACCTCCTATCAAGGGACA
TGTCCGCAGTAAGCTCCAGCTGCGTCATATCCTGCCTAATCACCTCTCCCGATACTTCTTCGGCATGCTACTAC
CCTTCCTCATACCCATTGTTGCTAACCTCTCACACATCATAACTGGGGCATCAATGTTTCTCCTTTGTCCGAACC
ATCTCAGACTCGCCTCCCGCATATTATCCTCCACGGAGGCCACTTTCGCCTTTTCTCAAATAACTCCATTCCTAAT
CTTATCAAATCGGGTATGCCCGCACATCCATTGCAATATTCTTATTTCAGCTACTTTTATCTTTTGGACATGAGA
GTTCTTGACTGGCCAACACTCTACTCCATACAACATAGTCGGTCTAACCACCACTCTATAGAACTTACCTTTAAG
TTTTAATGGAATATTCTTATTACACAAGACACCGGAAGCGAACTCCATTTCATCCACCCTGACACGATACGATG
TGTGACATCCTCATCAACCTCCCTATTTCTTTGTATTATTGACCCAAGATACCTAAAACTTACTCTCTTGGGGAT
GACTTGTGTATCAAGCCTCACCTCCATGTCCGCTTCCTGGGTTACGTCGTTGAATTTGCACTCTAAGTATTCCGT
CTTGGTCCTGCTCAACTTGAAACCTTTAGACTCCAGGGTCTCCCTCCAAACCTACAGTCTCTTGTTAACACCTCC
CAACGTCTCATCAATCAGAACTTTGTCATTAGCAAATAACATACACCATGACACCTCCCTTGAATGTGTCGCGT
AGGTGCGTCTATCACCAAGGAAAATAGAAACGGGCTAAGAGCTGATCCCTGGTGCAACTCTATCACAACCAG
AAAGTGTTCCGAGTCTCCTCCCGTTGTCCTAACCAGGGTATTACCTCTATCATACATGTCCTTAATCACCCTAAT
ATAGGCTACCGTGACCCCTTTAGCCTCCAAGCATCTCCATAGCACCTCCCTCGGGACTTTGTCGTATACTTTTTC
TAGGTCAATGAACATCATATGCAAGTCCTTTATCTCCCTATACCTCTCCACCAATCTCCTCACGAGGTGAGTGG
CTTCCGTAGTCGAACGACCCGACATGAAACCGAACTGGTTCTCAAAAATAGATACAACTCTCCTCACCCTCACT
TCAACCATCCTCTCCCAAACTTTCATCGTATGGCTGGCTCTTAATATGTTGACTATAGTGGTGATATCTTGTGTT
TTTGTTGTTTGGAGTGGCTTAGAATTGAGGTATTTCATTGGTTGTTACTGGCCAAGAGGATCCAGATGTGTTA
GGTAACTCCTAGGTGTCAGTGGTGATTGATGAAATTTAATGAGGTTGAGCTTATTTAGTGGGTACACGCAATG
CTGATCAATGATTTTATGACTGCTTGTATAAGATTTGTGTTAAAAACTCCCTGTTATTTTGTATAAGATTTGTGT
CATTGTAAGCATCACTGCAGTTGCTTGAATAGTAATTGAACTAGATGGAGCATGGGAAGGGTTATAGAAACTC
GGCCAAAAACAATCAGTTAGTTATTTGTGACAGTTACTTAAATCAGTTAATGTGCGAGTTACTTCCGTTATTTTC
TCAATGAGATTTTATATAACTAGTTGTGCAGTTAGCATGCTGCATTGGCTTATTTCAGATCTTTCTTCTTGAAG
GTAATAGAACACAAGCCCTACGATCACAAAGCAGATGTATTCAGTTTTGGGGTTGTGCTATGGGAGTTGCTGA
CAGGGAAGGTACTGATATGTGATTGGAAATTTTTGGGTTAGCCCGTTTTTGTTGGTTGTTTCTTGGTATATAC
TTATATTCACTTGATTTTGTTTAACCAGCTTCCATATGAGTACTTGACCCCATTGCAAGCTGCTATTGGAGTGGT
CCAGAAGGTAATGCTTCTTTTATTTGATTTTATTTTATTTGTAATATCGTATGACCATAATGGTTGATTGCATATT
GCGCGCTCATCACATGCATGCGGGCGCACATAGAAAAGATATGCACAAATGATTTGATATTAATTTTCTAATT
GCTGCCAGGGTTTGCGACCAACTATACCCAAGCACACTCCTCCCAGACTTGCTGAGCTGCTAGAGACATGCTG
GCAACAAGACCCGACATCCAGGCCTGACTTTTCTGAAATAGTAGATATTTTGCAGCAAATAGCAAAAGAGGTA
TTTGTCTCTGCTCAGGCATTGGCCAGTTAATAATTATTTTTCTTGGTGATAAATGTACAGTACACGTCACAAATT
GGATTTACTGGGATTTAAAAGGGTATTGATTTTCTTTGGCCGAACATCTTTTGGTCACGATTTACAATTTTCTGT
CAAATTGCCACCTCATGCCGATAATATAAATTGTATTAATGGCTGGGGAAAAAAGAGTTCACTCTCCTTGAACT
TCTTAAGAGTTGGCAGTCCCTTCTTCAGCTTCCCTAGAATAATAACTATCCTCATTTGTGCTTTGCTTTTAATTTT
CATAATTTCTCTGCACACAAAGATGGATTTAAATAGTACTCTCATAACATAAACTGTAACAAAGGAAGTAGTTT
ATTAACTCGGCAACACTCGACATGTGGGTCAGGTTGGAGATGAAAGAGCAGATCGTTGCAAGGAGAAGTCA
GCTGGAGGATTCTTTTCAGCCCTTAGACGTGGACATCATTGAGTAGATGCACACATACAGAATGTTGATAAAG
TTTTGATTTTTAGCCTCATTTATCCAGACTGTACAGTTTTTTTCCAGATCAATGTTCCCATGGTCAAAAGGAAGT
TATTATTTCCAATTCTTTGAACAAATTCCTTTTATAAGCAACTTTCTTTTGGCAGCTCCGTCAGAAGCTTTCGGA
GTTGGATCAAATTAGATTAATATAATTTTGCGACTACTCCATCAACATCAACATCCACATCCACATCATTATTCA
TTCCCCACGATCACGATATGTTTCGTATTCCCTGAAAGTAATGGTAGGTTTCCCGTATATTGTTGTTTCCGCTTT
CTAGTTGTTTTGCGTGTGTTTCACTGTTTATGTGATATTTGACCTTTATATCGTGGTTTTAGGTTTATGGCATCG
ATTATGTGCGCTATGAAAGAATGAATTTTAAACTT
```

FIGURE 4

Nitab4.5_0003679g0060.2 Transcript: SEQ ID NO: 2

ATGGCGATAGAGGATAACGAGAGTTGTGGGAGTAGAGTGGTGGATTCGGCGACTACCAGTGGTCGTCATCA
GAGAAAAAAATTGGAGGTCTACAATGAGGTTTTACGGAGGCTTAAGGAATCAAACAACGTCGAGGCTTTAGA
ACCTGGATTTGACGATGAACTTTGGGCTCACTTCAATCGTCTACCTACTCGGTACGCAATAGATGTGAATGTCG
AAAGGGCAGAAGATGTACTCACACACAAGCGATTGCTACATCTTGCACATGTTCCAGCTAATAGACCTGCCTT
TGATGTCCGGTTGGTGCAGGTTGCTTCGGTTCCTGATGGAAACTTAAGAGATTCTTTTCATTCGAGCTTTGCAA
AGAAGGAAGTTAGCAGAAGTGTCCATCCTCCACCTGCCTTTGGTTCTTCTCCTAATCTCGAAGCCCTTGCTTGT
GAAGCAATCAAATCTGAAGTTCAAGACGAAGATACTGCTGCTCCTTGTGCAAATTTTTCGCGGCCCATGCATG
AAATTACATTTTCAACAGATGACAAGCCAAAGCTTCTTAGCCAGTTAACTTCATTACTAGCTGAGCTTGGGCTG
AACATCCAGGAAGCGCATGCCTTTTCCACTGTGGATGGCTACTCCCTAGATGTCTTTGTTGTTGATGGTTGGCC
CTATGAGGAAGTTGTGCGACTTCGAACTGCATTGGAGAGGGAAATCTTGAGAAATGAGAAATCATGGCCAAG
CCCGTCACAATCGTTCATAAAGCAGGAGCAAGACTTGATCAAACGTGAATTTGACCATTTGACAATACCTTTTG
ATGGCATTGACGTCTGGGAAATTGATCATCAGCTTTTAAAATTTGAATACAAGATTGCATCTGGTTCATATGGT
GACTTATACAAAGGTACATACTGCAGTCAGGATGTAGCTATCAAAATCCTAAAATCTGAGCGCTTGAACACAG
AATTGCAGACGGAGTTTGCCCAAGAAGTGTATATCATGAGAAAAGTTCGTCACAAAAATGTTGTCCAATTCAT
AGGGGCTTGTACCAGGCCTCCCAACTTGTGTATAGTAACAGAGTACATGTCTGGGGGAAGCGTATATGACTAT
TTACACAAACGAAAGGGCAGTTTTAAACTACCTACCCTGCTTAAAGTAGCGATTGATGTAGCTAAAGGGATGA
ACTACCTGCATCAAAATAATATTATACATAGGGACTTGAAGGCTGCCAATCTACTGATGGATGAAAATGAAGT
CATTAAAGTGGCTGATTTTGGTGTTGCCAGAGTGAAGGCACAAACAGGTGTAATGACGGCAGAAACCGGGAC
TTATAGATGGATGGCCCCGGAGGTAATAGAACACAAGCCCTACGATCACAAAGCAGATGTATTCAGTTTTGG
GGTTGTGCTATGGGAGTTGCTGACAGGGAAGCTTCCATATGAGTACTTGACCCCATTGCAAGCTGCTATTGGA
GTGGTCCAGAAGGGTTTGCGACCAACTATACCCAAGCACACTCCTCCCAGACTTGCTGAGCTGCTAGAGACAT
GCTGGCAACAAGACCCGACATCCAGGCCTGACTTTTCTGAAATAGTAGATATTTTGCAGCAAATAGCAAAGA
GGTTGGAGATGAAAGAGCAGATCGTTGCAAGGAGAAGTCAGCTGGAGGATTCTTTTCAGCCCTTAGACGTGG
ACATCATTGA

FIGURE 5

Nitab4.5_0003679g0060.2 Protein: SEQ ID NO: 3

MAIEDNESCGSRVVDSATTSGRHQRKKLEVYNEVLRRLKESNNVEALEPGFDDELWAHFNRLPTRYAIDVNVERAE
DVLTHKRLLHLAHVPANRPAFDVRLVQVASVPDGNLRDSFHSSFAKKEVSRSVHPPPAFGSSPNLEALACEAIKSEV
QDEDTAAPCANFSRPMHEITFSTDDKPKLLSQLTSLLAELGLNIQEAHAFSTVDGYSLDVFVVDGWPYEEVVRLRTA
LEREILRNEKSWPSPSQSFIKQEQDLIKREFDHLTIPFDGIDVWEIDHQLLKFEYKIASGSYGDLYKGTYCSQDVAIKIL
KSERLNTELQTEFAQEVYIMRKVRHKNVVQFIGACTRPPNLCIVTEYMSGGSVYDYLHKRKGSFKLPTLLKVAIDVAK
GMNYLHQNNIIHRDLKAANLLMDENEVIKVADFGVARVKAQTGVMTAETGTYRWMAPEVIEHKPYDHKADVFS
FGVVLWELLTGKLPYEYLTPLQAAIGVVQKGLRPTIPKHTPPRLAELLETCWQQDPTSRPDFSEIVDILQQIAKEVGD
ERADRCKEKSAGGFFSALRRGHH

FIGURE 6

SEQ ID NO: 4

AACAGGTGTAATGACGGCAGAAACCGGGACTTATAGATGGATGGCCCCGGAGGTAATAGAACACAAGCCCT
ACGATCACAAAGCAGATGTATTCAGTTTTGGGGTTGTGCTATGGGAGTTGCTGACAGGGAAGCTTCCATATGA
GTACTTGACCCCATTGCAAGCTGCTATTGGAGTGGTCCAGAAGGGTTTGCGACCAACTATACCCAAGCACACT
CCTCCCAGACTTGCTGAGCTGCTAGAGACATGCTGGCAACAAGACCCGACATCCAGGCCTGACTTTTCTGAAA
TAGTAGATAT

SEQUENCE LISTING

```
<160> NUMBER OF SEQ ID NOS: 6

<210> SEQ ID NO 1
<211> LENGTH: 10864
<212> TYPE: DNA
<213> ORGANISM: Nicotiana tabacum

<400> SEQUENCE: 1
attcatcacc taaattttgc caaagctaag aatattaagc aaagcaaaaa aaaaagggga      60
atgtaattag cacgcaaaaa aagcagatcg aagataagca gatccacgtc aacttgactg     120
tgccaattaa aatcccacct ttaccccgag tcaaaaaagg gttatacaat acatacatac     180
atgattcatt tcatgtaccc accccccca cacacagaga gagggaaaaa cgatatgacc     240
aatgggaatg aaaccttcct caaaaccact cccccaccg ccatttgttt cttaataatt     300
cttctcagtt ttctttcaca aattaaacat gcatctttga tataaagtag aatttgaatt     360
ctgtaatttt ccatctccat aacgaagatt cactttacgt aaactgcacc gcggccatta     420
tttttcattc cggaggaatt taagactagt gagagaggtg aaatggcgat agaggataac     480
gagagttgtg ggagtagagt ggtggattcg gcgactacca gtggtcgtca tcagagaaaa     540
aaattggagg tctacaatga ggttttacgg aggcttaagg aatcaaacaa cgtcgaggct     600
ttagaacctg gatttgacga tgaactttgg gctcacttca atcgtctacc tactcggtaa     660
ctttaccttc ctacctctct ctatgtatta atccgtacaa ttatatacgt tttatgcggt     720
tttctataga cgataatata tgactactga catatgatct caaatgtacc gttgtcgttc     780
gcatttgttg tgcctttggg agattggatt attttggtc gacagtttca atcttcttat     840
caagttagaa gtcgataatg ccagttatcg tttccagctt cctcttctgg tcttaaattt     900
ttaggtttta cttgccgaaa agtttgctat cttagcttgt taaaatttcg atgaaccagt     960
tgaatttgct aagcagttca catttgtgca gatgtattaa tgtgcgtgtt ttagatgcac    1020
gacgttgcga aacgctgaat acttttttt tttggagaag tgcatactta tgtgccgcca    1080
aaattgattg atcaataaac gaataccta ttttgcatt taaggtacgc aatagatgtg     1140
aatgtcgaaa gggcagaaga tgtactcaca cacaagcgat tgctacatct tgcacatgtt    1200
ccagctaata gacctgcctt tgatgtccgg ttggtgcagg taattaaact actcttgcaa    1260
gataacacct tttagttgct ttgctcttga tatcgcatac atttaaatca agcatgcctt    1320
tttctggagt taaggaggat atttagatg ttcgttcact ctgactagct agttcaatag     1380
accaacacat ctccgtgtaa tcttggtcct ttgtatttt tgtttattgt tgcttgtcca    1440
gtacctaatt attcccagta tatgctagtt atggattgaa tcaaacttgg cattgtgcag    1500
gttgcttcgg ttcctgatgg aaacttaaga gattcttttc attcgagctt tgcaaagaag    1560
```

```
gaagttagca gaaggtatca ccttcgtgac attctacctg aaaacgattt cccataggac   1620
gctgtatttc tttggttact tagtgattca ttgaagcctt tttctgttgt ttaatataat   1680
cttgaattct tacttgtcat tgactgtgct aaataaccgc ttccatttg atacatagtg    1740 tccatcctcc acctgccttt ggttcttctc ctaatctcga agcccttgct tgtgaagcaa   1800
tcaaatctga agttcaagac gaagatactg ctgctccttg tgcaattttt tcgcggtata   1860
gaattttttt tcttttttgtg cattccgctt cgacgagtat atattatgaa gcataaaatt   1920
gtaaataatt ttgcaggccc atgcatgaaa ttacattttc aacagatgac aagccaaagc   1980
ttcttagcca ggtaattgat gtgcttattt attcaataca ctatctgctt gatagaaatg   2040
tactctatct gttggcagag gtgggatgtg gtaagctttt tatttgacat gaaaaaatg    2100 tccatttatt attgaaacca attgttgacc catgaacatg tataatattt aattctttat   2160
gtagaaatgt aattcaggga ccttgatgta tgaagggctg aggcttttgt ctgttccttt   2220
gtttcatgaa agaacacaac tctcatcttg ctgcagattt caaaatgatg catgatttgg   2280
aatgtgcaag taaaacagac ataattgtat ttggtgacac caaaattgat aaatattgcc   2340
tgcctacttg gcattgtgat gcagtgagaa aggattgtgt attgcaagaa agaagtagt    2400 tctttatatc agtttatatc tcatgataag gaaatctgag acaataatga acctttgaat   2460
atgacagtta acttcattac tagctgagct tgggctgaac atccaggaag cgcatgcctt   2520
ttccactgtg gatggctact ccctagatgt ctttgttgtt gatggttggc cctatgaggt   2580
acatctctga cgttatatcc tcactttgat ctgggttcgc ttaggtgcct gttatatttt   2640
gtgacctaac atcaagaagt gacagataat gtatgcatgg tttaaagttc tgtattatgg   2700 tcgcttttcag ctcaactaaa aattgagtaa ccacttttaa actatgtaaa gtttatgaga   2760
atttcatcaa attatttagg ctacataatt taaaaggaat ttgataattc tgattaaaaa   2820
ataatataaa ggatttgtac ttgtacatct agaaaattca gttataaata ctttttaacat  2880 taagatttca ataaatcaaa gtgcataaag gtttacgtat gacaatcgac tatgataaaa   2940
catattggag tataactatg ttgaattcaa tgagagtata tcatacactt tcatttaact   3000
attattatgt cattaggttt ttgttttgtt ttttttgttat ttcgtaagaa aaaatgtgac   3060
ataaatttaa taagagtgtc ccgctttcag cttaccttgg gaaatgatta tgtcttgctt   3120
tcttgattat tactttgtat atatcacagt catgattctc tacttcactt attaggaaat   3180 gagtttttaaa aggtctacag taaaataatc ttttgaagt gttggttcgc caattaactt    3240
tttccggcat aggaatcctt tctgtagttg gcttgttgag ttctaggcta cactgttgca   3300
cctctaaatt cagtgcataa actgggagta ttttacattt caaacagaag tgaatgaaat   3360
tctgtgctcc aatgcttcat atttgtagca ccaattccag cattcagtgt gagccccatg   3420
gtaggtgcca atttttattt ttttttctaa ttgaaaaagt aaaatcactc tgttatggtt   3480
tctcggtcat ggtcggggtt gtctattata ttccttctga tgtcatgtgt ccaatgaac    3540 atttatttct gtttcttatc aggaagttgt gcgacttcga actgcattgg agagggaaat   3600
cttgagaaat gaggtacttt cctgttattt tgttctatat aatgacattt gatattctgc   3660
cgagatttct ggatatgttt tttctgcact agttaaatcc caactaatgt acaaaggact   3720
ttggtaagaa cagatttctg gtcgtttct gaatgattat acttttggag ttactaggat    3780
tagtcatttc cttgttctcc tcgacgagca atataagatt tagccagttg tctgtaagtt   3840
ttgtgtactt atcatttaac gaggtgtagc tccattcaga aatcatggcc aagcccgtca   3900
```

```
caatcgttca taaagcagga gcaagacttg atcaaacgtg aatttgacca tttgacaata    3960
ccttttgatg gcattgacgt ctgggaaatt gatcatcagc ttttaaaatt tgaatacaag    4020
attgcatctg gttcatatgg tgacttgtaa gtttgttatg agctatatca ttcctctgac    4080
cattttagtt tcctggagac ttaattaatt aggtaattgt ttcagataca aaggtacata    4140
ctgcagtcag gatgtagcta tcaaaatcct aaaatctgag cgcttgaaca cagaattgca    4200
gacggagttt gcccaagaag tgtatatcat gaggtctgtc tggttatacc tccctatgaa    4260
gcttatggct attatctttg atttctttct ctatgcttaa aatatgttca gacaatatat    4320
ggtattattg tcacattgct atatccttta cttttcagga caagtataag attacacacc    4380
atgtcaagtc gttatctttc ctctgatact gtatttcttt tgtacttgca gaaaagttcg    4440
tcacaaaaat gttgtccaat tcatagggc ttgtaccagg cctcccaact tgtgtatagt     4500
aacaggtagt aaatgtcgta ttcagatcac ccaacttgca gaattgtttc aaaatcgccg    4560
actatcactg ttttcaaaac catttcctgt atcagtttca gtaggagttc acttaatgtt    4620
tatttatctt tcatttcttt gactgtagag tacatgtctg ggggaagcgt atatgactat    4680
ttacacaaac gaaagggcag ttttaaacta cctaccctgc ttaaagtagc gattgatgta    4740
gctaaaggga tgaactacct gcatcaaaat aatattatac atagggactt gaaggctgcc    4800
aatctactga tggatgaaaa tgaagtaaga cgcaattttc agtaaggctg aaaatcttat    4860
actttgtgtg ctgtcttatt gctagatgtt tttagtcgct gatgttacgt atattgatga    4920
ttgatcaact ttctagagta atttttatca tgtccaacta actatgcttg taaatattga    4980
tttcccattt tcatttgcaa atgtagaacc attagctagt acacaaggcc ctaccacatg    5040
aaagaggttt atttctgaac gactataggg aagttattgg agatgccacc acaggatacg    5100
gagcgctgcg tattttatat accactgata acatttgtt atcactcttt tgcttagcga     5160
taatgggctg cttgaacttt gggacatttt ccaagttttt tattatcagc ctataggaaa    5220
tctgctaaag gcaaatcatt gtggttgcat tagatctatg aaataggata tgactgtgtt    5280
ttatttcgag tccgtgaaaa acatattgct tttcttgaaa atattgagaa cacaagcagg    5340
ttgaaacaca ctgacgatct gtcctcatcg tggtctttta gtgatagaac caggatggaa    5400
agaactgaga ggcacttaag gctatttttg tataaagata ggaaagaatt aaatgctaaa    5460
gcggaagtaa caaaacatta gcaagtccaa agcctccttg actgaaaaac agtgtctaaa    5520
aggcagacat gatgtaattc aatttgtagt ttctgttacc tccgtgtctg agattgtaga    5580
acgactccac ttctcccctta cagccagatt ctaatattgg tgaccaaatt gcgcgaaatg    5640
cattaatgat gcaattgcca tcttttatcc caaaatttca ttgttgtagc tttcaattaa    5700
gcttcagctt gaaattcagt tcataacagt ggagttcaaa gtgtgccaaa ttaagggtgt    5760
aatctttcat tcatcccatg ttctttcaat tgtactctag ttttcaacta gtttcactt    5820 tgaaatccct tttaatttga cttaaatcat ttggttagtg tacttagaca taataaaata    5880
tgtgttgtag gcatgtgtgg gttcattagt ccttcatcca ccttatgttc tgaatcagtt    5940
agtggtaaat tttgagtcta aaattagttt tcagctgttt gtaatcaata gtttgctata    6000
attttctcgc agaatatatc gatcatgtta ttttttcaac tgagaattac tcattgatgc    6060
ttcactatgg gttaaattac ccaatacacc ttttatccg cttttatttt cttaagtggg     6120
tttcaaaaat aattatattc aagctctctt ttgttagttt agtctaggcc aatcttaacc    6180
caaattagtt ggttgcttat caagttttac ctaatgtctt ttttcaggtc attaaagtgg    6240
ctgattttgg tgttgccaga gtgaaggcac aaacaggtgt aatgacggca gaaaccggga    6300
```

-continued

```
cttatagatg gatggccccg gaggtaggcc tatcattcaa atcttaagat aggaaattta   6360
atccgaaatc tcccaaacca ggcttaagcc ttaagataga agttagttat gagtgagcag   6420
aattttggtg cagatcttaa atttagccat ctatattgtt taggatttag gcggtattaa   6480
ttgattgtac acacagtagt gagtagactg ttgaaggtga tttaagagaa ggaagggatg   6540
gaagaagagg aatagagaga gggagcagtc cttatgtcaa gagggtggag tcttaactaa   6600
gatttgttca ttataagaat tatataatac aaagacgtgt agactctatt tgatctctca   6660
aagaattcga tagcttgtgg taccaattat gaatccattc aaggtaacag cagttgttac   6720
aatggaggct gaaggtacta aagttatgtg tgaaggcaga ccaatacgaa agcaatatgc   6780
gacatggttc ctctaaatag atacagaaag agctacatac atatgatagg tgtagtatca   6840
gaggtatatg ttgcatcata tttaccaaga actagatagc tagtactacc aatcatgact   6900
tgtgttaggt aagagagtct gcaattactg acacaagctt tccttctgga cctccccatc   6960
caaataactc gcgtgagtcc tagataatgt gccgagatgt tacgttatta aattgctgca   7020
tggcaagtct ctagtgatct tggcaaagga tattttgttt ttttagtacc agaattgtgt   7080
gttactagaa tcagagagct gactgtgggg taccttactg caccattttg ggctgcaact   7140
gcataaggga tgagtatcag aaaaagtttt gtgctttcta aagctctaat atcctttctt   7200
gtagattcta gatacaaact tatcaaaaat ggttaaattg ggaacaaaac acagtttatg   7260
atggagcatg agttttctca tatttccata actggaatta gaggcaattg aaactgtacc   7320
ttttagcttt ttcttgtttg aattttgttt cattggagtg ttgtgagata caagcactga   7380
tatcaactct ctgcccagtt gattgatgca caacaacaac aaacccagtg aaggtgtggg   7440
gaggataatg tgtacacaga ccttacccct accccggaag gtcagagagg gagaggttgt   7500
ttctgataga ccctcgacta gagagtagat gaaatgcgct ttataggaat atcacatata   7560
cataaagaag cataggccac aagtagtaac aacaacagta tattaaaaaa ccaaagcgaa   7620
agatgccaat caaacaacaa gtaaagatag cagtctatga gtaaaaggga taccatacta   7680
atactaatgc tataggtctg gaaaagaaag agcagcgcgc tcgactaccc actagccttc   7740
taccctaata ctcgacctcc acaacctcct atcaagggac atgtccgcag taagctccag   7800
ctgcgtcata tcctgcctaa tcacctctcc ccgatacttc ttcggcatgc tactaccctt   7860
cctcataccc attgttgcta acctctcaca catcataact ggggcatcaa tgtttctcct   7920
ttgtccgaac catctcagac tcgcctcccg catattatcc tccacggagg ccactttcgc   7980 ctttttctcaa ataactccat tcctaatctt atcaaatcgg gtatgccgc acatccattg   8040 caatattctt atttcagcta cttttatctt ttggacatga gagttcttga ctggccaaca   8100
ctctactcca tacaacatag tcggtctaac caccactcta tagaacttac ctttaagttt   8160
taatggaata ttcttattac acaagacacc ggaagcgaac tccatttcat ccaccctgac   8220
acgatacgat gtgtgacatc ctcatcaacc tccctatttc tttgtattat tgacccaaga   8280
tacctaaaac ttactctctt ggggatgact tgtgtatcaa gcctcacctc catgtccgct   8340
tcctgggtta cgtcgttgaa tttgcactct aagtattccg tcttggtcct gctcaacttg   8400
aaacctttag actccagggt ctccctccaa acctacagtc tcttgttaac acctcccaac   8460
gtctcatcaa tcagaacttt gtcattagca ataacatac accatgacac ctcccttgaa   8520
tgtgtcgcgt aggtgcgtct atcaccaagg aaaatagaaa cgggctaaga gctgatccct   8580
ggtgcaactc tatcacaacc agaaagtgtt ccgagtctcc tcccgttgtc ctaaccaggg   8640
```

```
tattacctct atcatacatg tccttaatca ccctaatata ggctaccgtg accccttag    8700
cctccaagca tctccatagc acctccctcg ggactttgtc gtatactttt tctaggtcaa   8760
tgaacatcat atgcaagtcc tttatctccc tatacctctc caccaatctc ctcacgaggt   8820
gagtggcttc cgtagtcgaa cgacccgaca tgaaaccgaa ctggttctca aaaatagata   8880
caactctcct caccctcact tcaaccatcc tctcccaaac tttcatcgta tggctggctc   8940
ttaatatgtt gactatagtg gtgatatctt gtgttttgt tgtttggagt ggcttagaat    9000
tgaggtattt cattggttgt tactggccaa gaggatccag atgtgttagg taactcctag   9060
gtgtcagtgg tgattgatga aatttaatga ggttgagctt atttagtggg tacacgcaat   9120
gctgatcaat gattttatga ctgcttgtat aagatttgtg ttaaaaactc cctgttattt   9180
tgtataagat ttgtgtcatt gtaagcatca ctgcagttgc ttgaatagta attgaactag   9240
atggagcatg ggaagggtta tagaaaactcg gccaaaaaca atcagttagt tatttgtgac   9300
agttacttaa atcagttaat gtgcgagtta cttccgttat tttctcaatg agattttata   9360
taactagttg tgcagttagc atggctgcat tggcttattt cagatctttc ttcttgaagg   9420
taatagaaca caagccctac gatcacaaag cagatgtatt cagttttggg ttgtgctat    9480
gggagttgct gacagggaag gtactgatat gtgattggaa atttttgggt tagcccgttt   9540
ttgttggttg ttttcttggt atatacttat attcacttga ttttgtttaa ccagcttcca   9600
tatgagtact tgaccccatt gcaagctgct attggagtgg tccagaaggt aatgcttct    9660
ttatttgatt ttatttttatt tgtaatatcg tatgaccata atggttgatt gcatattgcg   9720
cgctcatcac atgcatgcgg gcgcacatag aaaagatatg cacaaatgat ttgatattaa   9780
ttttctaatt gctgccaggg tttgcgacca actatacca agcacactcc tcccagactt    9840
gctgagctgc tagagacatg ctggcaacaa gacccgacat ccaggcctga cttttctgaa   9900
atagtagata ttttgcagca aatagcaaaa gaggtatttg tctctgctca ggcattggcc   9960
agttaataat tatttttctt ggtgataaat gtacagtaca cgtcacaaat tggatttact   10020
gggatttaaa agggtattga ttttctttgg ccgaacatct tttggtcacg atttacaatt   10080
ttctgtcaaa ttgccacctc atgccgataa tataaattgt attaatggct ggggaaaaa    10140
gagttcactc tccttgaact tcttaagagt tggcagtccc ttcttcagct tccctagaat   10200
aataactatc ctcatttgtg ctttgctttt aattttcata atttctctgc acacaaagat   10260
ggatttaaat agtactctca taacataaac tgtaacaaag gaagtagttt attaactcgg   10320
caacactcga catgtgggtc aggttggaga tgaaagagca gatcgttgca aggagaagtc   10380
agctggagga ttcttttcag cccttagacg tggacatcat tgagtagatg cacacataca   10440
gaatgttgat aaagttttga ttttagcct catttatcca gactgtacag tttttttcca    10500
gatcaatgtt cccatggtca aaaggaagtt attatttcca attctttgaa caaattcctt   10560
ttataagcaa ctttctttg gcagctccgt cagaagcttt cggagttgga tcaaattaga    10620
ttaatataat tttgcgacta ctccatcaac atcaacatcc acatccacat cattattcat   10680
tccccacgat cacgatatgt ttcgtattcc ctgaaagtaa tggtaggttt cccgtatatt   10740
gttgtttccg ctttctagtt gttttgcgtg tgtttcactg tttatgtgat atttgaccttt  10800
tatatcgtgg ttttaggttt atggcatcga ttatgtgcgc tatgaaagaa tgaattttaa   10860
actt                                                                10864

<210> SEQ ID NO 2
<211> LENGTH: 1689
```

```
<212> TYPE: DNA
<213> ORGANISM: Nicotiana tabacum

<400> SEQUENCE: 2
atggcgatag aggataacga gagttgtggg agtagagtgg tggattcggc gactaccagt    60
ggtcgtcatc agagaaaaaa attggaggtc tacaatgagg tttacggag gcttaaggaa    120
tcaaacaacg tcgaggcttt agaacctgga tttgacgatg aactttgggc tcacttcaat    180
cgtctaccta ctcggtacgc aatagatgtg aatgtcgaaa gggcagaaga tgtactcaca    240
cacaagcgat tgctacatct tgcacatgtt ccagctaata acctgccttt tgatgtccgg    300
ttggtgcagg ttgcttcggt tcctgatgga aacttaagag attcttttca ttcgagcttt    360
gcaaagaagg aagttagcag aagtgtccat cctccacctg cctttggttc ttctcctaat    420
ctcgaagccc ttgcttgtga agcaatcaaa tctgaagttc aagacgaaga tactgctgct    480
ccttgtgcaa atttttcgcg gcccatgcat gaaattacat tttcaacaga tgacaagcca    540
aagcttctta gccagttaac ttcattacta gctgagcttg gctgaacat ccaggaagcg    600
catgcctttt ccactgtgga tggctactcc ctagatgtct tgttgttga tggttggccc    660
tatgaggaag ttgtgcgact tcgaactgca ttggagaggg aaatcttgag aaatgagaaa    720
tcatggccaa gcccgtcaca atcgttcata aagcaggagc aagacttgat caaacgtgaa    780
tttgaccatt tgacaatacc ttttgatggc attgacgtct gggaaattga tcatcagctt    840
ttaaaatttg aatacaagat tgcatctggt tcatatggtg acttatacaa aggtacatac    900
tgcagtcagg atgtagctat caaaatccta aaatctgagc gcttgaacac agaattgcag    960
acggagtttg cccaagaagt gtatatcatg agaaaagttc gtcacaaaaa tgttgtccaa    1020
ttcataggg cttgtaccag gcctcccaac ttgtgtatag taacagagta catgtctggg    1080
ggaagcgtat atgactattt acacaaacga agggcagtt ttaaactacc taccctgctt    1140
aaagtagcga ttgatgtagc taagggatg aactacctgc atcaaaataa tattatacat    1200
agggacttga aggctgccaa tctactgatg gatgaaaatg aagtcattaa agtggctgat    1260
tttggtgttg ccagagtgaa ggcacaaaca ggtgtaatga cggcagaaac cgggacttat    1320
agatggatgg ccccggaggt aatagaacac aagcccacg atcacaaagc agatgtattc    1380
agttttgggg ttgtgctatg ggagttgctg acagggaagc ttccatatga gtacttgacc    1440
ccattgcaag ctgctattgg agtggtccag aagggtttgc gaccaactat acccaagcac    1500
actcctccca gacttgctga gctgctagag acatgctggc aacaagaccc gacatccagg    1560
cctgactttt ctgaaatagt agatattttg cagcaaatag caaaagaggt tggagatgaa    1620
agagcagatc gttgcaagga gaagtcagct ggaggattct tttcagccct tagacgtgga    1680
catcattga                                                           1689

<210> SEQ ID NO 3
<211> LENGTH: 562
<212> TYPE: PRT
<213> ORGANISM: Nicoiana tabacum

<400> SEQUENCE: 3

Met Ala Ile Glu Asp Asn Glu Ser Cys Gly Ser Arg Val Val Asp Ser
1               5                   10                  15

Ala Thr Thr Ser Gly Arg His Gln Arg Lys Lys Leu Glu Val Tyr Asn
            20                  25                  30

Glu Val Leu Arg Arg Leu Lys Glu Ser Asn Asn Val Glu Ala Leu Glu
        35                  40                  45
```

```
Pro Gly Phe Asp Asp Glu Leu Trp Ala His Phe Asn Arg Leu Pro Thr
 50                  55                  60

Arg Tyr Ala Ile Asp Val Asn Val Glu Arg Ala Glu Asp Val Leu Thr
 65                  70                  75                  80

His Lys Arg Leu Leu His Leu Ala His Val Pro Ala Asn Arg Pro Ala
                     85                  90                  95

Phe Asp Val Arg Leu Val Gln Val Ala Ser Val Pro Asp Gly Asn Leu
                100                 105                 110

Arg Asp Ser Phe His Ser Ser Phe Ala Lys Lys Glu Val Ser Arg Ser
                115                 120                 125

Val His Pro Pro Ala Phe Gly Ser Ser Pro Asn Leu Glu Ala Leu
130                 135                 140

Ala Cys Glu Ala Ile Lys Ser Glu Val Gln Asp Glu Asp Thr Ala Ala
145                 150                 155                 160

Pro Cys Ala Asn Phe Ser Arg Pro Met His Glu Ile Thr Phe Ser Thr
                165                 170                 175

Asp Asp Lys Pro Lys Leu Leu Ser Gln Leu Thr Ser Leu Leu Ala Glu
                180                 185                 190

Leu Gly Leu Asn Ile Gln Glu Ala His Ala Phe Ser Thr Val Asp Gly
                195                 200                 205

Tyr Ser Leu Asp Val Phe Val Val Asp Gly Trp Pro Tyr Glu Glu Val
                210                 215                 220

Val Arg Leu Arg Thr Ala Leu Glu Arg Glu Ile Leu Arg Asn Glu Lys
225                 230                 235                 240

Ser Trp Pro Ser Pro Ser Gln Ser Phe Ile Lys Gln Glu Gln Asp Leu
                245                 250                 255

Ile Lys Arg Glu Phe Asp His Leu Thr Ile Pro Phe Asp Gly Ile Asp
                260                 265                 270

Val Trp Glu Ile Asp His Gln Leu Leu Lys Phe Glu Tyr Lys Ile Ala
                275                 280                 285

Ser Gly Ser Tyr Gly Asp Leu Tyr Lys Gly Thr Tyr Cys Ser Gln Asp
                290                 295                 300

Val Ala Ile Lys Ile Leu Lys Ser Glu Arg Leu Asn Thr Glu Leu Gln
305                 310                 315                 320

Thr Glu Phe Ala Gln Glu Val Tyr Ile Met Arg Lys Val Arg His Lys
                325                 330                 335

Asn Val Val Gln Phe Ile Gly Ala Cys Thr Arg Pro Pro Asn Leu Cys
                340                 345                 350

Ile Val Thr Glu Tyr Met Ser Gly Gly Ser Val Tyr Asp Tyr Leu His
                355                 360                 365

Lys Arg Lys Gly Ser Phe Lys Leu Pro Thr Leu Leu Lys Val Ala Ile
370                 375                 380

Asp Val Ala Lys Gly Met Asn Tyr Leu His Gln Asn Asn Ile Ile His
385                 390                 395                 400

Arg Asp Leu Lys Ala Ala Asn Leu Leu Met Asp Glu Asn Glu Val Ile
                405                 410                 415

Lys Val Ala Asp Phe Gly Val Ala Arg Val Lys Ala Gln Thr Gly Val
                420                 425                 430

Met Thr Ala Glu Thr Gly Thr Tyr Arg Trp Met Ala Pro Glu Val Ile
                435                 440                 445

Glu His Lys Pro Tyr Asp His Lys Ala Asp Val Phe Ser Phe Gly Val
                450                 455                 460
```

```
Val Leu Trp Glu Leu Leu Thr Gly Lys Leu Pro Tyr Glu Tyr Leu Thr
465                 470                 475                 480

Pro Leu Gln Ala Ala Ile Gly Val Val Gln Lys Gly Leu Arg Pro Thr
                485                 490                 495

Ile Pro Lys His Thr Pro Pro Arg Leu Ala Glu Leu Leu Glu Thr Cys
                500                 505                 510

Trp Gln Gln Asp Pro Thr Ser Arg Pro Asp Phe Ser Glu Ile Val Asp
            515                 520                 525

Ile Leu Gln Gln Ile Ala Lys Glu Val Gly Asp Glu Arg Ala Asp Arg
            530                 535                 540

Cys Lys Glu Lys Ser Ala Gly Gly Phe Phe Ser Ala Leu Arg Arg Gly
545                 550                 555                 560

His His

<210> SEQ ID NO 4
<211> LENGTH: 300
<212> TYPE: DNA
<213> ORGANISM: Nicotiana tabacum

<400> SEQUENCE: 4
aacaggtgta atgacggcag aaaccgggac ttatagatgg atggccccgg aggtaataga      60
acacaagccc tacgatcaca aagcagatgt attcagtttt ggggttgtgc tatgggagtt     120
gctgacaggg aagcttccat atgagtactt gaccccattg caagctgcta ttggagtggt     180
ccagaagggt ttgcgaccaa ctatacccaa gcacactcct cccagacttg ctgagctgct     240
agagacatgc tggcaacaag acccgacatc caggcctgac ttttctgaaa tagtagatat     300

<210> SEQ ID NO 5
<211> LENGTH: 20
<212> TYPE: DNA
<213> ORGANISM: Artificial Sequence
<220> FEATURE:
<223> OTHER INFORMATION: Primer sequence

<400> SEQUENCE: 5
tgagtaaggt taccgaattc                                                   20

<210> SEQ ID NO 6
<211> LENGTH: 20
<212> TYPE: DNA
<213> ORGANISM: Artificial sequence
<220> FEATURE:
<223> OTHER INFORMATION: Primer sequence

<400> SEQUENCE: 6
ctcgaggccc gggcatgtcc                                                   20
```

METHOD OF MODULATING THE ALKALOID CONTENT OF A PLANT

CROSS REFERENCE TO RELATED APPLICATIONS

This is a U.S. National Phase application claiming priority to PCT/GB2019/053101, filed Oct. 31, 2019, the entire contents of which are hereby expressly incorporated by reference in its entirety including, without limitation, the specification, claims, and abstract, as well as any figures, tables, or drawings thereof.

FIELD OF THE INVENTION

The present invention relates to methods of modulating the alkaloid content e.g. nicotine content of a plant or part thereof. The invention also extends to methods of modulating the expression and/or activity of polypeptides encoded by genes which modulate alkaloid content within plants. Alternatively, the invention provides methods of modulating the expression and/or activity of genes which encode polypeptides which modulate alkaloid content within plants. The invention also extends to constructs, which can be used to modulate the polypeptides, plant cells transformed with such constructs, and to transgenic plants themselves. The invention also relates to the use of harvested leaves from such transgenic plants which have been transformed with a genetic construct for modulating alkaloid content, and smoking articles (e.g. combustible smoking articles) comprising such leaves.

BACKGROUND

Alkaloids are a group of naturally occurring compounds which mostly contain basic nitrogen atoms and are produced by a large variety of organisms including bacteria, fungi, plants and animals.

Alkaloids may be classified according to the similarity of the carbon skeleton e.g. indole-, isoquinoline- and pyridine-like. Pyridine derivatives are one class of monomeric alkaloids; this class includes simple derivatives of pyridine, polycyclic condensed and noncondensing pyridine derivatives and sesquiterpene pyridine derivatives. Examples are nicotine, nornicotine, anabasine, myosmine and anatabine.

Most of the known biological functions of alkaloids are related to protection. Neuroactive molecules, like caffeine, cocaine, morphine, and nicotine, act as defence compounds against invading predators. The accumulation of these alkaloids is the result of signal transduction cascades that monitor gene expression, enzyme activities, and alkaloid concentrations. The fine-tuning of alkaloid content in the plant involves negative feedback loops and degradative pathways.

Nicotine occurs naturally in several varieties of plant but is found at the highest level in the tobacco plant. Cultivated tobacco produce 2-4% alkaloids of total dry weight. Nicotine is produced in wild and cultivated *Nicotiana* species and it plays an important role in plant defence against herbivores and insects (Voelckel et al. 2001, incorporated herein by reference), accounting for ~90% of the total alkaloid content. The remaining 10% of the alkaloid pool is mostly constituted by the structurally related compounds nornicotine, anatabine, anabasine and pseudoxynicotine (PON).

The regulation of alkaloid content in tobacco is complex. Several factors including genotype, environment, fertilization and agronomic practices (e.g. topping) affect alkaloid levels in tobacco plants. Some key regulators of nicotine biosynthesis are well characterized, for example putrescine N-methyltransferase (PMT), which plays a pivotal role in this pathway, is activated by members of the ethylene responsive factor (ERF) superfamily, the largest transcription factor family in the tobacco genome (Rushton et al., 2008 incorporated herein by reference). Other transcription factors that induce alkaloid biosynthesis belong to the MYC2-like basic helix-loop-helix (bHLH) family. MYC2-like bHLHs regulate alkaloid levels directly, through the Gbox-mediated binding and activation of alkaloid structural genes, and indirectly, through the activation of ERFs.

Modifying alkaloid content in plants (e.g. tobacco) can have several commercial advantages. For example, decreasing total alkaloid content in plants can increase the value of said plant as a biomass resource. For example, modifying alkaloid content may comprise reducing the alkaloid content e.g. nicotine content of tobacco plants. Tobacco plants and products with reduced nicotine may be desirable in view of the potential regulation of "nicotine ceilings" i.e. average upper limits of nicotine in tobacco products. Alternatively, increasing alkaloid content in plants e.g. tobacco plants can help to protect plants against insects and herbivores. There remains a need for plants with modulated alkaloid content, for example with modulated (e.g. reduced) nicotine content, with maintained or improved commercially desirable traits and methods for making the same.

Tobacco pyridine alkaloids are precursors of tobacco-specific nitrosamines (TSNAs) that form during the post-harvest leaf curing. The four primary TSNAs found in cured tobacco leaves are N'-nitrosonornicotine (NNN), N'nitrosoanatabine (NAT), N'-nitrosoanabasine (NAB) and 4-(methylnitrosamino)-1-(3-pyridyl)-1-butanone (NNK).

As described in the Examples, the inventors sought to investigate genes responsible for alkaloid synthesis, with the aim of modulating alkaloid content in plants, e.g. decreasing nicotine content in tobacco plants.

SUMMARY OF THE INVENTION

It has been surprisingly found that by modulating the activity or expression of a protein kinase e.g. a serine-threonine protein kinase gene as taught herein, the alkaloid content and/or TSNA content or precursor of TSNA content of plants can be modulated. The protein kinase e.g. serine-threonine protein kinase as taught herein acts as a negative regulator of nicotine biosynthesis.

According to the present invention, tobacco products with modulated alkaloid content and commercially desirable traits sought after by consumers of tobacco products can be produced. In some instances, consumers may desire a product with low levels of alkaloid content e.g. low levels of nicotine content.

The present invention may be particularly useful in the field of plant molecular farming, where plants (such as tobacco and other *Nicotiana* spp.) are used for the production of proteins, peptides, and metabolites e.g. for the production of therapeutics and pharmaceuticals such as antibiotics, virus like particles, or neutraceuticals or small molecules. Tobacco has been used for the development of an HIV-neutralising antibody in an EU-funded project called PharmPlant and Medicago Inc., Canada have worked on a tobacco-based platform for the production of virus-like particles for flu vaccine manufacture.

Thus a plant according to the present invention may be used for molecular farming to reduce or eliminate the presence of nicotine and/or other nicotinic alkaloids. The use of a low nicotine plant or rootsock is beneficial in molecular farming and would reduce downstream processing costs associated with purification.

In other instances it may be desirable to produce plants with high alkaloid levels e.g. high levels of nicotine content so that nicotine may be purified from the tobacco plant to produce a pure nicotine product for example for use in devices which utilize liquid containing nicotine (e.g. e-cigarettes) or within tobacco heating devices. For example, the production of plants with leaves containing high levels of nicotine could reduce costs of nicotine extraction for the production of e-liquids for e-cigarettes.

The present inventors have surprisingly determined a method for modulating the alkaloid content, e.g. nicotine content, of a plant (e.g. a tobacco plant) by modulating the activity or expression of a protein kinase which acts as a negative regulator of nicotine in tobacco. The alkaloid content (e.g. nicotine content) of a plant (e.g. tobacco plant) may be decreased by increasing the activity or expression of a protein kinase or may be increased by decreasing the activity or expression of a protein kinase. Prior to the present invention it had not been known that modulation of the activity or expression of a protein kinase as described herein could be used to modulate (e.g. decrease) alkaloid content.

in one aspect, the present invention provides a method of modulating (e.g. decreasing) the alkaloid content of a plant or a part thereof, the method comprising modifying said plant by modulating (e.g. increasing) the activity or expression of a protein kinase which:

a) comprises an amino acid sequence as set out in SEQ ID No. 3; or a functional variant or functional fragment or orthologue of SEQ ID No. 3; or a sequence which has at least 80% identity to SEQ ID No. 3; or b) is encoded by a nucleotide sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2.

In another aspect, the present invention provides a method of modulating (e.g. decreasing) the content of a tobacco specific nitrosamine (TSNA) or a precursor of a TSNA in a tobacco plant or plant part thereof, the method comprising modifying said plant by modulating (e.g. increasing) the activity or expression of a protein kinase which:

a) comprises an amino acid sequence as set out in SEQ ID No. 3; or a functional variant or functional fragment or orthologue of SEQ ID No. 3; or a sequence which has at least 80% identity to SEQ ID No. 3; or b) is encoded by a nucleotide sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2.

In a further aspect, the present invention provides the use of at least one gene encoding a protein kinase for modulating alkaloid content of a cell or plant or part thereof or a cell culture; wherein the protein kinase:

a) comprises an amino acid sequence as set out in SEQ ID No. 3; or a functional variant or functional fragment or orthologue of SEQ ID No. 3; or a sequence which has at least 80% identity to SEQ ID No. 3; or b) is encoded by a nucleotide sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2.

In yet another aspect, the present invention provides a method for producing a plant or part thereof, a cell or cell culture, a plant propagation material, a leaf, a cut harvested leaf, a processed leaf or a cut and processed leaf which has modulated (e.g. decreased) alkaloid content, the method comprising modifying said plant or part thereof or cell or cell culture to modulate the activity or expression of a protein kinase which:

a) comprises an amino acid sequence as set out in SEQ ID No. 3; or a functional variant or functional fragment or orthologue of SEQ ID No. 3; or a sequence which has at least 80% identity to SEQ ID No. 3; or b) is encoded by a nucleotide sequence: as set out in SEQ ID No. 1 or 2; or a functional variant or functional fragment or orthologue of SEQ ID No. 1 or 2; or a nucleic acid sequence which has at least 80% identity to SEQ ID No. 1 or 2.

The present invention provides a method of modulating (e.g. decreasing) the alkaloid content of a plant or a part thereof, the method comprising modifying said plant by modulating (e.g. increasing) the activity or expression of at least one gene encoding a protein kinase.

In another aspect, the present invention provides a method of modulating (e.g. decreasing) the content of a tobacco specific nitrosamine (TSNA) or a precursor of a TSNA in a tobacco plant or plant part thereof, the method comprising modifying said plant by modulating (e.g. increasing) the activity or expression of at least one gene encoding a protein kinase.

The at least one gene may encode a protein kinase polypeptide which comprises an amino acid sequence as set out in SEQ ID No. 3, or a functional variant or functional fragment or orthologue thereof, or a sequence which has at least 80% identity to SEQ ID No. 3; or the at least one gene encoding a protein kinase may comprise a nucleotide sequence as set out in SEQ ID No. 1 or 2 or a functional variant or functional fragment or orthologue of SEQ ID No. 1 or 2, or a nucleic acid sequence which has at least 80% identity to SEQ ID No. 1 or 2.

In another aspect, the present invention provides the use of at least one gene encoding a protein kinase for modulating (e.g. decreasing) alkaloid content of a cell or plant or part thereof or a cell culture; wherein the at least one gene encodes a protein kinase polypeptide which comprises an amino acid sequence as set out in SEQ ID No. 3, or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1 or 2; or a functional variant or functional fragment or orthologue of SEQ ID No. 1 or 2, or a nucleic acid sequence which has at least 80% identity to SEQ ID No. 1 or 2.

In yet another aspect, there is provided a method for producing a plant or part thereof, a cell or cell culture, a plant propagation material, a leaf, a cut harvested leaf, a processed leaf or a cut and processed leaf which has modulated (e.g. decreased) alkaloid content (e.g. decreased nicotine content), the method comprising modifying said plant or cell culture to modulate (e.g. increase) the activity or expression of at least one gene encoding a protein kinase, wherein the at least one gene encoding a protein kinase polypeptide comprises: an amino acid sequence as set out in SEQ ID No. 3; or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1 or 2; or a functional variant or functional fragment or orthologue of SEQ ID No. 1 or 2 or a nucleic acid sequence which has at least 80% identity to SEQ ID No. 1 or 2.

The alkaloid content may be modulated (e.g. decreased) in comparison to a plant or cell culture which has not been modified to modulate (e.g. increase) the activity or expression of the at least one gene encoding a protein kinase.

In a further aspect, there is provided a plant or part thereof or a cell or cell culture which has been modified to achieve a modulation (e.g. decrease) in alkaloid content in comparison to an unmodified plant or unmodified cell culture, wherein the modification is the modulation of the activity or expression of a protein kinase which:

a) comprises an amino acid sequence as set out in SEQ ID No. 3; or a functional variant or functional fragment or orthologue of SEQ ID No. 3; or a sequence which has at least 80% identity to SEQ ID No. 3; or b) is encoded by a nucleotide sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2.

In a further aspect, there is provided a plant or part thereof or a cell or cell culture which has been modified to achieve a modulation (e.g. decrease) in alkaloid content (e.g. nicotine content) in comparison to an unmodified plant or unmodified cell culture, wherein the modification is the modulation of the activity or expression of at least one gene encoding a protein kinase polypeptide which comprises: an amino acid sequence as set out in SEQ ID No. 3, or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1 or 2; or a functional variant or functional fragment or orthologue of 1 or 2, or a nucleic acid sequence which has at least 80% identity to SEQ ID No. 1 or 2.

In another aspect, there is provided a plant propagation material obtainable from a plant according to the present invention, or from a plant or cell or cell culture produced by the method according to the present invention.

In one aspect, the alkaloid content of the plant or part thereof or cell or cell culture may be decreased in comparison to a plant or part thereof or cell or cell culture which has not been modified in accordance with the present invention to modulate the activity or expression of at least one protein kinase. Suitably, the activity or expression of at least one protein kinase may be increased in comparison to a plant or part thereof or cell or cell culture which has not been modified to modulate the activity or expression of the protein kinase.

In another aspect, the alkaloid content of the plant or part thereof or cell or cell culture may be increased in comparison to a plant or part thereof or cell or cell culture which has not been modified in accordance with the present invention to modulate the activity or expression of the at least one protein kinase. Suitably, the activity or expression of at least one protein kinase may be decreased in comparison to a plant or part thereof or cell or cell culture which has not been modified to modulate the activity or expression of the at least one protein kinase.

Suitably, the total alkaloid content of the plant or cell culture may be modulated (e.g. decreased).

The content of one or more alkaloids selected from nicotine, anabasine, anatabine, nornicotine, PON and myosmine may be modulated (e.g. decreased), preferably the content of nicotine is modulated (e.g. decreased).

The plant or part thereof or plant cell may be from the Solanaceae family. The plant or part thereof or plant cell may be from the *Solanum* genus. The plant or part thereof or plant cell may be from the *Nicotiana* genus.

In one aspect, the nicotine content of a tobacco plant or part thereof or tobacco cell or tobacco cell culture, or a plant propagation material according to the present invention is modulated in comparison to a comparable product. Suitably, the nicotine content may be decreased in comparison to a comparable product.

In another aspect, there is provided the use of a plant or part thereof or cell or cell culture according to the present invention, or of a plant produced by the method the present invention to breed a plant.

In another aspect, there is provided the use of a plant or part thereof or a cell or cell culture according to the present invention, or of a plant produced by the method according to the present invention for production of a product. Suitably, the product may be a tobacco industry product.

In another aspect, there is provided the use of a plant or part thereof according to the present invention, or of a plant produced by the method according to the present invention to grow a crop.

In another aspect, there is provided the use of a plant or part thereof according to the present invention, or of a plant produced by a method the present invention to produce a leaf.

In a further aspect, there is provided a harvested leaf of a plant the present invention, or obtainable (e.g. obtained) from a plant propagated from a propagation material the present invention, or obtainable (e.g. obtained) from a plant obtained by a use the present invention, or obtainable f (e.g. obtained) rom a plant produced by a method the present invention.

The harvested leaf of a plant may be a cut harvested leaf.

In yet another aspect, there is provided a processed leaf, preferably a processed tobacco leaf, preferably a non-viable processed tobacco leaf:

obtainable (e.g. obtained) from a plant obtainable from a use according to the present invention;

obtainable (e.g. obtained) by processing a plant according to the present invention;

obtainable (e.g. obtained) from a plant propagated from a plant propagation material according to the present invention; or obtainable (e.g. obtained) by processing a harvested leaf of a plant according to the present invention; or obtainable (e.g. obtained) from a plant produced by the method according to the present invention.

The leaf may be processed by curing, fermenting, pasteurising or a combination thereof.

Suitably, the processed leaf may be a cut processed leaf.

In a further aspect, there is provided cured tobacco material made from a plant or a part thereof according to the present invention or an extract thereof.

In another aspect, there is provided a tobacco blend comprising said cured tobacco material according to the present invention.

In another aspect, there is provided a tobacco industry product prepared from:

a tobacco plant according to the present invention, or a part thereof or a tobacco cell or tobacco cell culture according to the present invention;

a tobacco plant or part thereof propagated from a tobacco plant propagation material according to the present invention;

a harvested leaf of a plant according to the present invention, wherein the plant is tobacco;

a processed leaf according to the present invention, wherein the plant is tobacco; or a plant produced by a method the present invention.

The tobacco industry product may be a combustible smoking article. The tobacco product may be a smokeless tobacco product. The tobacco product may be a non-combustible aerosol provision system such as a tobacco heating device or an aerosol-generating device.

In a further aspect, there is provided the use of a tobacco cell according to the present invention for modulating alkaloid content in cell cultures.

In another aspect, there is provided a combustible smoking article, non-combustible aerosol provisioning system, smokeless tobacco product or tobacco heating device comprising a plant or a part thereof according to the present invention or an extract (e.g. a tobacco extract) thereof or a tobacco cell culture according to the present invention; or a cured tobacco material according to the present invention; or a tobacco blend according to the present invention.

In another aspect, there is provided the use of a nucleotide sequence of at least one gene encoding a protein kinase which comprises an amino acid sequence as set out in SEQ ID No. 3; or a functional variant or functional fragment or orthologue thereof, or a sequence which has at least 80% identity to SEQ ID No. 3, to select a plant having modulated (e.g. reduced) alkaloid content and/or modulated (e.g. reduced) content of TSNA or a precursor of a TSNA. In another aspect, the present invention provides a mutant of a plant carrying a heritable mutation in a nucleotide sequence which a) encodes an amino acid sequence as set out in SEQ ID No. 3; or a functional variant or functional fragment or orthologue of SEQ ID No. 3; or a sequence which has at least 80% identity to SEQ ID No. 3; or b) comprises a sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2;

wherein said heritable mutation modulates (e.g. decreases) the activity or expression of the at least one gene encoding a protein kinase and wherein the mutant plant has modulated (e.g. decreased) alkaloid content and/or modulated content of a tobacco specific nitrosamine (TSNA) or a precursor of a TSNA relative to a comparable plant which does not carry said heritable mutation.

In a further aspect, there is provided a mutant of a plant carrying a heritable mutation in a nucleotide sequence of at least one gene encoding a protein kinase, wherein the gene is selected from a nucleotide sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2, wherein said heritable mutation modulates (e.g. decreases) the activity or expression of the at least one gene encoding a protein kinase and wherein the mutant plant has modulated (e.g. decreased) alkaloid content and/or modulated (e.g. decreased) content of a tobacco specific nitrosamine (TSNA) or a precursor of a TSNA relative to a comparable plant which does not carry said heritable mutation.

In another aspect, there is provided progeny or seed of a mutant plant which carries the heritable mutation according to the present invention.

In another aspect, there is provided a harvested leaf, a processed leaf or cured tobacco material produced from a plant comprising a modification in a nucleotide sequence which:

a) encodes an amino acid sequence as set out in SEQ ID No. 3; or a functional variant or functional fragment or orthologue of SEQ ID No. 3; or a sequence which has at least 80% identity to SEQ ID No. 3; or b) comprises a sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2;

wherein said modification modulates (e.g. decreases) the activity or expression of the at least one gene encoding a protein kinase and wherein said plant has modulated (e.g. decreased) alkaloid content and/or modulated content of a tobacco specific nitrosamine (TSNA) or a precursor of a TSNA relative to a comparable plant which does not carry said modification in said protein kinase.

In a further aspect, there is provided a harvested leaf, a processed leaf or cured tobacco material produced from a plant comprising a modification in a nucleotide sequence of at least one gene encoding a protein kinase, wherein the at least one gene is selected from: a nucleotide sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2; wherein said modification modulates (e.g. increases) the activity or expression of the at least one gene encoding a protein kinase and wherein said plant has modulated (e.g. decreased) alkaloid content and/or modulated content of a tobacco specific nitrosamine (TSNA) or a precursor of a TSNA relative to a comparable plant which does not carry said modification in the at least one gene encoding a protein kinase.

BRIEF DESCRIPTION OF THE DRAWINGS

Embodiments of the invention will now be described, by way of example only, with reference to the accompanying drawings, in which:

FIGS. 3A-C show the genomic sequence of Nitab4.5_0003679 g0060.2—SEQ ID No. 1—encoding a protein kinase from *Nicotiana tabacum* according to the present invention.

FIG. 4 shows the cDNA sequence of Nitab4.5_0003679 g0060.2—SEQ ID No. 2—encoding a protein kinase from *Nicotiana tabacum* according to the present invention.

FIG. 5 shows the polypeptide sequence of Nitab4.5_0003679 g0060.2—SEQ ID No. 3—encoding a protein kinase from *Nicotiana tabacum* according to the present invention.

FIG. 6 shows SEQ ID NO. 4 which corresponds to the 248-nucleotide cDNA fragment in Example 2.

SEQUENCE LISTING

Figure 1:
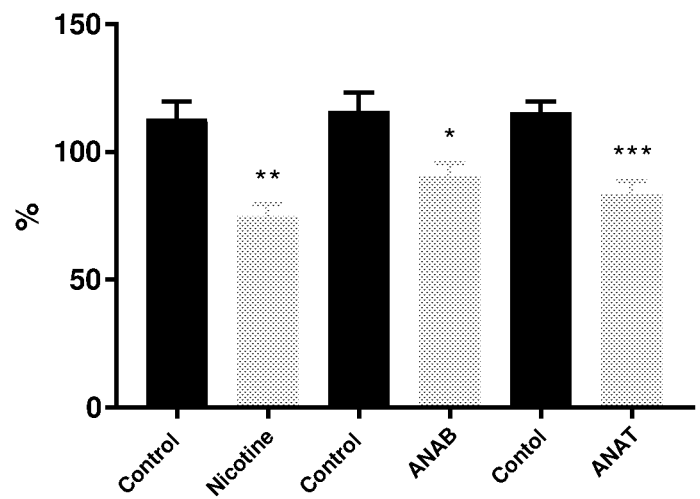
FIG. 1 shows the nicotine content of 5-week-old TN90 leaves expressing Nitab4.5_0003679 g0060.2 (SEQ ID No. 1). Nicotine content is represented relative to control and comprises three biological replicates analysed by t-test. Values are shown as means±SEM. Asterisks indicate statistical significance of P value≤0.001.

A summary of sequence identifiers used throughout the subject specification and the corresponding sequence listing is provided wherein:

SEQ ID No. 1 corresponds to the nucleotide sequence encoding the gene referred to as Nitab4.5_0003679 g0060.2.

SEQ ID No. 2 corresponds to the cDNA sequence of Nitab4.5_0003679 g0060.2.

SEQ ID No. 3 corresponds to the protein sequence encoded by Nitab4.5_0003679 g0060.2.

SEQ ID No. 4 corresponds to the 248-nucleotide cDNA fragment in Example 2.

SEQ ID No. 5 is a primer used in Example 2.

SEQ ID No. 6 is a primer used in Example 2.

DETAILED DESCRIPTION

For the first time the present inventors have shown that by modulating the activity or expression of at least one protein kinase gene in a plant (e.g. a tobacco plant), the alkaloid and/or TSNA content of the plant can be modulated.

The present invention provides a method of modulating (e.g. decreasing) the alkaloid content of a plant or a part thereof, the method comprising modifying said plant by modulating (e.g. increasing) the activity or expression of at least one gene encoding a protein kinase.

Also provided is a method of modulating (e.g. decreasing) the content of a tobacco specific nitrosamine (TSNA) or a precursor of a TSNA in a tobacco plant or plant part thereof, the method comprising modifying said plant by modulating (e.g. increasing) the activity or expression of at least one gene encoding a protein kinase.

The at least one protein kinase gene is selected from at least one gene encoding a protein kinase polypeptide which comprises an amino acid sequence as set out in SEQ ID No. 3, or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1 or 2 or a functional variant or functional fragment or orthologue of SEQ ID No. 1 or 2, or a nucleic acid sequence which has at least 80% identity to SEQ ID No. 1 or 2.

Suitably, the at least one protein kinase gene may be one, or two, or three, or four, or five, or six, or seven, or eight, or nine or ten genes selected from the group comprising: genes encoding polypeptides comprising an amino acid sequence as set out in SEQ ID No. 3, or a functional variant or functional fragment or orthologue thereof, or a sequence which has at least 80% identity to SEQ ID No. 3; or genes comprising a nucleotide sequence as set out in SEQ ID No. 1 or 2, or a functional variant or functional fragment or orthologue of SEQ ID No. 1 or 2 or a nucleic acid sequence which has at least 80% identity to SEQ ID No. 1 or 2.

The at least one protein kinase gene encodes a polypeptide which comprises an amino acid sequence as set out in: SEQ ID No. 3 or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1, or 2 or a functional variant or functional fragment or orthologue of SEQ ID No. 1 or 2; or a nucleic acid sequence which has at least 80% identity to SEQ ID No. 1 or 2.

In one aspect, the activity or expression of at least one further gene is modulated. Suitably, at least two, at least three, at least four, at least five, at least six, at least seven, at least eight, at least nine additional genes selected from SEQ ID No. 1 or 2 or a functional variant or functional fragment or orthologue of SEQ ID No. 1 or 2 or a nucleic acid sequence which has at least 80% identity to SEQ ID No. 1 or 2 may also be modulated.

The "expression" of a protein kinase gene may refer to the level of transcription, translation i.e. protein expression.

The "activity" of a protein kinase gene relates to its ability to modify a protein by chemically adding phosphate group. Phosphorylation may result in a functional change of the target protein which changes its enzyme activity, cellular localisation, or interaction with other proteins.

The activity of a protein kinase may be determined by measuring the phosphorylation of a target protein, for example by using phospho-specific antibodies in a western blot.

Measurement of the level or amount of a gene product may be carried out by any suitable method, for example including comparison of mRNA transcript levels, protein or peptide levels, and/or phenotype of a plant, between a modified plant and comparable plant which has not been modified according to the present invention.

In one embodiment, the activity of a protein kinase or in other words, the ability of a protein to function as a protein kinase may be determined by measuring the phosphorylation status of a target protein using mass spectrometry to identify the phosphoproteome, using a pan-phospho-antibody or an antibody specific for the phosphorylation site to be analysed or electrophoresis using a gel comprising a phosphate-binding tag acrylamide and comparing this with a control protein which is known not to be a protein kinase. The ability of a protein to function as a protein kinase may be determined by measuring the phosphorylation status of a target such as myelin basic protein (MyBp) and a phospho-protein gel stain as described in Martin et al., Proteomics. 2003 July; 3(7):1244-55 (incorporated herein by reference). Alternatively, the phosphorylation status of a target protein may be measure using a phospho-specific antibody and western blot or fluorometric detection.

The term "a comparable product" as defined herein would be one derived from a plant (e.g. a tobacco plant) which had not been modified according to the present invention, but in which all other relevant features were the same (e.g. plant species, growing conditions, method of processing the plant, e.g. tobacco, etc.). The comparable product according to the present invention may mean a plant (e.g. a tobacco plant) or a part thereof, such as a leaf (e.g. a tobacco leaf), a harvested leaf (e.g. a harvested tobacco leaf), a cut harvested leaf (e.g. a cut harvested tobacco leaf), a processed leaf (e.g. a processed tobacco leaf) or plant propagation material (e.g. tobacco plant propagation material), or a product comprising said plant or part therefore, e.g. a tobacco product or combinations thereof obtainable or obtained from a plant which has not been modified in accordance with the present invention, e.g. to modulate the activity or expression of a protein kinase gene. In one embodiment a comparable product is one which does not comprise a protein kinase gene whose activity or expression has been modulated.

The term "modifying" or "modified" as used herein means a plant (e.g. a tobacco plant) that has been altered or changed. The present invention comprises the modification of plants using techniques for genetic modification of plants or non-genetic modification of plants. Such methods are well known in the art and examples of genetic modification techniques include transformation, transgenics, cisgenics, and gene editing methods. Examples of non-genetic modification techniques include fast-neutron mutagenesis, chemical mutagenesis e.g. ethyl methanesulfonate (EMS) mutagenesis and modern population analysis approaches.

The term "unmodified plant" as defined herein would be a plant (e.g. a tobacco plant) which had not been modified according to the present invention, to modulate the activity or expression of a protein kinase gene and in which all other relevant features were the same (e.g. plant species, growing conditions, method of processing tobacco, etc.). In one embodiment an unmodified plant is one which does not comprise a protein kinase gene whose activity or expression has been modulated.

Protein Kinase

A "Protein kinase" as used herein has its usual meaning in the art and refers to an enzyme which catalyses the transfer of a phosphate group to a target protein. A serine-threonine protein kinase is kinase enzyme that phosphorylates the OH group of serine or threonine amino acid residue. Suitably, a protein kinase comprises a protein kinase domain.

A "protein kinase gene" as used herein refers to a gene which encodes a protein kinase. Phosphorylation may result in functional change of the target protein which changes its enzymatic activity, cellular localization, or interaction with other proteins.

The protein kinase comprises an amino acid sequence as set out in SEQ ID No. 3; or a functional variant or functional fragment or orthologue of SEQ ID No. 3; or a sequence which has at least 80% identity to SEQ ID No. 3; or b) is encoded by a nucleotide sequence as set out in SEQ ID No. 1 or 2; or a functional variant or functional fragment or orthologue of SEQ ID No. 1 or 2; or a nucleic acid sequence which has at least 80% identity to SEQ ID No. 1 or 2.

Suitably, the protein kinase may comprise an amino acid sequence which has at least 80% sequence identity to SEQ ID No. 3, or a homologue of SEQ ID No. 3 and comprises a protein kinase domain. Suitably, the protein kinase may comprise a lysine reside at the amino acid position which corresponds to position 308 when aligned with SEQ ID No. 3.

In one embodiment the protein kinase comprises an amino acid sequence shown as SEQ ID No. 3, or a sequence which has at least 80% identity thereto (preferably at least 85%, at least 90%, at least 95%, at least 97%, at least 98%, or at least 99% identity thereto). In one embodiment the protein kinase comprises an amino acid sequence shown as SEQ ID No. 3, or a sequence which has at least 80% identity thereto (preferably at least 85%, at least 90%, at least 95%, at least 97%, or at least 98%, or at least 99% identity thereto) and which comprises a protein kinase domain. Suitably, the protein kinase may comprise an amino acid sequence which has at least 80% sequence identity to SEQ ID No. 3, or a homologue of SEQ ID No. 3 and comprises a protein kinase domain. Suitably, the protein kinase may comprise a lysine reside at the amino acid position which corresponds to position 308 when aligned with SEQ ID No. 3.

In one embodiment a wild type protein kinase comprises the amino acid sequence set forth in SEQ ID NO. 3.

Suitably, the protein may be from *Nicotiana tabacum*.

In one embodiment the protein kinase is encoded by a polynucleotide sequence which comprises the sequence shown as SEQ ID No. 1 or SEQ ID No. 2, or a sequence which has at least 80% sequence identity thereto.

Suitably, the protein kinase for use according to the present invention may be encoded by a polynucleotide sequence which comprises the sequence shown as SEQ ID No. 1, or a sequence which has at least 80% sequence identity thereto (preferably at least 85%, preferably at least 90%, preferably at least 95%, at least 97%, or at least 99% identity thereto).

Suitably, the protein kinase for use according to the present invention may be encoded by a polynucleotide sequence which comprises the sequence shown as SEQ ID No. 2, or a sequence which has at least 80% sequence identity thereto (preferably at least 85%, preferably at least 90%, preferably at least 95%, at least 97%, or at least 99% identity thereto).

In one embodiment the protein kinase is encoded by a polynucleotide sequence selected from: SEQ ID No. 1 or SEQ ID No. 2.

Suitably, the wild type protein for use according to the present invention may be encoded by a polynucleotide sequence from *Nicotiana tabacum*.

In a preferred aspect the present invention provides a method of decreasing the alkaloid content of a plant or part thereof or plant cell, the method comprising modifying said plant by increasing the expression or activity of at least one protein kinase, wherein the protein kinase comprises the sequence shown as SEQ ID No. 3, or a sequence which has at least 80% identity thereto, or a functional variant or functional fragment or orthologue of SEQ ID No. 3; or wherein the at least one protein kinase comprises a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2.

In one aspect the present invention provides a method of decreasing the content of a tobacco specific nitrosamine (TSNA) or a precursor of a TSNA a plant or part thereof (e.g. leaf), the method comprising modifying said plant by increasing the expression or activity of at least one protein kinase, wherein the protein kinase comprises the sequence shown as SEQ ID No. 3, or a sequence which has at least 80% identity thereto, or a functional variant or functional fragment or orthologue of SEQ ID No. 3; or wherein the at least one protein kinase comprises a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2.

The term "increasing" (e.g. increasing the activity or expression of a protein kinase) as used herein means that the activity or expression of the protein kinase is higher compared with the activity or expression of the unmodified gene in a comparable product.

In some embodiments a modification which increases the activity or expression of at least one protein kinase and thereby decreases alkaloid content and/or TSNA content (or TSNA precursor content) is selected from the group consisting of:

increasing, promoting or augmenting transcription, translation or expression of the at least one protein kinase;

increasing synthesis of the polypeptide encoded by at least one protein kinase; or its release from intracellular stores; or decreasing the rate of degradation of the polypeptide encoded by at least one protein kinase gene.

Suitably the method may comprise transforming a cell of a plant (e.g. a tobacco plant) with a genetic construct which encodes at least one protein kinase comprising an amino acid sequence as set out in SEQ ID No. 3, or a functional variant or functional fragment or orthologue thereof, or a sequence which has at least 80% identity to SEQ ID No. 3; or which comprises a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2; or which comprises a nucleotide sequence which encodes a protein which is capable of promoting or augmenting at least one endogenous protein kinase gene. It will be appreciated that each of these options would result in an increased activity and expression of the polypeptide encoded by the at least one protein kinase gene. The method may comprise regenerating the plant from the transformed cell. There is provided use of genetic construct which is capable of increasing the activity and/or expression of a polypeptide encoded by at least one protein kinase gene for decreasing the alkaloid content and or TSNA content (or precursor thereto) in a plant transformed with the construct.

The genetic construct may: encode a polypeptide comprising the amino acid SEQ ID No. 3, or a functional variant or functional fragment or orthologue of SEQ ID No. 3, or a sequence which has at least 80% identity to SEQ ID No. 3; or comprise a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2.

In another embodiment, the invention relates to a method of decreasing the alkaloid content of a plant or part thereof and/or TSNA content (or precursor thereto) in a plant or plant part thereof, comprising modifying said plant by increasing the activity of at least one protein kinase as defined herein.

In one embodiment the activity of at least one gene encoding a protein kinase may be increased by introducing (or providing) a mutation to at least one gene encoding a protein kinase.

Suitably, the activity of at least one protein kinase may be increased by introducing a mutation to at least one gene encoding a protein kinase which comprises an amino acid sequence as set out in SEQ ID No. 3, or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1 or 2 or a functional variant or functional fragment or orthologue of SEQ ID No. 1 or 2 or a nucleic acid sequence which has at least 80% identity to SEQ ID No. 1 or 2.

In one embodiment, the protein kinase for use according to the present invention exhibits increased activity compared to an unmodified protein kinase. The protein kinase for use according to the present invention may exhibit at least about 1%, at least about 3%, at least about 5%, at least about 10%, at least about 20%, at least about 30%, at least about 40%, at least about 50%, at least about 60%, at least about 70%, at least about 80% or at least about 90% more phosphorylation activity compared to an unmodified protein kinase.

In one embodiment, the protein kinase comprises a mutation which renders the protein kinase constitutively active. In other words, the protein kinase continuously phosphorylates its target protein. In one embodiment, the activity of a protein kinase may be increased by overexpressing the protein kinase domain. Suitably, the activity of a protein kinase may be increased by providing multiple copies of the kinase domain.

The activity of a protein kinase may be increased by introducing a construct comprising a strong promoter and a nucleotide sequence encoding a protein kinase as described here. Alternatively, in one aspect, the endogenous promoter of a gene encoding a protein kinase as defined herein may be modified in such a way that it is more active in the modified plant than in an unmodified plant. Means for modifying an endogenous promoter can be, for example, gene editing methods, CRISPR Cas9, TALENS or zinc finger nucleases. Alternatively, additional copies of the endogenous gene encoding a protein kinase including its natural promoter may be incorporated into the plant.

In another aspect the present invention provides a method of increasing the alkaloid content of a plant or part thereof or plant cell, the method comprising modifying said plant by decreasing or inhibiting the expression or activity of at least one protein kinase.

In one aspect the present invention provides a method of increasing the alkaloid content of a plant or part thereof or plant cell, the method comprising modifying said plant by decreasing or inhibiting the expression or activity of at least one protein kinase comprising the sequence shown as SEQ ID No. 3, or a sequence which has at least 80% identity thereto or wherein the protein kinase is encoded by a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2.

In one aspect the present invention provides a method of increasing the content of a tobacco specific nitrosamine (TSNA) or a precursor of a TSNA a plant or part thereof (e.g. leaf), the method comprising modifying said plant by decreasing or inhibiting the expression or activity of at least one protein kinase as defined herein.

The term "inhibiting" (e.g. inhibiting the activity or expression of a protein kinase gene) as used herein means that the activity or expression of the protein kinase gene is lower or decreased compared with the gene activity or expression of the gene in a comparable product.

The expression of specific protein kinase genes can be measured by measuring transcription and/or translation of the gene. Methods for measuring transcription are well known in the art and include, amongst others, northern blot, RNA-Seq, in situ hybridization, DNA microarrays and RT-PCR. Alternatively, the expression of a gene may be measured indirectly by measuring the level of the gene product for example the protein encoded by said gene.

The activity of a protein kinase may be determined by measuring the phosphorylation status of a target protein e.g. the phosphorylation status of a protein comprising a serine or threonine amino acid residue which is capable of being phosphorylated (such as myelin basic protein).

In some embodiments the activity or expression of a protein kinase may be modulated (i.e. increased or decreased) by at least about 10% 20% 30%, or 40%, suitably at least about 50%, 60%, 70%, more suitably at least about 80%, 90%, 95% or 100% when compared to the activity or expression of a protein kinase gene in a plant (e.g. a tobacco plant) which has not been modified in accordance with the present invention.

Suitably, the expression or activity of the protein kinase may be reduced, partly inactivated, inhibited, eliminated, knocked out or lost such that the protein expression or function of the protein kinase gene is not detectable.

In one aspect, the at least one protein kinase gene is knocked out. In other words, the protein kinase gene has been rendered completely inoperative.

Any method known in the art for reducing or preventing the expression or activity of a protein may be used in the methods according to the present invention.

By way of example, the present method may comprise:
providing a mutation in a nucleic acid sequence which encodes a protein comprising the amino acid sequence shown as SEQ ID No. 3, or an amino acid sequence which has at least 80% sequence identity thereto;
providing a mutation in a regulatory region (e.g. a promoter or an enhancer) which contributes to controlling the expression of a protein comprising the amino acid sequence shown as SEQ ID No. 3, or an amino acid sequence which has at least 80% sequence identity thereto;
providing an antisense RNA, siRNA or miRNA which reduces the level of nucleic acid sequence encoding a protein comprising the amino acid sequence shown as SEQ ID No. 3, or an amino acid sequence which has at least 80% sequence identity thereto.

Each of the above approaches results in the reduction or prevention of expression or activity of: a protein comprising the amino acid sequence shown as SEQ ID No. 3, or an amino acid sequence which has at least 80% sequence identity thereto; or a gene encoding a protein kinase comprising a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2.

As used herein, the term "mutation" encompasses a natural genetic variant or an engineered variant. In particular, the term "mutation" refers to a variation in the nucleotide sequence encoding the amino acid sequence or in the amino acid sequence compared to the sequence shown as SEQ ID No. 3, or an amino acid sequence which has at least 80% (preferably at least 85%, preferably at least 90%, preferably at least 95%, preferably at least 97%, preferably at least 98%, preferably at least 99%) sequence identity thereto.

In one embodiment the mutation increases the alkaloid content of a plant.

In one embodiment, a method according to the present invention may comprise providing a nucleic acid sequence to a plant or part thereof or plant cell, wherein said nucleic acid results in the reduction or elimination of the expression or activity of a protein kinase gene. Suitably said nucleic acid sequence may be introduced to the plant or part thereof or cell. Suitably an endogenous nucleic acid sequence in the plant or part thereof or cell may be modified to encode the polypeptide according to the present invention (e.g. by gene editing).

In a preferred embodiment the plant or plant cell according to the present invention is homozygous. Suitably, the plant or plant cell may be homozygous for the modification e.g. inhibition or mutation.

In one embodiment, the plant or plant cell according to the present invention expresses only the modified e.g. mutated nucleic acid encoding the protein kinase. In other words, in some embodiments no endogenous (or endogenous and functional protein) is present in the plant according to the present invention. In other words, if any endogenous protein is present it is preferably in an inactive form.

In one embodiment the present method may comprise providing a mutation in the nucleic acid sequence shown as SEQ ID No. 1 or SEQ ID No. 2 or a nucleic acid sequence which has at least 80% identity thereto (preferably at least 85%, preferably at least 90%, preferably at least 95%, preferably at least 97%, preferably at least 98%, preferably at least 99%).

The mutation may alter the plant genome such that a nucleic acid sequence encoding a protein comprising the amino acid sequence shown as SEQ ID No. 3, or an amino acid sequence which has at least 80% (preferably at least 85%, preferably at least 90%, preferably at least 95%, preferably at least 97%, preferably at least 98%, preferably at least 99%) sequence identity thereto is completely or partially deleted or otherwise made non-functional.

The mutation may interrupt the nucleic acid sequence which encodes a protein comprising the amino acid sequence shown as SEQ ID No. 3, or an amino acid sequence which has at least 80% (preferably at least 85%, preferably at least 90%, preferably at least 95%, preferably at least 97%, preferably at least 98%, preferably at least 99%) sequence identity thereto.

The interruption may cause the nucleic acid sequence to not be transcribed and/or translated. The nucleic acid sequence may be interrupted, for example, by deleting or otherwise modifying the ATG start codon of the nucleic acid sequence such that translation of the protein is reduced or prevented.

The nucleic acid sequence may comprise one or more nucleotide change(s) that reduce or prevent expression of the protein or affect protein trafficking. For example, expression of the protein may be reduced or prevented by introduction of one or more pre-mature stop codons, a frame shift, a splice mutant or a non-tolerated amino acid substitution in the open reading frame. A premature stop codon refers to a mutation which introduces a stop codon into the open reading frame and prevents translation of the entire amino acid sequence. The premature stop codon may be a TAG ("amber"), TAA ("ochre"), or TGA ("opal" or "umber") codon.

A frame-shift mutation (also called a framing error or a reading frame shift) is a mutation caused by indels (insertions or deletions) of a number of nucleotides in a nucleic acid sequence that is not divisible by three. Due to the triplet nature of gene expression by codons, the insertion or deletion can change the reading frame, resulting in a completely different translation from the original. A frameshift mutation will often cause the reading of the codons after the mutation to code for different amino acids. The frameshift mutation will commonly result in the introduction of a premature stop codon.

A splice mutant inserts, deletes or changes a number of nucleotides in the specific site at which splicing takes place during the processing of precursor messenger RNA into mature messenger RNA. The deletion of the splicing site results in one or more introns remaining in mature mRNA and may lead to the production of abnormal proteins.

A non-tolerated amino acid substitution refers to a mutation which causes a non-synonymous amino acid substitution in the protein which results in reduced or ablated function of the protein. Any method known in the art for providing a mutation in a nucleic acid sequence may be used in the method according to the present invention. For example, homologous recombination may be used, in which a vector is created in which the relevant nucleic acid sequence(s) are mutated and used to transform plants or plant cells. Recombinant plants or plant cells expressing the mutated sequence may then be selected.

In one embodiment the mutation introduces a non-tolerated amino acid substitution in a protein comprising an amino acid sequence shown as SEQ ID No. 3, or a functional variant or functional fragment or orthologue of SEQ ID No. 3, or a sequence which has at least 80% (preferably at least 85%, preferably at least 90%, preferably at least 95%, preferably at least 97%, preferably at least 98%, preferably at least 99%) sequence identity to SEQ ID No. 3. In one embodiment the mutation reduces the activity of the protein in relation to a protein shown as SEQ ID No. 3.

In one embodiment the mutation does not alter the level or expression but reduces the activity of the protein in relation to a protein shown as SEQ ID No. 3.

The expression of a protein may be determined by measuring the presence of the protein using an antibody specific for the protein kinase, for example by western blot. The activity of a protein kinase may be measured using a phosphorylation assay as described herein.

Examples of a phosphorylation assays include the use of a mobility-shift of a protein measured by western blot.

In one embodiment of a phosphorylation assay, a test sample may be treated with a kinase inhibitor such as K251 which is a general kinase inhibitor, or tyrphostin A25 which specifically inhibits tyrosine kinases or selumetinib which specifically inhibits serine/threonine kinases. A control sample is not treated with a kinase inhibitor. The two samples are then analysed by western blot. If one of the proteins is a protein kinase, a mobility shift will be observed in the sample treated with a kinase inhibitor.

In another embodiment, site directed mutagenesis ay be performed on suspected phosphor sites and followed up with analysis using phosphoantibpdies.

In another embodiment, phosphorylation can be demonstrated by phosphoproteomics, for example by LC-MS/MS or LTQ-Orbitrap MS/MS.

In one embodiment, the activity of a protein kinase may be determined by measuring autophosphorylation and substrate phosphorylation. Autophosphorylation and substrate phosphorylation (myelin basic kinase) may be performed and detected using nonradioactive methods (ProQ Diamond and/or western with anti-phospho serine/threonine).

As used herein the term "protein kinase domain" refers to a structurally conserved protein domain which contains the catalytic function which transfers the gamma phosphate from nucleotide triphosphates to one or more amino acid residues in a protein substrate.

Protein kinase domains may be annotated or predicted by amino acid sequence comparison with known protein structures. For example, protein kinases and protein kinase domains may be identified by sequence alignment against SEQ ID No. 3, wherein the presence of amino acid residues of from about 281 to about 535 of SEQ ID No. 3 indicate a protein kinase domain.

In one embodiment, a protein kinase domain is a region of a protein which corresponds to amino acid 281 to 535 of SEQ ID No. 3.

In one embodiment, the protein kinase domain may contain a mutation which modulates the activity or expression of the at least one gene encoding a protein kinase. In one embodiment, the protein kinase domain may contain a mutation which increases the activity or expression of the at least one gene encoding a protein kinase. In one embodiment, the protein kinase domain may contain a mutation which decreases the activity or expression of the at least one gene encoding a protein kinase.

The mutation may be an insertion, substitution, deletion, a splice mutant or introduction of a codon encoding a non-tolerated amino acid substitution.

In one embodiment, the active site of the protein kinase domain may be mutated, modulating the activity of the protein kinase. Suitably, the conserved lysine residue at the active site of the protein kinase may be mutated. Suitably, the conserved lysine residue at the active site of the protein kinase is substituted for another amino acid. Suitably, the conserved lysine residue at the active site of the protein kinase may be deleted.

In one embodiment, the protein kinase may comprise a mutation or deletion in the activation site which modulates the activity or expression of the at least one gene encoding a protein kinase. In one embodiment, an activation site of a protein kinase comprises an amino acid sequence which corresponds to amino acid positions 287-291, 295, 306, 308, 339, 355-358, 362, 364, 402, 404, 406, 407, 409, 420, 423, or 428-441 of SEQ ID NO. 3. Suitably, the corresponding amino acid position may be determined by sequence alignment with SEQ ID No. 3. Suitably, the protein kinase may comprise a mutation or deletion in an activation site of a protein kinase which corresponds to amino acid positions 287-291, 295, 306, 308, 339, 355-358, 362, 364, 402, 404, 406, 407, 409, 420, 423 or 428-441 of SEQ ID NO. 3.

In one embodiment, the protein kinase comprises a mutation or deletion at the catalytic lysine residue. In one embodiment, the protein kinase comprises a mutation or deletion at the amino acid position which corresponds to amino acid position K308 of SEQ ID NO. 3. In one embodiment the protein kinase comprises a substitution mutation at the amino acid position which corresponds to amino acid position K308 of SEQ ID NO. 3. In other words, the amino acid which corresponds to position 308 of SEQ ID No. 3 is mutated from a lysine to another amino acid, rendering the protein kinase non functional.

In one embodiment, the protein kinase may comprise a mutation or deletion in the active site which modulates the activity or expression of the at least one gene encoding a protein kinase. In one embodiment, an active site of a protein kinase comprises an amino acid sequence which corresponds to amino acid positions 198-410 of SEQ ID NO. 3. Suitably, the corresponding amino acid position may be determined by sequence alignment with SEQ ID No. 3. Suitably, the protein kinase may comprise a mutation or deletion in an active site of a protein kinase which corresponds to amino acid positions 198-410 of SEQ ID NO. 3.

In one embodiment, the protein kinase may comprise a mutation or deletion in an activation loop which modulates the activity or expression of the at least one gene encoding a protein kinase. In one embodiment, an activation loop of a protein kinase comprises an amino acid sequence which corresponds to amino acid positions 419-427 or 437-441 of SEQ ID NO. 3. Suitably, the corresponding amino acid position may be determined by sequence alignment with SEQ ID No. 3. Suitably, the protein kinase may comprise a mutation or deletion in an activation loop of a protein kinase which corresponds to amino acid positions 419-427 or 437-441 of SEQ ID NO. 3.

In one embodiment, the nucleic acid sequence may be wholly or partially deleted. The deletion may be continuous, or may comprise a plurality of sections of sequence. The deletion preferably removes a sufficient amount of nucleotide sequence such that the nucleic acid sequence no longer encodes a functional protein. The deletion may be total, in which case 100% of the coding portion of the nucleic acid sequence is absent, when compared to the corresponding genome of a comparable unmodified plant. The deletion may, for example, remove at least 50, 60, 70, 80 or 90% of the coding portion of the nucleic acid sequence. Suitably, at least part of the protein may be deleted. The deletion may, for example, remove at least 10, 20, 30, 40, 50, 60, 70, 80 or 90% of the coding portion of the protein.

The deletion may remove at least part of the protein kinase domain.

The deletion may, for example, remove at least 10, 20, 30, 40, 50, 60, 70, 80 or 90% of the protein kinase domain.

Suitably, the deletion may remove at least 50 amino acids, at least 100 amino acids, at least 150, at least 200, at least 250, amino acids from the protein kinase domain. Suitably, the deletion may remove at least 50 amino acids, at least 100 amino acids, at least 150, at least 200, at least 250, amino acids from the protein kinase domain, wherein said domain corresponds to about amino acid residues 281 to 535 of SEQ ID No. 3.

In one embodiment, the deletion may remove at least 100 amino acids, at least 150, at least 200, at least 250, at least 300, at least 350 amino acids from the C terminus of the protein. Suitably, the mutated protein may be a truncated protein which lacks at least about 100 amino acids, at least about 150, at least about 200, at least about 250, at least about 300, at least about 350 amino acids corresponding to the amino acids from the C-terminal of SEQ ID No. 3 or a sequence which has at least 80% (preferably at least 85%, at least, at least 90%, at least 95%, at least 98%) sequence identity thereto to a truncated protein which lacks at least about 100 amino acids, at least about 150, at least about 200, at least about 250, at least about 300, at least about 350 amino acids corresponding to the amino acids from the C-terminal of SEQ ID No. 3.

Suitably, the mutated protein may be a truncated protein which lacks at least 100 amino acids, at least 150, at least 200, at least 250, at least 300, at least 350 amino acids corresponding to the amino acids from the C-terminal of SEQ ID No. 3 or a sequence which has at least 80% (preferably at least 85%, at least, at least 90%, at least 95%, at least 98%) sequence identity thereto to a truncated protein which lacks at least 100 amino acids, at least 150, at least 200, at least 250, at least 300, at least 350 amino acids corresponding to the amino acids from the C-terminal of SEQ ID No. 3.

The deletion may remove at least part of the active site of the protein kinase. The deletion may remove the active site of the protein kinase.

Methods for deletion of nucleic acid sequences in plants are known in the art. For example, homologous recombination may be used, in which a vector is created in which the relevant nucleic acid sequence(s) are missing and used to transform plants or plant cells. Recombinant plants or plant cells expressing the new portion of sequence may then be selected.

Plant cells transformed with a vector as described herein may be grown and maintained in accordance with well-known tissue culturing methods such as by culturing the cells in a suitable culture medium supplied with the necessary growth factors such as amino acids, plant hormones, vitamins, etc.

Modification of the nucleic acid sequence may be performed using targeted mutagenesis methods (also referred to as targeted nucleotide exchange (TNE) or oligo-directed mutagenesis (ODM)). Targeted mutagenesis methods include, without limitation, those employing zinc finger nucleases, TALENs (see WO2011/072246 and WO2010/079430), Cas9-like, Cas9/crRNA/tracrRNA, Cas9/gRNA, or other CRISPR systems (see WO 2014/071006 and WO2014/093622), meganucleases (see WO2007/047859 and WO2009/059195), or targeted mutagenesis methods employing mutagenic oligonucleotides, possibly containing chemically modified nucleotides for enhancing mutagenesis with sequence complementarity to the gene, into plant protoplasts (e.g., KeyBase® or TALENs).

Alternatively, mutagenesis systems such as TILLING (Targeting Induced Local Lesions IN Genomics; McCallum et al., 2000, Nat Biotech 18:455, and McCallum et al. 2000, Plant Physiol. 123, 439-442, both incorporated herein by reference) may be used to generate plant lines which comprise a gene encoding a protein having a mutation. TILLING uses traditional chemical mutagenesis (e.g. ethyl methanesulfonate (EMS) mutagenesis, which produces random mutations) followed by high-throughput screening for mutations. Thus, plants, seeds, cells and tissues comprising a gene having the desired mutation may be obtained.

The method may comprise the steps of mutagenizing plant seeds (e.g. EMS mutagenesis), pooling of plant individuals or DNA, PCR amplification of a region of interest, heteroduplex formation and high-throughput detection, identification of the mutant plant, sequencing of the mutant PCR product. It is understood that other mutagenesis and selection methods may equally be used to generate such modified plants. Seeds may, for example, be radiated or chemically treated and the plants may be screened for a modified phenotype.

Fast neutron deletion mutagenesis may be used in a reverse genetics sense (i.e. with PCR) to identify plant lines carrying a deletion in the endogenous gene. See for example Ohshima et al. (1998) Virology 213:472-481; Okubara et al. (1994) Genetics 137:867-874; and Quesada et al. (2000) Genetics 154:421-4315 which are incorporated herein by reference.

In another approach, dominant mutants may be used to trigger RNA silencing due to gene inversion and recombination of a duplicated gene locus. See for example Kusaba et al. (2003) Plant Cell 15:1455-1467 (incorporated herein by reference).

Modified plants may be distinguished from non-modified plants, i.e., wild type plants, by molecular methods, such as the mutation(s) present in the DNA, and by the modified phenotypic characteristics. The modified plants may be homozygous or heterozygous for the modification. Preferably modified plants are homozygous for the modification.

In one embodiment the method of reducing or preventing the expression of a protein comprising the amino acid sequence shown as SEQ ID No. 3, or an amino acid sequence which has at least 80% sequence identity thereto does not comprise treating the plant with a chemical (e.g. an agrochemical).

Other ways of reducing or preventing the expression or activity will be apparent to one skilled in the art and include the use of virus-induced gene silencing (VIGs), micro RNA silencing, RNAi, antisense, tDNA insertions, or dominant negative constructs (or antimorphic mutations).

In one embodiment the expression of a protein comprising the amino acid sequence shown as SEQ ID No. 3, or an amino acid sequence which has at least 80% sequence identity thereto may be reduced or eliminated by virus-induced gene silencing.

In one embodiment the expression of a protein comprising the amino acid sequence shown as SEQ ID No. 3, or an amino acid sequence which has at least 80% sequence identity thereto may be reduced or eliminated by microRNAs.

In one embodiment the expression of a protein comprising the amino acid sequence shown as SEQ ID No. 3, or an amino acid sequence which has at least 80% sequence identity thereto may be reduced or eliminated by RNAi.

In one embodiment the expression of a protein comprising the amino acid sequence shown as SEQ ID No. 3, or an amino acid sequence which has at least 80% sequence identity thereto may be reduced or eliminated by antisense suppression.

In one embodiment the expression of a protein comprising the amino acid sequence shown as SEQ ID No. 3, or an amino acid sequence which has at least 80% sequence identity thereto may be reduced or eliminated by sense suppression.

In one embodiment the expression of a protein comprising the amino acid sequence shown as SEQ ID No. 3, or an amino acid sequence which has at least 80% sequence identity thereto may be reduced or eliminated by tDNA insertions.

In one embodiment the expression of a protein comprising the amino acid sequence shown as SEQ ID No. 3, or an amino acid sequence which has at least 80% sequence identity thereto may be reduced or eliminated by a targeted mutagenesis based system.

In one embodiment the expression of a protein comprising the amino acid sequence shown as SEQ ID No. 3, or an amino acid sequence which has at least 80% sequence identity thereto may be reduced or eliminated by CRISPR based system.

In one embodiment the expression of a protein comprising the amino acid sequence shown as SEQ ID No. 3, or an amino acid sequence which has at least 80% sequence identity thereto may be reduced or eliminated by zinc finger nuclease, TALENs, meganucleases, mutagenic oligonucleotides or TILLING.

Alkaloid Content

In one embodiment the present invention provides a method of modulating the alkaloid content of a plant (e.g. a tobacco plant) or a part thereof, the method comprising modifying said plant by modulating the activity or expression of at least one protein kinase comprising the sequence shown as SEQ ID No. 3, or a sequence which has at least 80% identity thereto or wherein the at least one protein kinase is encoded by a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2.

The term "modulating" is used herein to mean either increasing or decreasing.

The term "increasing alkaloid content" is used herein to mean that the concentration and/or total alkaloid content in the product of the present invention (e.g. plant, part thereof (e.g. leaf), processed leaf or a product made from the plant (e.g. a tobacco product)) is higher compared with a comparable product which has not been modified in accordance with the present invention.

The term "decreasing alkaloid content" is used herein to mean that the concentration and/or total alkaloid content in the product of the present invention (e.g. plant, part thereof (e.g. leaf), processed leaf or a product made from the plant (e.g. a tobacco product)) is lower compared with a comparable product which has not be modified in accordance with the present invention.

In some embodiments, the modulation of alkaloid content refers to an increase in alkaloid content wherein the activity or expression of at least one protein kinase gene is decreased (or inhibited).

In some embodiments, the modulation of alkaloid content refers to a decrease in alkaloid content wherein the activity or expression of at least one protein kinase gene is increased (or in other words the protein is overexpressed).

In a further aspect, the alkaloid content is measured from leaves. In one aspect the alkaloid content is measured from green leaves. In a further aspect, the alkaloid content is measured from cured leaves, e.g. air-cured, flue-cured, fire-cured or sun-cured leaves. In a further aspect, the alkaloid content is measured from flue-cured leaves. In a further aspect, the alkaloid content is measured from air-cured leaves.

The term "alkaloid content" is used herein to mean the concentration and/or total amount of the entire group of compounds classified as alkaloids. Alkaloids typically present in tobacco include nicotine, anatabine, anabasine, myosmine and nornicotine. In one embodiment the content of one or more alkaloids selected from nicotine, anatabine, anabasine, myosmine and nornicotine is modulated. In one embodiment the content of one or more alkaloids selected from nicotine, anatabine, anabasine, myosmine and nornicotine is reduced. In one embodiment the content of one or more alkaloids selected from nicotine, anatabine, anabasine and nornicotine is increased. Suitably nicotine content may be modulated. In one embodiment, the nicotine content is reduced. In another embodiment, the nicotine content is increased.

Any method known in the art for determining the concentration and/or total content of alkaloids may be used. One preferred method for analysing alkaloid content involves the analysis by gas chromatography-flame ionization detection method (GC-FID).

In one embodiment there is provided a method for producing a plant (e.g. a tobacco plant) or part thereof, a plant propagation material (e.g. a tobacco plant propagation material), a cell (e.g. a tobacco cell), a leaf (e.g. a tobacco leaf), a harvested leaf (e.g. a harvested tobacco leaf), a cut harvested leaf (e.g. a cut harvested tobacco leaf), a processed leaf (e.g. a processed tobacco leaf), a cut and processed leaf (e.g. a cut and processed tobacco leaf), a product comprising said plant or part thereof (e.g. a tobacco product) or combinations thereof obtainable or obtained by a plant of the invention which has modulated alkaloid content, the method comprising modifying said plant to modulate the activity or expression of a protein kinase gene. The modulated alkaloid content may be determined by comparing the alkaloid content in the plant (e.g. tobacco plant) or part thereof, plant propagation material (e.g. tobacco plant propagation material), a cell (e.g. a tobacco cell), leaf (e.g. tobacco leaf), harvested leaf (e.g. a harvested tobacco leaf), cut harvested leaf (e.g. a cut harvested tobacco leaf), processed leaf (e.g. processed tobacco leaf), cut and processed leaf (e.g. cut and processed tobacco leaf), a product comprising a plant or part thereof of the present invention, e.g. a tobacco product, or combinations thereof with a comparable product.

Suitably the alkaloid content may be modulated in a plant, e.g. a tobacco plant e.g. modified tobacco plant. Suitably the alkaloid content may be modulated in a leaf (e.g. a tobacco leaf e.g. a tobacco leaf from a modified tobacco plant). Suitably the alkaloid content may be modulated in a harvested leaf (e.g. a harvested tobacco leaf from a modified tobacco plant). Suitably the alkaloid content may be modulated in a cut harvested leaf (e.g. a cut harvested tobacco leaf from a modified tobacco plant). Suitably the alkaloid content may be modulated in a processed leaf (e.g. a processed tobacco leaf e.g. a processed tobacco leaf from a modified tobacco plant). Suitably the alkaloid content may be modulated in a cut and processed leaf (e.g. a cut and processed tobacco leaf e.g. a cut and processed tobacco leaf from a modified tobacco plant). Suitably the alkaloid content may be modulated in a cured leaf (e.g. cured a tobacco leaf from a modified tobacco plant). Suitably the alkaloid content may be modulated in an extract of a green leaf (e.g. a green tobacco leaf from a modified tobacco plant). Suitably the alkaloid content may be modulated in a product comprising the plant of the present invention or part thereof (e.g. a tobacco product, for example a tobacco product produced from a modified tobacco plant or part thereof). Suitably the alkaloid content may be modulated in any one of the above products or combinations thereof. Suitably the modulation of alkaloid content described above may be an increase in alkaloid content. Suitably the modulation of alkaloid content described above may be a decrease in alkaloid content (e.g. a decrease in nicotine content).

In one embodiment the content of one or more alkaloids selected from nicotine, anatabine, anabasine, myosmine and nornicotine is decreased.

Suitably the modulation of alkaloid content described above may be a decrease in nicotine content.

In one embodiment the nicotine content of a modified plant (e.g. tobacco plant), plant propagation material (e.g. tobacco plant propagation material), leaf (e.g. tobacco leaf), harvested leaf (e.g. harvested tobacco leaf), cut harvested leaf (e.g. cut harvested tobacco leaf), processed leaf (e.g. processed tobacco leaf), cut and processed leaf (e.g. cut and processed tobacco leaf) or tobacco product from a modified tobacco plant is decreased.

In one embodiment the alkaloid content of a plant (e.g. tobacco plant) or part thereof may be modulated (e.g. decreased) by at least 2, 3, 4, 5, 6, 7, 8, 9 or 10, fold when compared to the alkaloid content of a plant (e.g. tobacco plant) or part thereof, respectively, which has not been modified to modulate the activity or expression of at least one protein kinase gene which has been grown under similar growth conditions. Suitably the alkaloid content may be modulated by about 2 fold to about 10 fold, preferably about 3 fold to about 10 fold, suitably about 3 fold to about 5 fold. Suitably the modification may be an increase or a decrease in alkaloid content. Suitably the modulation may be of one or more alkaloids selected from nicotine, anatabine, anabasine, myosmine and nornicotine. Suitably, the nicotine content is modulated.

In one embodiment of the invention the alkaloid content of a plant (e.g. a tobacco plant) or part thereof may be modulated by 1%, 2%, 5%, 8%, 10%, 12%, 15%, 20%, 25%, 30%, 40%, 50%, 60%, 70%, 80% or 90% in comparison to a plant (e.g. a tobacco plant) or part thereof which has not been modified according to the present invention. The modulation may be an increase or a decrease in alkaloid content when compared to an unmodified plant (e.g. a tobacco plant) or part thereof. Suitably the modulation may be of total alkaloid content. Suitably the modulation may be of one or more alkaloids selected from nicotine, anatabine, anabasine, myosmine and nornicotine. Suitably the modification is of nicotine content.

Tobacco-Specific Nitrosamine (TSNA) Content

In one embodiment the present invention provides a method of reducing the content of tobacco-specific nitrosamine (TSNA) or a precursor of a TSNA in a plant (e.g. a tobacco plant) or a part thereof, the method comprising modifying said plant by increasing the activity or expression of at least one protein kinase gene.

The TSNA may be measured in a processed tobacco, e.g. cured tobacco or reconstituted tobacco. In one embodiment the TSNA content is measured and/or modified (e.g. reduced) in a cured tobacco plant or part thereof (e.g. in cured tobacco leaf).

The term "tobacco-specific nitrosamine" or "TSNA" as used herein has its usual meaning in the art, namely a nitrosamine which is found only in tobacco products or other nicotine-containing products. Suitably the at least one tobacco-specific nitrosamine may be 4-(methylnitrosamino)-1-(3-pyridyl)-1-butanone (NNK), N'-nitrosonornicotine (NNN), N'-nitrosoanatabine (NAT) or N-nitrosoanabasine (NAB).

The term "precursor thereto" when used in relation to at least one tobacco-specific nitrosamine refers to one or more chemicals or compounds of a tobacco plant that give rise to the formation of a tobacco-specific nitrosamine or are involved in the nitrosation reaction leading to tobacco-specific nitrosamine production.

In one embodiment the TSNA is N'nitrosonornicotine (NNN) and/or the precursor is nornicotine.

In one embodiment the TSNA may be one or more of group selected from: N'-nitrosonornicotine (NNN), N'-nitrosoanatabine (NAT), N'-nitrosoanabasine (NAB) and 4-(methyl nitrosamino)-1-(3-pyridyl)-1-butanone (NNK). Suitably the at least one tobacco-specific nitrosamine may be NNK or NNN. In one embodiment the tobacco-specific nitrosamine is NNN.

In one embodiment the precursor of the TSNA is one or more of the group selected from nornicotine, anabasine, anatabine, and an oxidised derivative of nicotine such as pseudooxynicotine (PON).

In a preferred embodiment the precursor of the TSNA is nornicotine.

In one embodiment, the precursor of the TSNA may be PON. The precursor of the TSNA (e.g. NNN, NNK, NAB and/or NAT) may be measured in green tobacco leaf, e.g. prior to processing, e.g. prior to curing. In one embodiment the precursor of the TSNA (e.g. NNN, NNK, NAB and/or NAT) is measured and/or modified (e.g. reduced) in a green tobacco leaf, e.g. prior to processing, e.g. prior to curing.

In one embodiment carrying out a method and or use of the invention results in a reduction of at least one TSNA or a precursor thereto in the modified tobacco plant (or part thereof) when compared to a tobacco plant (or part thereof) which has not been modified in accordance with the present invention.

The terms "reducing at least one TSNA or precursor thereto" or "reduction of at least one TSNA or precursor thereto" are used herein to mean that the concentration and/or total content of the at least one TSNA or precursor thereto in the product, method or use of the invention is lower in relation to a comparable product, method or use. For example, a comparable tobacco industry product would be derived from a tobacco plant which had not been modified according to the present invention, but in which all other relevant features were the same (e.g. plant species, growing conditions, method of processing tobacco, etc).

Any method known in the art for determining the concentration and/or levels of at least one TSNA or precursor thereto may be used. In particular a method such may comprise the addition of deuterium labelled internal standard, an aqueous extraction and filtration, followed by analysis using reversed phase high performance liquid chromatography with tandem mass spectrometry (LC-MS/MS) may be used. Other examples for determining the concentration and/or level of a precursor to a tobacco-specific nitrosamine include a method such as the one detailed in CORESTA recommended method CRM-72: Determination of Tobacco Specific Nitrosamines in Tobacco and Tobacco Products by LC-MS/MS; CRM being developed into ISO/DIS 21766 or Wagner et al. Analytical Chemistry (2005), 77(4), 1001-1006 all of which are incorporated herein by reference.

Suitably the concentration and/or total content of the at least one tobacco-specific nitrosamine or precursor thereto may be reduced by carrying out a method and/or use of the present invention. Suitably the concentration and/or level of the at least one tobacco-specific nitrosamine or precursor thereto may be reduced in a tobacco plant of the invention (e.g. obtainable or obtained by a method and/or use of the invention) when compared to the concentration and/or level of the at least one tobacco-specific nitrosamine(s) or precursor thereto in a tobacco plant which has not been modified in accordance with present invention.

The concentration and/or total content of the at least one tobacco-specific nitrosamine(s) or precursor thereto may be reduced in a tobacco leaf, harvested leaf, processed tobacco leaf, tobacco industry product or combinations thereof obtainable or obtained from a tobacco plant (or part of a tobacco plant or a tobacco cell culture) of the invention when compared with a tobacco leaf, harvested leaf, processed tobacco leaf, tobacco industry product or combinations thereof obtainable or obtained from a tobacco plant (or part of a tobacco plant or a tobacco cell culture) which has not been modified in accordance with the present invention.

Suitably the concentration and/or total content of the at least one tobacco-specific nitrosamine or precursor thereto may be reduced in a processed tobacco leaf.

Suitably the concentration and/or level of the at least one tobacco-specific nitrosamine or precursor thereto may be reduced in a tobacco industry product.

In one embodiment the at least one tobacco-specific nitrosamine or precursor thereto may be reduced by at least about 1%, at least about 3%, at least about 5%, at least about 10%, at least about 20%, at least about 30%, at least about 40%, at least about 50%, at least about 60%, at least about 70%, at least about 80% or at least about 90%. In some embodiments the at least one tobacco-specific nitrosamine or precursor thereto may be reduced by between about 5% and about 95%, by between about 10% and about 90%, by between 20% and about 80%, by between 30% and about 70%, or by between about 40% and 60%.

In relation to processed (e.g. cured) tobacco leaf (e.g. cured or reconstituted), the at least one tobacco-specific nitrosamine or precursor thereto may be reduced by between about 5000 ng/g and about 50 ng/g, by between about 4000 ng/g and about 100 ng/g, by between about 3000 ng/g and 500 ng/g or by between 2000 ng/g and 1000 ng/g. In some embodiments the at least one tobacco-specific nitrosamine or precursor thereto may be reduced by at least about 5000 ng/g, at least about 4000 ng/g, at least about 3000 ng/g, at least about 2000 ng/g, at least about 1000 ng/g, at least about 500 ng/g, at least about 100 ng/g or at least about 50 ng/g.

Biomass Production

In one aspect, the present invention provides a method of producing a biomass comprising: growing a cell which has been engineered to inhibit or reduce the activity or expression of a protein kinase under conditions to produce a biomass.

In one embodiment, the present invention provides a method of producing a biomass having modified (e.g. increased) concentration and/or total content of nicotine, comprising growing a cell which has been engineered to:

inhibit or reduce the activity or expression of at least one gene encoding a protein kinase polypeptide comprising an amino acid sequence as set out in SEQ ID No. 3, or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1 or 2, or a functional variant or functional fragment or orthologue of SEQ ID No. 1 or 2 or a nucleic acid sequence which has at least 80% identity to SEQ ID No. 1 or 2.

Suitably, the biomass may contain a higher concentration and/or total content of nicotine compared with the biomass produced by a comparable cell which has not been modified in accordance with the present invention.

Suitably the cell for use in biomass production may be a plant cell, such as a tobacco cell.

Suitably the cell for use in biomass production may be a yeast cell.

In one embodiment the cell (e.g. yeast cell) may be further modified to comprise one or more sequences that increases nicotinic alkaloid biosynthesis. Suitably these one or more sequences may be incorporated into a nucleic acid construct that is suitable for cell (e.g. yeast cell) transformation. The one or more sequences may be overexpressed in the cell (e.g. yeast cell). The sequences may be selected from one or more of the following genes: MPO (or Methylputrescine Oxidase or MPO1 or MPO2); A622 (or Isoflavone reductase-like protein or Isoflavone reductase homolog or Isoflavone reductase-like protein); BBL (or Berberine bridge enzyme or Berberine bridge enzyme-like or BBE or NBB1); PMT (or Putrescine N-Methyltransferase or putrescine methyltransferase or S-adenosyl-L-methionine:putrescine N-methyltransferase or PMT or PMT1 or PMT2 or PMT3 or PMT4) and QPT (or quinolinate phosphoribosyltransferase). In one embodiment the sequences may be selected from one or more of the following genes: BBL, A622, PMT and MPO (MPO1 or MPO2). Genes suitable for modification of in this way may be taught in US2016032299 for example, which is incorporated herein by reference.

Commercially Desirable Traits

In one embodiment the plants of the present invention have modified (i.e. increased or decreased) total alkaloid content and/or modified (i.e. increased or decreased) content of one or more alkaloids selected from nicotine, nornicotine, anabasine, myosmine and anatabine and/or reduced nicotine, whilst the flavour characteristics and/or other commercially desirable traits are at least maintained. In one embodiment the plants of the present invention produce leaves of a similar grade and/or quality to plants which have not been modified according to the invention. In one embodiment the plants of the present invention have reduced nicotine content without a significant change in the flavour characteristics of the plant (e.g. compared with the same plant which has not been modified in accordance with the present invention).

In one embodiment the plants of the present invention have modified (i.e. increased or decreased) alkaloid and/or TSNA content without a significant change (e.g. decrease) in other commercially desirable traits of the plant (e.g. compared with the same plant which has not been modified in accordance with the present invention). In particular the yield of the modified plant is preferably not reduced compared with the same plant which has not been modified in accordance with the present invention.

Therefore in one embodiment the methods and uses of the present invention relate to modifying (i.e. increasing or reducing) total alkaloid content and/or modifying (i.e. increasing or reducing) one or more alkaloids selected from nicotine, nornicotine, anabasine and anatabine and/or modifying (i.e. increasing or reducing) nicotine content and/or TSNA content, whilst maintaining the flavour characteristics and/or other commercially desirable traits (e.g. yield).

The term "commercially desirable traits" as used herein will include traits such as yield, mature plant height, harvestable leaf number, average node length, cutter leaf length, cutter leaf width, quality (e.g. leaf quality, suitably cured leaf quality), abiotic (for instance drought) stress tolerance, herbicide tolerance and/or biotic (for instance insect, bacteria or fungus) stress tolerance.

Leaf quality may be measured based on colour, texture and aroma of the cured leaf, for example according to United States Department of Agriculture (USDA) grades and standards.

Tobacco grades are evaluated based on factors including, but not limited to, the leaf stalk position, leaf size, leaf colour, leaf uniformity and integrity, ripeness, texture, elasticity, sheen (related with the intensity and the depth of coloration of the leaf as well as the shine), hygroscopicity (the faculty of the tobacco leaves to absorb and to retain the ambient moisture), and green nuance or cast.

Leaf grade can be determined using standard methods known in the art, for example, using an Official Standard Grade published by the Agricultural Marketing Service of the US Department of Agriculture (7 U.S.C. § 511). See, e.g., Official Standard Grades for Burley Tobacco (U.S. Type 31 and Foreign Type 93), effective Nov. 5, 1990 (55 F.R. 40645);

Official Standard Grades for Flue-Cured Tobacco (U.S. Types 11, 12, 13, 14 and Foreign Type 92), effective Mar. 27, 1989 (54 F.R. 7925); Official Standard Grades for Pennsylvania Seedleaf Tobacco (U.S. Type 41), effective Jan. 8, 1965 (29 F.R. 16854); Official Standard Grades for Ohio Cigar-Leaf Tobacco (U.S. Types 42, 43, and 44), effective Dec. 8, 1963 (28 F.R. 11719 and 28 F.R. 11926); Official Standard Grades for Wisconsin Cigar-Binder Tobacco (U.S. Types 54 and 55), effective Nov. 20, 1969 (34 F.R. 17061); Official Standard Grades for Wisconsin Cigar-Binder Tobacco (U.S. Types 54 and 55), effective Nov. 20, 1969 (34 F.R. 17061); Official Standard Grades for Georgia and Florida Shade-Grown Cigar-Wrapper Tobacco (U.S. Type 62), Effective April 1971. A USDA grade index value can be determined according to an industry accepted grade index. See, e.g., Bowman et al, Tobacco Science, 32:39-40(1988); Legacy Tobacco Document Library (Bates Document #523267826-523267833, Jul. 1, 1988, Memorandum on the Proposed Burley Tobacco Grade Index); and Miller et al., 1990, Tobacco Intern., 192:55-57 (all foregoing references are incorporated herein in their entirety).

In one aspect, a USDA grade index is a 0-100 numerical representation of federal grade received and is a weighted average of all stalk positions. A higher grade index indicates higher quality. Alternatively, leaf grade may be determined via hyper-spectral imaging. See e.g., WO 2011/027315 (which is incorporated herein by reference).

In one embodiment, a tobacco plant of the present invention provides tobacco of commercially acceptable grade.

Suitably, the tobacco plant of the present invention provides cured tobacco of commercially acceptable grade.

In one embodiment, a tobacco plant of the present invention is capable of producing leaves having a USDA grade index value of at least about 70% of the USDA grade index value of leaves of a comparable plant when grown in similar growth conditions. Suitably, tobacco plants disclosed herein may be capable of producing leaves having a USDA grade index value of at least about 65%, at least about 70%, at least about 75%, at least about 80%, at least about 85%, at least about 90%, at least about 95%, or at least about 98% of the USDA grade index value of a control plant when grown in similar growth conditions. Suitably, tobacco plants disclosed herein may be capable of producing leaves having a USDA grade index value of between 65% and 130%, between 70% and 130%, between 75% and 130%, between 80% and 130%, between 85% and 130%, between 90% and 130%, between 95% and 130%, between 100% and 130%, between 105% and 130%, between 110% and 130%, between 115% and 130%, or between 120% and 130% of the USDA grade index value of a comparable plant.

In one aspect, the tobacco plant of the present invention is capable of producing leaves having a USDA grade index value of at least 50. Suitably, tobacco plants disclosed herein may be capable of producing leaves having a USDA grade index value of 55 or more, 60 or more, 65 or more, 70 or more, 75 or more, 80 or more, 85 or more, 90 or more, and 95 or more.

Unless specified otherwise, used herein, tobacco yield refers to cured leaf yield which is calculated based on the weight of cured tobacco leaves per acre under standard field conditions following standard agronomic and curing practice.

In one aspect, a plant (e.g. a tobacco plant) of the present invention has a yield between 50% and 150%, between 55% and 145%, between 60% and 140%, between 65% and 135%, between 70% and 130%, between 75% and 125%, between 80% and 120%, between 85% and 115%, between 90% and 110%, between 95% and 105%, between 50% and 100%, between 55% and 100%, between 60% and 100%, between 65% and 100%, between 70% and 100%, between 75% and 100%, between 80% and 100%, between 85% and 100%, between 90% and 100%, between 95% and 100%, between 100% and 150%, between 105% and 150%, between 110% and 150%, between 115% and 150%, between 120% and 150%, between 125% and 150%, between 130% and 150%, between 135% and 150%, between 140% and 150%, or between 145% and 150% of the yield of a comparable plant when grown in similar field conditions.

In another aspect, the plant (e.g. a tobacco plant) yield of the present invention is approximately 1.5, 1.6, 1.7, 1.8, 1.9, 2.0, 2.1, 2.2, 2.3, 2.4, 2.5, 2.6, 2.7, 2.8, 2.9, or 3.0 times of the yield of a comparable plant when grown in similar field conditions.

In another aspect, the yield of a tobacco plant of the present invention is comparable to the yield of the flue cured comparable plant when grown in similar field conditions.

In one aspect, a tobacco plant of the present invention provides a yield selected from the group consisting of about between 1200 and 3500, between 1300 and 3400, between 1400 and 3300, between 1500 and 3200, between 1600 and 3100, between 1700 and 3000, between 1800 and 2900, between 1900 and 2800, between 2000 and 2700, between 2100 and 2600, between 2200 and 2500, and between 2300 and 2400 lbs/acre.

In another aspect, a tobacco plant of the present invention provides a yield selected from the group consisting of about between 1200 and 3500, between 1300 and 3500, between 1400 and 3500, between 1500 and 3500, between 1600 and 3500, between 1700 and 3500, between 1800 and 3500, between 1900 and 3500, between 2000 and 3500, between 2100 and 3500, between 2200 and 3500, between 2300 and 3500, between 2400 and 3500, between 2500 and 3500, between 2600 and 3500, between 2700 and 3500, between 2800 and 3500, between 2900 and 3500, between 3000 and 3500, and between 3100 and 3500 lbs/acre.

In a further aspect, a tobacco plant of the present invention provides a yield selected from the group consisting of about between 1200 and 3500, between 1200 and 3400, between 1200 and 3300, between 1200 and 3200, between 1200 and 3100, between 1200 and 3000, between 1200 and 2900, between 1200 and 2800, between 1200 and 2700, between 1200 and 2600, between 1200 and 2500, between 1200 and 2400, between 1200 and 2300, between 1200 and 2200, between 1200 and 2100, between 1200 and 2000, between 1200 and 1900, between 1200 and 1800, between 1200 and 1700, between 1200 and 1600, between 1200 and 1500, and between 1200 and 1400 lbs/acre.

Plant Breeding

In one embodiment the present invention provides a method of producing a plant having a modified alkaloid content and/or modified content of a tobacco specific nitrosamine (TSNA) or a precursor of a TSNA, comprising:
 a. crossing a donor plant having modified nicotine content and/or modified content of a tobacco specific nitrosamine (TSNA) or a precursor of a TSNA and wherein the activity or expression of at least one protein kinase has been modulated in the donor plant in accordance with the present invention with a recipient tobacco plant that does not have modified nicotine content or modified content of a tobacco specific nitrosamine (TSNA) or a precursor of a TSNA and possesses commercially desirable traits;
 b. isolating genetic material from a progeny of said donor plant crossed with said recipient plant; and
 c. performing molecular marker-assisted selection with a molecular marker comprising:
  i. identifying an introgressed region comprising a mutation in a polynucleotide sequence encoding a protein defined in a;
 wherein the at least one protein kinase comprises an amino acid sequence as set out in SEQ ID No. 3, or a functional variant or functional fragment or orthologue thereof, or a sequence which has at least 80% identity to SEQ ID No. 3; or is encoded by a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2.

The protein kinase is modulated in the donor plant when compared to a comparable plant.

The molecular marker assisted selection may comprise performing PCR to identify an introgressed nucleic acid sequence comprising a mutation which modulates the activity or expression of a protein kinase comprising the amino acid sequence shown as SEQ ID No. 3, or an amino acid sequence which has at least 80% identity thereto. Suitably, the activity or expression of said protein kinase is increased. Suitably, the activity or expression of said protein kinase is increased and the alkaloid content and/or TSNA content and/or TSNA precursor content is reduced.

Plants

Suitable plants according to the invention include the Solanaceae family of plants which include, for example jimson weed, eggplant, mandrake, deadly nightshade (*Belladonna*), *Capsicum* (paprika, chilli pepper), potato and tobacco.

In one embodiment a suitable genus of Solanaceae is *Solanum*, e.g. *Solanum lycopersicum*.

In one embodiment a suitable genus of Solanaceae is *Nicotiana*, e.g. *Nicotiana tabacum* or *Nicotiana rustica*.

A suitable species of *Nicotiana* may be *Nicotiana tabacum*. Species of *Nicotiana* may be referred to herein as a tobacco plant, or simply tobacco.

In a preferred embodiment, the plant is a tobacco plant. In a preferred embodiment, the cell is a tobacco cell.

Tobacco Plants

The present invention provides methods, uses directed to plants (e.g. tobacco plants) as well as a cell (e.g. a tobacco cell), a plant (e.g. a tobacco plant) and a plant propagation material.

The term "tobacco plant" as used herein refers to a plant in the genus *Nicotiana* that is used in the production of tobacco products. Non-limiting examples of suitable "tobacco" plants include *N. tabacum* and *N. rustica* (for example, *N. tabacum* L., LA B21, LN KY171, TI 1406, Basma, Galpao, Perique, Beinhart 1000-1, and Petico).

The tobacco material can be derived or obtained from varieties of *Nicotiana tabacum* types, commonly known as Burley varieties, flue or bright varieties and dark varieties. In some embodiments, the tobacco material is derived from a Burley, Virginia or a dark tobacco plant. The tobacco plant may be selected from Burley tobacco, rare tobacco, specialty tobacco, expanded tobacco or the like.

The use of tobacco cultivars and elite tobacco cultivars is also contemplated herein. The tobacco plant for use herein may therefore be a tobacco variety or elite tobacco cultivar. Particularly useful *Nicotiana tabacum* varieties include Flue-cured Virginia type, Burley type, and Oriental type.

In some embodiments, the tobacco plant may be, for example, selected from one or more of the following varieties: L. cultivar T.I. 1068, AA 37-1, B 13P, Xanthi (Mitchell-Mor), KT D #3 Hybrid 107, Bel-W3, 79-615, Samsun Holmes NN, F4 from cross BU21 x Hoja Parado, line 97, KTRDC #2 Hybrid 49, KTRDC #4 Hybrid 1 10, Burley 21, PM016, KTRDC #5 KY 160 SI, KTRDC #7 FCA, KTRDC #6 TN 86 SI, PM021, K 149, K 326, K 346, K 358, K 394, K 399, K 730, KY 10, KY 14, KY 160, KY 17, KY 8959, KY 9, KY 907, MD 609, McNair 373, NC 2000, PG 01, PG 04, P01, P02, P03, RG 11, RG 17, RG 8, Speight G-28, TN 86, TN 90, VA 509, AS44, Banket A1, Basma Drama B84/31, Basma I Zichna ZP4/B, Basma Xanthi BX 2A, Batek, Besuki Jember, C104, Coker 319, Coker 347, Criollo Misionero, PM092, Delcrest, Djebel 81, DVH 405, Galpao Comum, HBO4P, Hicks Broadleaf, Kabakulak Elassona, PM102, Kutsage E1, KY 14 x L8, KY 171, LA BU 21, McNair 944, NC 2326, NC 71, NC 297, NC 3, PVH 03, PVH 09, PVH 19, PVH 21 10, Red Russian, Samsun, Saplak, Simmaba, Talgar 28, PM132, Wislica, Yayaldag, NC 4, TR Madole, Prilep HC-72, Prilep P23, Prilep PB 156/1, Prilep P12-2/1, Yaka JK-48, Yaka JB 125/3, TI-1068, KDH-960, TI-1070, TW136, PM204, PM205, Basma, TKF 4028, L8, TKF 2002, TN 90, GR141, Basma xanthi, GR149, GR153, and Petit Havana.

Non-limiting examples of varieties or cultivars are: BD 64, CC 101, CC 200, CC 27, CC 301, CC 400, CC 500, CC 600, CC 700, CC 800, CC 900, Coker 176, Coker 319, Coker 371 Gold, Coker 48, CD 263, DF91 1, DT 538 LC, Galpao tobacco, GL 26H, GL 350, GL 600, GL 737, GL 939, GL 973, HB 04P, HB 04P LC, HB3307PLC, Hybrid 403LC, Hybrid 404LC, Hybrid 501 LC, K 149, K 326, K 346, K 358, K394, K 399, K 730, KDH 959, KT 200, KT204LC, KY10, KY14, KY 160, KY 17, KY 171, KY 907, KY907LC, KTY14 x L8 LC, Little Crittenden, McNair 373, McNair 944, msKY 14 x L8, Narrow Leaf Madole, Narrow Leaf Madole LC, NBH 98, N-126, N-777LC, N-7371 LC, NC 100, NC 102, NC 2000, NC 291, NC 297, NC 299, NC 3, NC 4, NC 5, NC 6, NC7, NC 606, NC 71, NC 72, NC 810, NC BH 129, NC 2002, Neal Smith Madole, OXFORD 207, PD 7302 LC, PD 7309 LC, PD 7312 LC 'Periq'e' tobacco, PVH03, PVH09, PVH19, PVH50, PVH51, R 610, R 630, R 7-1 1, R 7-12, RG 17, RG 81, RG H51, RGH 4, RGH 51, RS 1410, Speight 168, Speight 172, Speight 179, Speight 210, Speight 220, Speight 225, Speight 227, Speight 234, Speight G-28, Speight G-70, Speight H-6, Speight H20, Speight NF3, TI 1406, TI 1269, TN 86, TN86LC, TN 90, TN 97, TN97LC, TN D94, TN D950, TR (Tom Rosson) Madole, VA 309, VA359, AA 37-1, B 13P, Xanthi (Mitchell-Mor), Bel-W3, 79-615, Samsun Holmes NN, KTRDC number 2 Hybrid 49, Burley 21, KY 8959, KY 9, MD 609, PG 01, PG 04, P01, P02, P03, RG 1 1, RG 8, VA 509, AS44, Banket A1, Basma Drama B84/31, Basma I Zichna ZP4/B, Basma Xanthi BX 2A, Batek, Besuki Jember, C104, Coker 347, Criollo Misionero, Delcrest, Djebel 81, DVH 405, Galpao Comum, HB04P, Hicks Broadleaf, Kabakulak Elassona, Kutsage E1, LA BU 21, NC 2326, NC 297, PVH 21 10, Red Russian, Samsun, Saplak, Simmaba, Talgar 28, Wislica, Yayaldag, Prilep HC-72, Prilep P23, Prilep PB 156/1, Prilep P12-2/1, Yaka JK-48, Yaka JB 125/3, TI-1068, KDH-960, TI-1070, TW136, Basma, TKF 4028, L8, TKF 2002, GR141, Basma xanthi, GR149, GR153, Petit Havana. Low converter subvarieties of the above, even if not specifically identified herein, are also contemplated.

The tobacco plant may be a Burley, Flue-cured Virginia, or Oriental.

In one embodiment the plant propagation material may be obtainable from a plant (e.g. a tobacco plant) of the invention.

A "plant propagation material" as used herein refers to any plant matter taken from a plant from which further plants may be produced. Suitably, a plant propagation material may be selected from a seed, plant calli and plant clumps. Suitably the plant propagation material may be a seed. Suitably, the plant propagation material may be plant calli. Suitably the plant propagation material may be plant clumps.

In one embodiment the cell (e.g. tobacco cell), tobacco plant and/or plant propagation material may be obtainable (e.g. obtained) by a method according to the invention.

Suitably a tobacco plant according to the present invention may have modulated (e.g. decreased) nicotine content when compared to an unmodified tobacco plant, wherein the tobacco plant has been modified to modulate (e.g. increase) the activity or expression of at least on one gene encoding a protein kinase.

Suitably a tobacco plant according to the present invention may have modulated (e.g. reduced) content of a tobacco specific nitrosamine (TSNA) or a precursor of a TSNA when compared to an unmodified tobacco plant, wherein the tobacco plant has been modified to modulate (e.g. increase) the activity or expression of at least on one gene encoding a protein kinase.

In one embodiment the tobacco plant in accordance with the present invention comprises a tobacco cell of the invention.

In another embodiment the plant propagation material may be obtainable (e.g. obtained) from a tobacco plant of the invention.

In one embodiment there is provided the use of a tobacco plant as described herein to breed a tobacco plant.

The present invention also provides in another embodiment the use of a tobacco plant of the foregoing embodiments for the production of a tobacco industry product.

In another embodiment there is provided the use of a tobacco plant of the invention to grow a crop.

In one embodiment there is provided the use of a cell as provided for in the foregoing embodiments for production of a tobacco industry product.

In one embodiment the present invention provides a cell culture (e.g. in in vitro culture).

The tobacco cell culture may be a cell suspension culture. These cells cultured in vitro may be incorporated into a tobacco industry product, e.g. as a substitute for conventional tobacco particles, shreds, fine cut or long cut tobacco lamina, as an additive ingredient or as both a substitute and an additive. Suitably, the cell culture may produce nicotine.

In one embodiment there is provided the use of a cell culture, e.g. a harvested and/or processed cell culture according to the present invention for the production of a tobacco industry product. The tobacco cells harvested from an in vitro culture may be dried, e.g. freeze-dried, for example to produce a powder.

In one embodiment, the cell culture is a tobacco cell culture. The skilled person will be aware of known methods for establishing in vitro cultures of tobacco cells. By way of example only the following method may be used: collecting seeds form a tobacco plant of interest and sterilising their exterior to eliminate unwanted organisms, planting said seeds to grown a tobacco plant of interest, removing tissue from the tobacco plant (for example, from the tobacco stem) for use as an explant, establishing a callus culture form the tobacco explant, establishing a cell suspension culture from the callus culture, and harvesting culture material (e.g. including tobacco cells) to produce a tobacco cell culture.

The tobacco cells can be harvested by various methods, including filtration, e.g. vacuum filtration. The sample may be washed in the filter by adding water and the remaining liquid removed with the filtration, e.g. vacuum filtration.

The harvested tobacco cell culture may be further processed, e.g. dried, such as air-dried and/or freeze-dried. The harvested tobacco cell culture or dried harvested tobacco cell culture or an extract therefrom may be incorporated into tobacco industry products according to the present invention.

In one embodiment, the present invention provides a plant (e.g. tobacco plant) or part thereof for use in molecular farming. Suitably, a plant or part thereof modified in accordance with the present invention may be used in the manufacture of proteins such as therapeutics e.g. antibiotics, virus like particles, neutraceuticals or small molecules.

In one embodiment, the present invention provides a method for the production of proteins (e.g. therapeutic proteins); the method comprising modifying a plant or part thereof capable of producing said protein (e.g. therapeutic protein) by modulating the activity or expression of at least one protein kinase gene encoding an amino acid sequence as set out in SEQ ID No. 3, or a functional variant or functional fragment or orthologue thereof, or a sequence which has at least 80% identity to SEQ ID No. 3; or wherein the at least one gene encoding a protein kinase comprises a nucleotide sequence as set out in SEQ ID No. 1 or 2, or a functional variant or functional fragment or orthologue of SEQ ID No.

1 or 2, or a nucleic acid sequence which has at least 80% identity to SEQ ID No. 1 or 2; and culturing the plant under conditions sufficient to allow the production of said protein (e.g. therapeutic protein).

In one embodiment, the present invention provides a method for the production of proteins (e.g. therapeutic proteins); the method comprising modifying a plant or part thereof capable of producing said protein (e.g. therapeutic protein) by modulating the activity or expression of at least one protein kinase having an amino acid sequence as set out in SEQ ID No. 3, or a functional variant or functional fragment or orthologue thereof, or a sequence which has at least 80% identity to SEQ ID No. 3; or wherein the at least one protein kinase comprises a nucleotide sequence as set out in SEQ ID No. 1 or 2, or a functional variant or functional fragment or orthologue of SEQ ID No. 1 or 2, or a nucleic acid sequence which has at least 80% identity to SEQ ID No. 1 or 2; and culturing the plant under conditions sufficient to allow the production of said protein (e.g. therapeutic protein).

Products

The present invention also provides for products obtainable or obtained from plants according to the present invention. Products are provided which are obtainable or obtained from a plant in which the activity or expression of a protein kinase gene has been modulated.

In one embodiment, the product may comprise a construct of the invention which modulates the activity or expression of at least one protein kinase gene as defined herein.

The present invention also provides for products obtainable or obtained from tobacco according to the present invention.

In one embodiment there is provided the use of a tobacco plant of the invention to produce a tobacco leaf.

Suitably the tobacco leaf may be subjected to downstream applications such as processing.

Thus in one embodiment the use of the foregoing embodiment may provide a processed tobacco leaf. Suitably the tobacco leaf may be subjected to curing, fermenting, pasteurising or combinations thereof. In another embodiment the tobacco leaf may be cut. In some embodiments the tobacco leaf may be cut before or after being subjected to curing, fermenting, pasteurising or combinations thereof.

In one embodiment the present invention provides a harvested leaf of a tobacco plant of the invention.

In a further embodiment the harvested leaf may be obtainable (e.g. obtained) from a tobacco plant propagated from a propagation material of the present invention.

In another embodiment there is provided a harvest leaf obtainable from a method or use of the present invention.

Suitably the harvested leaf may be a cut harvested leaf.

In some embodiments the harvested leaf may comprise viable tobacco cells. In other embodiments the harvested leaf may be subjected to further processing.

There is also provided a processed tobacco leaf.

The processed tobacco leaf may be obtainable from a tobacco plant of the invention. Suitably the processed tobacco leaf may be obtainable from a tobacco plant obtained in accordance with any of the methods and/or uses of the present invention.

In another embodiment the processed tobacco leaf may be obtainable from a tobacco plant propagated form a tobacco plant propagation material according to the present invention.

The processed tobacco leaf of the present invention may be obtainable by processing a harvested leaf of the invention.

The term "processed tobacco leaf" as used herein refers to a tobacco leaf that has undergone one or more processing steps to which tobacco is subjected to in the art. A "processed tobacco leaf" comprises no or substantially no viable cells.

The term "viable cells" refers to cells which are able to grow and/or are metabolically active. Thus, if a cell is said to not be viable, also referred to as "non-viable" then a cell does not display the characteristics of a viable cell.

The term "substantially no viable cells" means that less than about 5% of the total cells are viable. Preferably, less than about 3%, more preferably less than about 1%, even more preferably less than about 0.1% of the total cells are viable.

In one embodiment the processed tobacco leaf may be processed by one or more of: curing, fermenting and/or pasteurising.

Suitably the processed tobacco leaf may be processed by curing.

Tobacco leaf may be cured by any method known in the art. In one embodiment tobacco leaf may be cured by one or more of the curing methods selected from the group consisting of: air curing, fire curing, flue curing and sun curing.

Suitably the tobacco leaf may be air cured.

Typically air curing is achieved by hanging tobacco leaf in well-ventilated barns and allowing to dry. This is usually carried out over a period of four to eight weeks. Air curing is especially suitable for burley tobacco.

Suitably the tobacco leaf may be fire cured. Fire curing is typically achieved by hanging tobacco leaf in large barns where fires of hardwoods are kept on continuous or intermittent low smoulder and usually takes between three days and ten weeks, depending on the process and the tobacco.

In another embodiment the tobacco leaf may be flue cured. Flue curing may comprise stringing tobacco leaves onto tobacco sticks and hanging them from tier-poles in curing barns. The barns usually have a flue which runs from externally fed fire boxes. Typically this results in tobacco that has been heat-cured without being exposed to smoke. Usually the temperature will be raised slowly over the course of the curing with the whole process taking approximately 1 week.

Suitably the tobacco leaf may be sun cured. This method typically involves exposure of uncovered tobacco to the sun.

Suitably the processed tobacco leaf may be processed by fermenting.

Fermentation can be carried out in any manner known in the art. Typically during fermentation, the tobacco leaves are piled into stacks (a bulk) of cured tobacco covered in e.g. burlap to retain moisture. The combination of the remaining water inside the leaf and the weight of the tobacco generates a natural heat which ripens the tobacco. The temperature in the centre of the bulk is monitored daily. In some methods every week, the entire bulk is opened. The leaves are then removed to be shaken and moistened and the bulk is rotated so that the inside leaves go outside and the bottom leaves are placed on the top of the bulk. This ensures even fermentation throughout the bulk. The additional moisture on the leaves, plus the actual rotation of the leaves themselves, generates heat, releasing the tobacco's natural ammonia and reducing nicotine, while also deepening the colour and improving the tobacco's aroma. Typically the fermentation process continues for up to 6 months, depending on the variety of tobacco, stalk position on the leaf, thickness and intended use of leaf.

Suitably the processed tobacco leaf may be processed by pasteurising. Pasteurising may be particularly preferred when the tobacco leaf will be used to make a smokeless tobacco industry product, most preferably snus.

Tobacco leaf pasteurisation may be carried out by any method known in the art. For example pasteurisation may be carried out as detailed in J Foulds, L Ramstrom, M Burke, K Fagerstrom. Effect of smokeless tobacco (snus) on smoking and public health in Sweden.

Tobacco Control (2003) 12: 349-359, the teaching of which is incorporated herein by reference. During the production of snus pasteurisation is typically carried out by a process in which the tobacco is heat treated with steam for 24-36 hours (reaching temperatures of approximately 100° C.). This results in an almost sterile product and without wishing to be bound by theory one of the consequences of this is believed to be a limitation of further TSNA formation.

In one embodiment the pasteurisation may be steam pasteurisation.

In some embodiments the processed tobacco leaf may be cut. The processed tobacco leaf may be cut before or after processing. Suitably, the processed tobacco leaf may be cut after processing.

In one embodiment, the use of the foregoing embodiment may provide reconstituted tobacco.

In one embodiment, there is provided reconstituted tobacco.

"Reconstituted" as used herein may also be referred to as recon, recycled or homogenized sheet tobacco and refers to tobacco material generated from remnants of tobacco leaf after processing. Reconstituted tobacco allows the production of a consistent, high quality blend and allows the adjustment of the ratio of individual components.

Reconstituted tobacco may be nano fibre recon (nanofibers can be extracted in solid or liquid form), paper making recon (which uses stems, scraps, and midribs, etc. as the raw material) or slurry type recon (which uses a mixture of fines and tobacco stems, ground to power, mixed with water and vegetable binding agent. The soluble residue is formed to sheets by extracting the water.)

Any method known in the art may be used for making reconstituted tobacco, for example see CORESTA Congress, Sapporo, 2012, Smoke Science/Product Technology Groups, SSPT 12 (incorporated herein by reference).

In some embodiments the tobacco plant, harvested leaf of a tobacco plant and/or processed tobacco leaf may be used to extract nicotine. The extraction of nicotine can be achieved using any method known in the art. For example a method for extracting nicotine from tobacco is taught in U.S. Pat. No. 2,162,738 which is incorporated herein by reference.

In one aspect, the present invention provides cured tobacco material made from a tobacco plant or part thereof according to the invention.

In another aspect, the present invention provides a tobacco blend comprising tobacco material made from a tobacco plant or part thereof according to the present invention, or from a tobacco cell culture according to the present invention. In one aspect, the present invention provides a tobacco blend comprising cured tobacco material according to the present invention.

Suitably, the tobacco blend according to the present invention may comprise approximately 10%, 20%, 30%, 40%, 50%, 60%, 70%, 80% or 90% tobacco from a tobacco plant or part thereof according to the present invention, or from a tobacco cell culture according to the present invention. Suitably, the tobacco blend may comprise approximately 10% tobacco from a tobacco plant or part thereof according to the present invention, or from a tobacco cell culture according to the present invention. Suitably, the tobacco blend may comprise approximately 20% tobacco from a tobacco plant or part thereof according to the present invention, or from a tobacco cell culture according to the present invention. Suitably, the tobacco blend may comprise approximately 30% tobacco from a tobacco plant or part thereof according to the present invention, or from a tobacco cell culture according to the present invention. Suitably, the tobacco blend may comprise approximately 40% tobacco from a tobacco plant or part thereof according to the present invention, or from a tobacco cell culture according to the present invention. Suitably, the tobacco blend may comprise approximately 50% tobacco from a tobacco plant or part thereof according to the present invention, or from a tobacco cell culture according to the present invention. Suitably, the tobacco blend may comprise approximately 60% tobacco from a tobacco plant or part thereof according to the present invention, or from a tobacco cell culture according to the present invention. Suitably, the tobacco blend may comprise approximately 70% tobacco from a tobacco plant or part thereof according to the present invention, or from a tobacco cell culture according to the present invention. Suitably, the tobacco blend may comprise approximately 80% tobacco from a tobacco plant or part thereof according to the present invention, or from a tobacco cell culture according to the present invention. Suitably, the tobacco blend may comprise approximately 90% tobacco from a tobacco plant or part thereof according to the present invention, or from a tobacco cell culture according to the present invention.

In one aspect, a tobacco blend product of the present invention comprises at least about 5, 10, 20, 30, 40, 50, 60, 70, 80, 90, or 95 percent by dry weight of tobacco cured from a tobacco plant or part thereof according to the present invention, or a tobacco cell culture according to the present invention.

Suitably, the cured tobacco material may be air cured. Suitably, the cured tobacco material may be flue cured. Suitably, the cured tobacco material may be sun cured. Suitably, the cured tobacco material may be fire cured.

A tobacco industry product or smoking article according to the present invention may comprise the tobacco material (e.g. cured tobacco material or reconstituted tobacco material) according to the present invention.

In another aspect the present invention provides a tobacco industry product.

In one embodiment the tobacco industry product according to the present invention may be a blended tobacco industry product. Suitably, the tobacco blend may comprise cured tobacco material according to the present invention.

In one embodiment the tobacco industry product may be prepared from a tobacco plant of the invention or a part thereof.

Suitably the tobacco plant or part thereof may be propagated from a tobacco plant propagation material according to the present invention.

The term "part thereof" as used herein in the context of a tobacco plant refers to a portion of the tobacco plant. Suitably, the "part thereof" may be a leaf, root or stem of a tobacco plant or the flowers. Suitably, the "part thereof" may be a leaf, root or stem of a tobacco plant.

Tobacco Industry Product

As used herein, the term "tobacco industry product" is intended to include combustible smoking articles such as cigarettes, cigarillos, cigars, tobacco for pipes or for roll-your-own cigarettes, (whether based on tobacco, tobacco derivatives, expanded tobacco, reconstituted tobacco, tobacco substitutes or other smokable material), non-combustible aerosol provision systems such as heating products that release compounds from substrate materials without burning such as electronic cigarettes, tobacco heating products, and hybrid systems to generate aerosol from a combination of substrate materials, for example hybrid systems containing a liquid or gel or solid substrate, as well as aerosolizable substrate materials used within these aerosol provision systems; and aerosol-free delivery articles such as lozenges, gums, patches, articles comprising breathable powders and smokeless tobacco industry products such as snus and snuff, which aerosol-free delivery articles may or may not deliver nicotine.

In one embodiment the tobacco industry product may be prepared from (e.g. may comprise) a tobacco plant of the invention or a part thereof.

Suitably the tobacco plant or part thereof may be propagated from a tobacco plant propagation material according to the present invention.

The term "part thereof" as used herein in the context of a tobacco plant refers to a portion of the tobacco plant. Preferably the "part thereof" is a leaf of a tobacco plant.

In another embodiment the tobacco industry product may be prepared from a harvested leaf of the invention.

In a further embodiment the tobacco industry product may be prepared from a processed tobacco leaf of the invention.

Suitably the tobacco industry product may be prepared from a tobacco leaf processed by one or more of: curing, fermenting and/or pasteurising.

Suitably the tobacco industry product may comprise a cut tobacco leaf, optionally processed as per the foregoing embodiment.

In another embodiment, the tobacco industry product may be prepared from a tobacco cell culture according to the present invention.

In another embodiment, the tobacco industry product may be prepared from (e.g. may comprise) a cured tobacco material according to the present invention.

In another embodiment, the tobacco industry product may be prepared from (e.g. may comprise) a tobacco blend according to the present invention.

In one embodiment the tobacco industry product may be a smoking article.

As used herein, the term "smoking article" can include smokable products, such as rolling tobacco, cigarettes, cigars and cigarillos whether based on tobacco, tobacco derivatives, expanded tobacco, reconstituted tobacco or tobacco substitutes.

In another embodiment the tobacco industry product may be a smokeless tobacco industry product.

The term "smokeless tobacco industry product" as used herein refers to a tobacco industry product that is not intended to be smoked and/or subjected to combustion.

Smokeless tobacco industry products (including heat-not-burn materials) may contain tobacco in any form, including dried particles, shreds, granules, powders, or slurry, deposited on, mixed in, surrounded by, or combined with other ingredients in any format, such as flakes, films, tabs, foams, or beads.

In one embodiment a smokeless tobacco industry product may include snus, snuff, chewing tobacco or the like.

In one embodiment, the tobacco industry product is a combustible smoking article, selected from the group consisting of a cigarette, a cigarillo and a cigar.

In one embodiment, the tobacco industry product comprises one or more components of a combustible smoking article, such as a filter, a filter rod, a filter rod segments, tobacco, a tobacco rod, a tobacco rod segment, a spill, an additive release component such as a capsule, a thread, beads, a paper such as a plug wrap, a tipping paper or a cigarette paper.

In one embodiment, the tobacco industry product is a non-combustible aerosol provision system.

In one embodiment, the tobacco industry product comprises one or more components of a non-combustible aerosol provision system, such as a heater and an aerosolizable substrate.

In one embodiment, the aerosol provision system is an electronic cigarette also known as a vaping device.

In one embodiment the electronic cigarette comprises a heater, a power supply capable of supplying power to the heater, an aerosolizable substrate such as a liquid or gel, a housing and optionally a mouthpiece.

In one embodiment the aerosolizable substrate is contained in a substrate container. In one embodiment the substrate container is combined with or comprises the heater.

In one embodiment, the tobacco industry product is a heating product which releases one or more compounds by heating, but not burning, a substrate material. The substrate material is an aerosolizable material which may be for example tobacco or other non-tobacco products, which may or may not contain nicotine. In one embodiment, the heating product is a tobacco heating product.

In one embodiment, the heating product is an electronic device.

In one embodiment, the tobacco heating product comprises a heater, a power supply capable of supplying power to the heater, an aerosolizable substrate such as a solid or gel material.

In one embodiment the heating product is a non-electronic article.

In one embodiment the heating product comprises an aerosolizable substrate such as a solid or gel material and a heat source which is capable of supplying heat energy to the aerosolizable substrate without any electronic means, such as by burning a combustion material, such as charcoal.

In one embodiment the heating product also comprises a filter capable of filtering the aerosol generated by heating the aerosolizable substrate.

In some embodiments the aerosolizable substrate material may comprise a vapour or aerosol generating agent or a humectant, such as glycerol, propylene glycol, triacetin or diethylene glycol.

In one embodiment, the tobacco industry product is a hybrid system to generate aerosol by heating, but not burning, a combination of substrate materials. The substrate materials may comprise for example solid, liquid or gel which may or may not contain nicotine. In one embodiment, the hybrid system comprises a liquid or gel substrate and a solid substrate. The solid substrate may be for example tobacco or other non-tobacco products, which may or may not contain nicotine. In one embodiment, the hybrid system comprises a liquid or gel substrate and tobacco.

In a further embodiment the tobacco industry product may be a tobacco heating device or hybrid device or e-cigarette or the like.

Typically in tobacco heating devices or hybrid devices, an aerosol is generated by the transfer of heat from a heat source to a physically separate aerosol-forming substrate or material, which may be located within, around or downstream of the heat source. During smoking, volatile compounds are released from the aerosol-forming substrate by heat transfer from the heat source and entrained in air drawn through the smoking article. As the released compounds cool, they condense to form an aerosol that is inhaled by the user.

Aerosol-generating articles and devices for consuming or smoking tobacco heating devices are known in the art. They can include, for example, electrically heated aerosol-generating devices in which an aerosol is generated by the transfer of heat from one or more electrical heating elements of the aerosol-generating device to the aerosol-forming substrate of a tobacco heating device.

Suitably the tobacco heating device may be an aerosol-generating device.

Preferably the tobacco heating device may be a heat-not-burn device. Heat-not-burn devices are known in the art and release compounds by heating, but not burning, tobacco.

An example of a suitable, heat-not-burn device may be one taught in WO2013/034459 or GB2515502 which are incorporated herein by reference.

In one embodiment the aerosol-forming substrate of a tobacco heating device may be a tobacco industry product in accordance with the present invention.

In one embodiment the tobacco heating device may be a hybrid device.

Polynucleotides/Polypeptides/Constructs

In certain embodiments of the present invention, constructs which modulate activity or expression of at least one protein kinase gene may be transformed or introduced into plant cells, suitably under the direction of a promoter.

In certain embodiments of the present invention, constructs which decrease (i.e. inhibit) activity or expression of a protein kinase gene may be transformed into plant cells under the direction of a promoter. For example, the genetic construct may be a gene editing construct or may comprise an RNAi molecule, which may comprise a small interfering RNA (siRNA) molecule, or a short hairpin loop (shRNA) molecule.

In certain embodiments of the present invention, constructs which increase activity or expression of a protein kinase gene may be transformed into plant cells, suitably under the direction of a promoter e.g. constructs which encode a protein kinase gene such as an endogenous protein kinase.

Constructs may be introduced into plants according to the present invention by means of suitable vector, e.g. plant transformation vectors. A plant transformation vector may comprise an expression cassette comprising 5'-3' in the direction of transcription, a promoter sequence, a construct sequence targeting a protein kinase gene and, optionally a 3' untranslated, terminator sequence including a stop signal for RNA polymerase and a polyadenylation signal for polyadenylase. The promoter sequence may be present in one or more copies, and such copies may be identical or variants of a promoter sequence as described above. The terminator sequence may be obtained from plant, bacterial or viral genes. Suitable terminator sequences are the pea rbcS E9 terminator sequence, the nos terminator sequence derived from the nopaline synthase gene of *Agrobacterium tumefaciens* and the 35S terminator sequence from cauliflower mosaic virus, for example. A person skilled in the art will be readily aware of other suitable terminator sequences.

The construct of the present invention may also comprise a gene expression enhancing mechanism to increase the strength of the promoter. An example of such an enhancer element is one derived from a portion of the promoter of the pea plastocyanin gene, and which is the subject of International Patent Application No. WO 97/20056 which is incorporated herein by reference. Suitable enhancer elements may be the nos enhancer element derived from the nopaline synthase gene of *Agrobacterium tumefaciens* and the 35S enhancer element from cauliflower mosaic virus, for example.

These regulatory regions may be derived from the same gene as the promoter DNA sequence or may be derived from different genes, from *Nicotiana tabacum* or other organisms, for example from a plant of the family Solanaceae, or from the subfamily Cestroideae. All of the regulatory regions should be capable of operating in cells of the tissue to be transformed.

The promoter DNA sequence may be derived from the same gene as the gene of interest, e.g. the gene the promoter is going to direct, for instance a gene encoding a protein kinase according to the invention, a coding sequence used in the present invention or may be derived from a different gene, from *Nicotiana tabacum*, or another organism, for example from a plant of the family Solanaceae, or from the subfamily Cestroideae.

The expression cassette may be incorporated into a basic plant transformation vector, such as pBIN 19 Plus, pBI 101, pKYLX71:35S2, pCAMBIA2300 or other suitable plant transformation vectors known in the art. In addition to the expression cassette, the plant transformation vector will contain such sequences as are necessary for the transformation process. These may include the *Agrobacterium* vir genes, one or more T-DNA border sequences, and a selectable marker or other means of identifying transgenic plant cells.

The term "expression vector or plant transformation vector" means a construct capable of in vivo or in vitro expression. Preferably, the expression vector is incorporated in the genome of the organism. In one embodiment the vector of the present invention expresses a protein e.g. a protein kinase as described herein. The term "incorporated" preferably covers stable incorporation into the genome.

Techniques for transforming plants are well known within the art and include *Agrobacterium*-mediated transformation, for example. The basic principle in the construction of genetically modified plants is to insert genetic information in the plant genome so as to obtain a stable maintenance of the inserted genetic material. A review of the general techniques may be found in articles by Potrykus (*Annu Rev Plant Physiol Plant Mol Biol* [1991] 42:205-225) and Christon (AgroFood-Industry Hi-Tech March/April 1994 17-27), which are incorporated herein by reference.

Typically, in *Agrobacterium*-mediated transformation a binary vector carrying a foreign DNA of interest, i.e. a construct according to the present invention, is transferred from an appropriate *Agrobacterium* strain to a target plant by the co-cultivation of the *Agrobacterium* with explants from the target plant. Transformed plant tissue is then regenerated on selection media, which selection media comprises a selectable marker and plant growth hormones. An alternative is the floral dip method (Clough & Bent, 1998 Plant J. 1998 December; 16(6):735-43, which is incorporated herein by reference) whereby floral buds of an intact plant are brought into contact with a suspension of the *Agrobacterium* strain containing the chimeric gene, and following seed set, transformed individuals are germinated and identified by growth on selective media. Direct infection of plant tissues by *Agrobacterium* is a simple technique which has been widely employed and which is described in Butcher D. N. et al., (1980), *Tissue Culture Methods for Plant Pathologists*, eds.: D. S. Ingrams and J. P. Helgeson, 203-208 which is incorporated herein by reference.

Further suitable transformation methods include direct gene transfer into protoplasts using polyethylene glycol or electroporation techniques, particle bombardment, microinjection and the use of silicon carbide fibres for example. Transforming plants using ballistic transformation, including the silicon carbide whisker technique are taught in Frame B R, Drayton P R, Bagnaall S V, Lewnau C J, Bullock W P, Wilson H M, Dunwell J M, Thompson J A & Wang K (1994) which is incorporated herein by reference. Production of fertile transgenic maize plants by silicon carbide whisker-mediated transformation is taught in *The Plant Journal* 6: 941-948, which is incorporated herein by reference) and viral transformation techniques is taught in for example Meyer P, Heidmann I & Niedenhof I (1992), which is incorporated herein by reference. The use of cassava mosaic virus as a vector system for plants is taught in Gene 110: 213-217, which is incorporated herein by reference. Further teachings on plant transformation may be found in EP-A-0449375, incorporated herein by reference.

In a further aspect, the present invention relates to a vector system which carries a construct and introducing it into the genome of an organism, such as a plant, suitably a tobacco plant. The vector system may comprise one vector, but it may comprise two vectors. In the case of two vectors, the vector system is normally referred to as a binary vector system. Binary vector systems are described in further detail in Gynheung Anetal, (1980), Binary Vectors, *Plant Molecular Biology Manual A*3, 1-19, which is incorporated herein by reference.

One extensively employed system for transformation of plant cells uses the Ti plasmid from *Agrobacterium tumefaciens* or a Ri plasmid from *Agrobacterium rhizogenes* described by An et al., (1986), *Plant Physiol.* 81, 301-305 and Butcher D. N. et al., (1980), *Tissue Culture Methods for Plant Pathologists*, eds.: D. S. Ingrams and J. P. Helgeson, 203-208 which are incorporated herein by reference. After each introduction method of the desired exogenous gene according to the present invention in the plants, the presence and/or insertion of further DNA sequences may be necessary. The use of T-DNA for the transformation of plant cells has been intensively studied and is described in EP-A-120516; Hoekema, in: The Binary Plant Vector System Offset-drukkerij Kanters B. B., Amsterdam, 1985, Chapter V; Fraley, et al., *Crit. Rev. Plant Sci.*, 4:1-46; and Anetal., *EMBO J* (1985) 4:277-284, incorporated herein by reference.

Plant cells transformed with construct(s) which modulate the activity or expression of a protein kinase gene may be grown and maintained in accordance with well-known tissue culturing methods such as by culturing the cells in a suitable culture medium supplied with the necessary growth factors such as amino acids, plant hormones, vitamins, etc.

The term "transgenic plant" in relation to the present invention includes any plant that comprises a construct which modulates the activity or expression of a protein kinase gene according to the invention. Accordingly a transgenic plant is a plant which has been transformed with a construct according to the invention. Preferably the transgenic plant exhibits modulated protein kinase activity or expression and modulated alkaloid content and/or modulated TSNA content (or precursor thereof) according to the present invention. The term "transgenic plant" does not cover native nucleotide coding sequences in their natural environment when they are under the control of their native promoter which is also in its natural environment.

In one aspect, a protein kinase gene or plant cell according to the present invention is in an isolated form. The term "isolated" means that the protein kinase gene or plant cell is at least substantially free from at least one other component with which it is naturally associated in nature and as found in nature.

In one aspect, a protein kinase gene, a construct, plant transformation vector or plant cell according to the invention is in a purified form. The term "purified" means in a relatively pure state, e.g. at least about 90% pure, or at least about 95% pure or at least about 98% pure.

The term "nucleotide sequence" as used herein refers to an oligonucleotide sequence or polynucleotide sequence, and variant, homologues, fragments and derivatives thereof (such as portions thereof). The nucleotide sequence may be of genomic or synthetic or recombinant origin, which may be double-stranded or single-stranded whether representing the sense or anti-sense strand.

The term "nucleotide sequence" in relation to the present invention includes genomic DNA, cDNA, synthetic DNA, and RNA. Preferably it means DNA, more preferably cDNA sequence coding for the present invention.

In a preferred embodiment, the nucleotide sequence when relating to and when encompassed by the per se scope of the present invention, i.e. the protein kinase gene, includes the native nucleotide sequence when in its natural environment and when it is linked to its naturally associated sequence(s) that is/are also in its/their natural environment. For ease of reference, we shall call this preferred embodiment the "native nucleotide sequence". In this regard, the term "native nucleotide sequence" means an entire nucleotide sequence that is in its native environment and when operatively linked to an entire promoter with which it is naturally associated, which promoter is also in its native environment.

The nucleotide sequence for use in the present invention may be present in a vector in which the nucleotide sequence is operably linked to regulatory sequences capable of providing for the expression of the nucleotide sequence by a suitable host organism. The constructs for use in the present invention may be transformed into a suitable host cell as described herein to provide for expression of a polypeptide of the present invention. The choice of vector e.g. a plasmid, cosmid, or phage vector will often depend on the host cell into which it is to be introduced. Vectors may be used in vitro, for example for the production of RNA or used to transfect, transform, transduce or infect a host cell.

In some applications, the nucleotide sequence for use in the present invention is operably linked to a regulatory sequence which is capable of providing for the expression of the nucleotide sequence, such as by the chosen host cell. By way of example, the present invention covers a vector comprising the nucleotide sequence of a protein kinase gene as described herein operably linked to such a regulatory sequence, i.e. the vector is an expression vector.

The term "operably linked" refers to a juxtaposition wherein the components described are in a relationship permitting them to function in their intended manner. A regulatory sequence "operably linked" to a coding sequence is ligated in such a way that expression of the coding sequence is achieved under conditions compatible with the control sequences.

The term "regulatory sequences" includes promoters and enhancers and other expression regulation signals. The term "promoter" is used in the normal sense of the art, e.g. an RNA polymerase binding site. The nucleotide sequence within a construct which encodes a protein kinase gene may be operably linked to at least a promoter.

The term "construct"—which is synonymous with terms such as "cassette" or "vector"—includes a nucleotide sequence for use according to the present invention directly or indirectly attached to a promoter. Suitably, the construct may be introduced to a cell.

An example of an indirect attachment is the provision of a suitable spacer group such as an intron sequence, such as the Sh1-intron or the ADH intron, intermediate the promoter and the nucleotide sequence of the present invention. The same is true for the term "fused" in relation to the present invention which includes direct or indirect attachment. In some cases, the terms do not cover the natural combination of the nucleotide sequence coding for the protein ordinarily associated with the wild type gene promoter and when they are both in their natural environment. The construct may even contain or express a marker, which allows for the selection of the genetic construct.

In some embodiments, a promoter may be operably linked to nucleotide sequence in a construct or vector which is used to modulate the concentration and/or total content of nicotine in a cell or cell culture or tobacco plant or part thereof.

In some embodiments the promoter may be selected from the group consisting of: a constitutive promoter, a tissue-specific promoter, a developmentally-regulated promoter and an inducible promoter.

In one embodiment the promoter may be a constitutive promoter.

A constitutive promoter directs the expression of a gene throughout the various parts of a plant continuously during plant development, although the gene may not be expressed at the same level in all cell types. Examples of known constitutive promoters include those associated with the cauliflower mosaic virus 35S transcript (Odell J T, Nagy F, Chua N H. (1985). Identification of DNA sequences required for activity of the cauliflower mosaic virus 35S promoter. Nature. 313 810-2), the rice actin 1 gene (Zhang W, McElroy D, Wu R. (1991). Analysis of rice Act1 5' region activity in transgenic rice plants. Plant Cell 3 1155-65) and the maize ubiquitin 1 gene (Cornejo M J, Luth D, Blankenship K M, Anderson O D, Blechl A E. (1993). Activity of a maize ubiquitin promoter in transgenic rice. Plant Molec. Biol. 23 567-81). Constitutive promoters such as the Carnation Etched Ring Virus (CERV) promoter (Hull R, Sadler J, LongstaffM (1986) (CaMV/35S), figwort mosaic virus 35S promoter. The sequence of carnation etched ring virus DNA: comparison with cauliflower mosaic virus and retroviruses. EMBO Journal, 5(2):3083-3090).

The constitutive promoter may be selected from a: a carnation etched ring virus (CERV) promoter, a cauliflower mosaic virus (CaMV 35S promoter), a promoter from the rice actin 1 gene or the maize ubiquitin 1 gene.

The promoter may be a tissue specific promoter. A tissue-specific promoter is one which directs the expression of a gene in one (or a few) parts of a plant, usually throughout the lifetime of those plant parts. The category of tissue-specific promoter commonly also includes promoters whose specificity is not absolute, i.e. they may also direct expression at a lower level in tissues other than the preferred tissue. Tissue specific promoters include the phaseolin-promoter, legumin b4-promoter, usp-promoter, sbp-promoter, ST-LS1 promoter, B33 (patatin class I promoter).

In another embodiment the promoter may be a developmentally-regulated promoter.

A developmentally-regulated promoter directs a change in the expression of a gene in one or more parts of a plant at a specific time during plant development. The gene may be expressed in that plant part at other times at a different (usually lower) level, and may also be expressed in other plant parts.

In one embodiment the promoter may be an inducible promoter.

An inducible promoter is capable of directing the expression of a gene in response to an inducer. In the absence of the inducer the gene will not be expressed. The inducer may act directly upon the promoter sequence, or may act by counteracting the effect of a repressor molecule. The inducer may be a chemical agent such as a metabolite, a protein, a growth regulator (such as auxin and salicylic acid which activate the OCS promoter), or a toxic element, a physiological stress such as heat, light (such as the soybean SSU promoter), wounding (e.g. the nos, nopaline synthase promoter), or osmotic pressure, or an indirect consequence of the action of a pathogen or pest. A developmentally-regulated promoter might be described as a specific type of inducible promoter responding to an endogenous inducer produced by the plant or to an environmental stimulus at a particular point in the life cycle of the plant. Examples of known inducible promoters include those associated with wound response, such as described by Warner S A, Scott R, Draper J. ((1993) Plant J. 3 191-201), temperature response as disclosed by Benfey & Chua (1989) (Benfey, P. N., and Chua, N-H. ((1989) Science 244 174-181), and chemically induced, as described by Gatz ((1995) Methods in Cell Biol. 50 411-424). A nucleotide sequence encoding either a protein which has the specific properties as a protein kinase gene as defined herein or a protein which is suitable for modification may be identified and/or isolated and/or purified from any cell or organism producing said protein. Various methods are well known within the art for the identification and/or isolation and/or purification of nucleotide sequences. By way of example, PCR amplification techniques to prepare more of a sequence may be used once a suitable sequence has been identified and/or isolated and/or purified.

In a yet further alternative, the nucleotide sequence encoding the protein kinase may be prepared synthetically by established standard methods, e.g. the phosphoroamidite method described by Beucage S. L. et al., (1981) *Tetrahedron Letters* 22, p 1859-1869 which is incorporated herein by reference, or the method described by Matthes et al., (1984) *EMBO J.* 3, p 801-805 which is incorporated herein by reference. In the phosphoroamidite method, oligonucleotides are synthesised, e.g. in an automatic DNA synthesiser, purified, annealed, ligated and cloned in appropriate vectors.

As used herein, the term "amino acid sequence" is synonymous with the term "polypeptide" and/or the term "protein".

The present invention also encompasses the use of sequences having a degree of sequence identity or sequence homology with amino acid sequence(s) of a polypeptide having the specific properties defined herein or of any nucleotide sequence i.e. protein kinase gene encoding such a polypeptide (hereinafter referred to as a "homologous sequence(s)"). Here, the term "homologue" means an entity having a certain homology with the subject amino acid sequences and the subject nucleotide sequences. Here, the term "homology" can be equated with "identity".

The homologous amino acid sequence and/or nucleotide sequence and/or fragments should provide and/or encode a polypeptide which retains the functional activity and/or enhances the activity of the protein kinase gene. Typically, the homologous sequences will comprise the same active sites etc. as the subject amino acid sequence for instance or will encode the same active sites. Although homology can also be considered in terms of similarity (i.e. amino acid residues having similar chemical properties/functions), in the context of the present invention it is preferred to express homology in terms of sequence identity. Homologous sequences typically retain functional domains or motifs. Suitably, homologues of protein kinases may contain protein kinase domains and an active site comprising a conserved lysine residue e.g. K308 wherein the amino acid numbering is relative to SEQ ID NO. 3.

In one embodiment, a homologous sequence is taken to include an amino acid sequence or nucleotide sequence which has one, two or several additions, deletions and/or substitutions compared with the subject sequence.

Sequence Identity

Sequence identity comparisons can be conducted by eye, or more usually, with the aid of readily available sequence comparison programs. These commercially available computer programs can calculate % homology between two or more sequences. % homology or % identity may be calculated over contiguous sequences, i.e. one sequence is aligned with the other sequence and each amino acid in one sequence is directly compared with the corresponding amino acid in the other sequence, one residue at a time. This is called an "ungapped" alignment. Typically, such ungapped alignments are performed only over a relatively short number of residues.

Although this is a very simple and consistent method, it fails to take into consideration that, for example, in an otherwise identical pair of sequences, one insertion or deletion will cause the following amino acid residues to be put out of alignment, thus potentially resulting in a large reduction in % homology when a global alignment is performed. Consequently, most sequence comparison methods are designed to produce optimal alignments that take into consideration possible insertions and deletions without penalising unduly the overall homology score. This is achieved by inserting "gaps" in the sequence alignment to try to maximise local homology. However, these more complex methods assign "gap penalties" to each gap that occurs in the alignment so that, for the same number of identical amino acids, a sequence alignment with as few gaps as possible—reflecting higher relatedness between the two compared sequences—will achieve a higher score than one with many gaps. "Affine gap costs" are typically used that charge a relatively high cost for the existence of a gap and a smaller penalty for each subsequent residue in the gap. This is the most commonly used gap scoring system. High gap penalties will of course produce optimised alignments with fewer gaps. Most alignment programs allow the gap penalties to be modified. However, it is preferred to use the default values when using such software for sequence comparisons.

Calculation of maximum % homology therefore firstly requires the production of an optimal alignment, taking into consideration gap penalties. A suitable computer program for carrying out such an alignment is the Vector NTI (Invitrogen Corp.). Examples of software that can perform sequence comparisons include, but are not limited to, the BLAST package (see Ausubel et al. 1999 Short Protocols in Molecular Biology, 4th Ed—Chapter 18), BLAST 2 (see FEMS Microbiol Lett 1999 174(2): 247-50; FEMS Microbiol Lett 1999 177(1): 187-8 and tatiana@mcbi.nlm.nih.gov), FASTA (Altschul et al. 1990 J. Mol. Biol. 403-410) and AlignX for example. At least BLAST, BLAST 2 and FASTA are available for offline and online searching (see Ausubel et al. 1999, pages 7-58 to 7-60).

Although the final % homology can be measured in terms of identity, the alignment process itself is typically not based on an all-or-nothing pair comparison. Instead, a scaled similarity score matrix is generally used that assigns scores to each pairwise comparison based on chemical similarity or evolutionary distance. An example of such a matrix commonly used is the BLOSUM62 matrix—the default matrix for the BLAST suite of programs. Vector NTI programs generally use either the public default values or a custom symbol comparison table if supplied (see user manual for further details). For some applications, it is preferred to use the default values for the Vector NTI package.

Alternatively, percentage homologies may be calculated using the multiple alignment feature in Vector NTI (Invitrogen Corp.), based on an algorithm, analogous to CLUSTAL (Higgins D G & Sharp P M (1988), Gene 73(1), 237-244). Once the software has produced an optimal alignment, it is possible to calculate % homology, preferably % sequence identity. The software typically does this as part of the sequence comparison and generates a numerical result.

Should gap penalties be used when determining sequence identity, then preferably the following parameters are used for pairwise alignment:

| FOR BLAST | |
|---|---|
| GAP OPEN | 0 |
| GAP EXTENSION | 0 |

| FOR CLUSTAL | DNA | PROTEIN | |
|---|---|---|---|
| WORD SIZE | 2 | 1 | K triple |
| GAP PENALTY | 15 | 10 | |
| GAP EXTENSION | 6.66 | 0.1 | |

In one embodiment, CLUSTAL may be used with the gap penalty and gap extension set as defined above. In some embodiments the gap penalties used for BLAST or CLUSTAL alignment may be different to those detailed above. The skilled person will appreciate that the standard parameters for performing BLAST and CLUSTAL alignments may change periodically and will be able to select appropriate parameters based on the standard parameters detailed for BLAST or CLUSTAL alignment algorithms at the time.

Suitably, the degree of identity with regard to a nucleotide sequence is determined over at least 50 contiguous nucleotides, preferably over at least 60 contiguous nucleotides, preferably over at least 70 contiguous nucleotides, preferably over at least 80 contiguous nucleotides, preferably over at least 90 contiguous nucleotides, preferably over at least 100 contiguous nucleotides, preferably over at least 150 contiguous nucleotides, preferably over at least 200 contiguous nucleotides, preferably over at least 250 contiguous nucleotides, preferably over at least 300 contiguous nucleotides, preferably over at least 350 contiguous nucleotides, preferably over at least 400 contiguous nucleotides, preferably over at least 450 contiguous nucleotides, preferably over at least 500 contiguous nucleotides, preferably over at least 550 contiguous nucleotides, preferably over at least 600 contiguous nucleotides, preferably over at least 650 contiguous nucleotides, or preferably over at least 700 contiguous nucleotides.

Suitably, the degree of identity with regard to a nucleotide, cDNA, cds or amino acid sequence may be determined over the whole sequence.

The sequences may also have deletions, insertions or substitutions of amino acid residues which produce a silent change and result in a functionally equivalent substance. Deliberate amino acid substitutions may be made on the basis of similarity in polarity, charge, solubility, hydrophobicity, hydrophilicity, and/or the amphipathic nature of the residues as long as the secondary binding activity of the substance is retained. For example, negatively charged amino acids include aspartic acid and glutamic acid; positively charged amino acids include lysine and arginine; and amino acids with uncharged polar head groups having similar hydrophilicity values include leucine, isoleucine, valine, glycine, alanine, asparagine, glutamine, serine, threonine, phenylalanine, and tyrosine.

Conservative substitutions may be made, for example according to the Table below. Amino acids in the same block in the second column and preferably in the same line in the third column may be substituted for each other:

| ALIPHATIC | Non-polar | G A P |
| | | I L V |
| | Polar - uncharged | C S T M |
| | | N Q |
| | Polar - charged | D E |
| | | K R |
| AROMATIC | | H F W Y |

The present invention also encompasses homologous substitution (substitution and replacement are both used herein to mean the interchange of an existing amino acid residue, with an alternative residue) that may occur i.e. like-for-like substitution such as basic for basic, acidic for acidic, polar for polar etc. Non-homologous substitution may also occur i.e. from one class of residue to another or alternatively involving the inclusion of unnatural amino acids such as ornithine (hereinafter referred to as Z), diaminobutyric acid ornithine (hereinafter referred to as B), norleucine ornithine (hereinafter referred to as O), pyriylalanine, thienylalanine, naphthylalanine and phenylglycine.

Replacements may also be made by unnatural amino acids include; alpha* and alpha-disubstituted* amino acids, N-alkyl amino acids*, lactic acid*, halide derivatives of natural amino acids such as trifluorotyrosine*, p-Cl-phenylalanine*, p-Br-phenylalanine*, p-I-phenylalanine*, L-allyl-glycine*, ß-alanine*, L-α-amino butyric acid*, L-γ-amino butyric acid*, L-α-amino isobutyric acid*, L-ε-amino caproic acid#, 7-amino heptanoic acid*, L-methionine sulfone#*, L-norleucine*, L-norvaline*, p-nitro-L-phenylalanine*, L-hydroxyproline#, L-thioproline*, methyl derivatives of phenylalanine (Phe) such as 4-methyl-Phe*, pentamethyl-Phe*, L-Phe (4-amino)#, L-Tyr (methyl)*, L-Phe (4-isopropyl)*, L-Tic (1,2,3,4-tetrahydroisoquinoline-3-carboxyl acid)*, L-diaminopropionic acid#and L-Phe (4-benzyl)*. The notation * has been utilised for the purpose of the discussion above (relating to homologous or non-homologous substitution), to indicate the hydrophobic nature of the derivative whereas #has been utilised to indicate the hydrophilic nature of the derivative, #* indicates amphipathic characteristics.

Variant amino acid sequences may include suitable spacer groups that may be inserted between any two amino acid residues of the sequence including alkyl groups such as methyl, ethyl or propyl groups in addition to amino acid spacers such as glycine or β-alanine residues.

A further form of variation, involves the presence of one or more amino acid residues in peptoid form, which will be well understood by those skilled in the art. For the avoidance of doubt, "the peptoid form" is used to refer to variant amino acid residues wherein the α-carbon substituent group is on the residue's nitrogen atom rather than the α-carbon. Processes for preparing peptides in the peptoid form are known in the art, for example Simon R J et al., PNAS (1992) 89(20), 9367-9371 and Horwell D C, Trends Biotechnol. (1995) 13(4), 132-134.

The nucleotide sequences for use in the present invention may include within them synthetic or modified nucleotides. A number of different types of modification to oligonucleotides are known in the art. These include methylphosphonate and phosphorothioate backbones and/or the addition of acridine or polylysine chains at the 3' and/or 5' ends of the molecule. For the purposes of the present invention, it is to be understood that the nucleotide sequences described herein may be modified by any method available in the art. Such modifications may be carried out in order to enhance the in vivo activity or life span of nucleotide sequences of the present invention.

The present invention also encompasses sequences that are complementary to the nucleic acid sequences of the present invention or sequences that are capable of hybridising either to the sequences of the present invention or to sequences that are complementary thereto. The term "hybridisation" as used herein shall include "the process by which a strand of nucleic acid joins with a complementary strand through base pairing" as well as the process of amplification as carried out in polymerase chain reaction (PCR) technologies.

The present invention also relates to nucleotide sequences that can hybridise to the nucleotide sequences of the present invention (including complementary sequences of those presented herein). Preferably, hybridisation is determined under stringency conditions (e.g. 50° C. and 0.2×SSC {1×SSC=0.15 M NaCl, 0.015 M Na$_3$citrate pH 7.0}). More preferably, hybridisation is determined under high stringency conditions (e.g. 65° C. and 0.1×SSC {1×SSC=0.15 M NaCl, 0.015 M Na$_3$citrate pH 7.0}).

A review of the general techniques used for transforming plants may be found in articles by Potrykus (Annu Rev Plant Physiol Plant Mol Biol [1991] 42:205-225) and Christou (Agro-Food-Industry Hi-Tech March/April 1994 17-27), which are incorporated herein by reference. Further teachings on plant transformation may be found in EP-A-0449375, incorporated herein by reference.

Unless defined otherwise, all technical and scientific terms used herein have the same meaning as commonly understood by one of ordinary skill in the art to which this disclosure belongs. Singleton, et al., DICTIONARY OF MICROBIOLOGY AND MOLECULAR BIOLOGY, 20 ED., John Wiley and Sons, New York (1994), and Hale & Marham, THE HARPER COLLINS DICTIONARY OF BIOLOGY, Harper Perennial, NY (1991) provide one of skill with a general dictionary of many of the terms used in this disclosure.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range. Unless otherwise indicated, any nucleic acid sequences are written left to right in 5' to 3' orientation; amino acid sequences are written left to right in amino to carboxy orientation, respectively.

The headings provided herein are not limitations of the various aspects or embodiments of this disclosure which can be had by reference to the specification as a whole. Accordingly, the terms defined immediately below are more fully defined by reference to the specification as a whole.

Amino acids are referred to herein using the name of the amino acid, the three letter abbreviation or the single letter abbreviation. The term "protein", as used herein, includes proteins, polypeptides, and peptides. As used herein, the term "amino acid sequence" is synonymous with the term "polypeptide" and/or the term "protein". In some instances, the term "amino acid sequence" is synonymous with the term "peptide". In some instances, the term "amino acid sequence" is synonymous with the term "enzyme".

In the present disclosure and claims, the conventional one-letter and three-letter codes for amino acid residues may be used. The 3-letter code for amino acids as defined in conformity with the IUPACIUB Joint Commission on Biochemical Nomenclature (JCBN). It is also understood that a polypeptide may be coded for by more than one nucleotide sequence due to the degeneracy of the genetic code.

Other definitions of terms may appear throughout the specification. Before the exemplary embodiments are described in more detail, it is to understand that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

It must be noted that as used herein and in the appended claims, the singular forms "a", "an", and "the" include plural referents unless the context clearly dictates otherwise. Thus, for example, reference to "an enzyme" or "a nitrate reductase" includes a plurality of such candidate agents and equivalents thereof known to those skilled in the art, and so forth.

Advantages

It has been surprisingly found that by modulating the activity or expression of a protein kinase gene as taught herein which acts as a negative regulator of nicotine in tobacco, the alkaloid content (e.g. nicotine content) and/or TSNA content of plants can be modulated (e.g. decreased). Thereby tobacco products with modulated (e.g. decreased) alkaloid (e.g. nicotine) and/or TSNA content and commercially desirable traits sought after by consumers of tobacco products can be produced.

The present inventors have surprisingly determined a method for modulating the alkaloid content (e.g. nicotine content), and/or TSNA content of a plant (e.g. tobacco plant) by modulating the activity or expression of a protein kinase gene. Alkaloid (e.g. nicotine content) or TSNA content of a plant (e.g. tobacco plant) may be decreased by increasing the activity or expression of a protein kinase gene. Alkaloid (e.g. nicotine content) or TSNA content of a plant (e.g. tobacco plant) may be increased by inhibiting the activity or expression of a protein kinase gene. Prior to the present invention it had not been known that modulation of the activity or expression of a protein kinase gene as described herein could be used to modulate alkaloid (e.g. nicotine) and/or TSNA content of a plant (e.g. a tobacco plant).

The present inventors have determined that the overexpression of a protein kinase gene can reduce the alkaloid content (e.g. nicotine content) of the modified plant to a surprisingly low level.

The publications discussed herein are provided solely for their disclosure prior to the filing date of the present application. Nothing herein is to be construed as an admission that such publications constitute prior art to the claims appended hereto.

EXAMPLES

Example 1—Transient Overexpression of a Protein Kinase Reduces Alkaloid Content in Leaves Methods and Materials
Cloning
Protein Kinase Expression Vector The gene sequence (SEQ ID No. 1) was amplified from a Gateway™ compatible cDNA library using primers located outside restriction sites flanking the gene sequence. The gene sequence was then transferred to an expression vector.

The resulting plasmid was sequenced and transformed into *Agrobacterium tumefaciens* GV3101pMP90 by heat shock and transiently expressed in TN90 leaves.

Transient Gene Expression

*Agrobacterium tumefaciens* GV3101 strains carrying the construct of interest were grown overnight in Luria-Bertani (LB) medium supplemented with appropriate antibiotics. Cultures are spun down and re-suspended in buffer containing 10 mM MgCl2, 10 mM 2-(N-morpholino)ethanesulfonic acid (MES) pH 5.6 and 100 µM acetosyringone to OD600=0.6 and incubated for one hour at room temperature. Infiltration is performed with a needleless syringe into TN90 leaves. Samples are taken 5 days post-infiltration.

Tests were performed in three biological replicates.

Alkaloid Measurement

Relative content of pyridine alkaloids was determined by reversed phase high performance liquid chromatography with tandem mass spectrometry (LC-MS/MS). Chromatographic separation is achieved using a Gemini-NX column (100 mm×3.0 mm, particle size 3 µm, Phenomenex) and gradient chromatographic separation using 6.5 mM ammonium acetate buffer (aq) (pH10) and Methanol.

Mass Spectrometer operates in electrospray (ESI) positive mode using scheduled MRM data acquisition. Two MRM transitions are monitored for each analyte and one for the isotope labelled internal standard.

| Analyte | Precursor Ion | Daughter Ion (quant/confirm) |
| --- | --- | --- |
| Nicotine | 163.1 | 130/106 |
| Nicotine d4 | 167.1 | 134.1 |
| Anabasine | 163.1 | 80/120 |
| Anatabine | 161.1 | 144/80 |
| Nornicotine | 149.1 | 80/130 |
| Nornicotine d4 | 153.1 | 84.1 |
| PON | 176.1 | 106.0/148 |
| PON d4 | 183.1 | 110.0 |

Statistical Analysis

Statistical significances based on one-way ANOVA analyses is performed with Prism 5.01 software (GraphPad Software).

Results

% Nicotine content of 5-week-old TN90 leaves expressing Nitab4.5_0003679 g0060.2 is shown in FIG. 1. Content is represented relative to control and comprises three biological replicates analysed by t-test. Values are shown as means±SEM. Asterisks indicate statistical significance of P value≤0.001. Nicotine content of 5-week-old TN90 leaves expressing Nitab4.5_0003679 g0060.2 is significantly decreased relative to controls.

The anabasine and anatabine content of 5-week-old TN90 leaves expressing Nitab4.5_0003679 g0060.2 are also decreased relative to controls.

Conclusions

Nitab4.5_0003679 g0060.2 is a negative regulator of alkaloid content, in particular nicotine content in leaves.

Example 2—Virus-Induced Gene Silencing (VIGS) of a Protein Kinase Increases Alkaloid Content in Leaves Virus-Induced Gene Silencing (VIGS)

For virus induced gene silencing, a 248-nucleotide cDNA fragment was synthesized and cloned with In-Fusion cloning kit into pTV00 (between EcoRI and XhoI sites) using the following primers

```
Nitab4.5_0003679g0060.2_InFusion
                                  (SEQ ID No. 5)
5' TGAGTAAGGTTACCGAATTC;
and Nitab4.5_0003679g0060.2_InFusion
                                  (SEQ ID No. 6)
3' CTCGAGGCCCGGGCATGTCC
to form
TRV2-Nitab4.5_0003679g0060.2.
```

The plasmid was then transformed into *A. tumefaciens* GV3101.

248-nucleotide cDNA fragment SEQ ID No. 4.

The TRV vector comprising both (TRV RNA1) and (TRV RNA2) comprising the targeted nucleotide sequence were separately propagated in *A. tumefaciens*. These cultures were mixed (1:1) and syringe-infiltration into 2-week-old TN90 plants. The silencing effect was assessed five weeks post-virus infection by assessing the expression level of the target gene.

VIGS assays were performed as previously described (Ratcliff et al., 2001; The Plant Journal, 25: 237-245 (incorporated herein by reference)). Briefly, independent cultures of *A. tumefaciens* GV3101 carrying TRV2 and TRV1 plasmids were propagated overnight in LB medium supplemented with appropriate antibiotics. Cultures were resuspended in VIGS buffer (10 mM morpholineethanesulfonic acid pH 5.6, 10 mM $MgCL_2$, and 100 μM acetocyringone) adjusting optical density to $OD_{600}$=1, and incubated overnight at room temperature in the dark. These cultures were mixed (1:1) and syringe-infiltrated into 2-week-old TN90 plants. The silencing effect was assessed two weeks post-virus infection by assessing the expression level of the target gene. TRV-Luciferase was used as a negative control and TRV-PDS (reduced chlorophyll content of the silenced leaves) was used as a phenotypic silencing control.

Results

Figure 2:
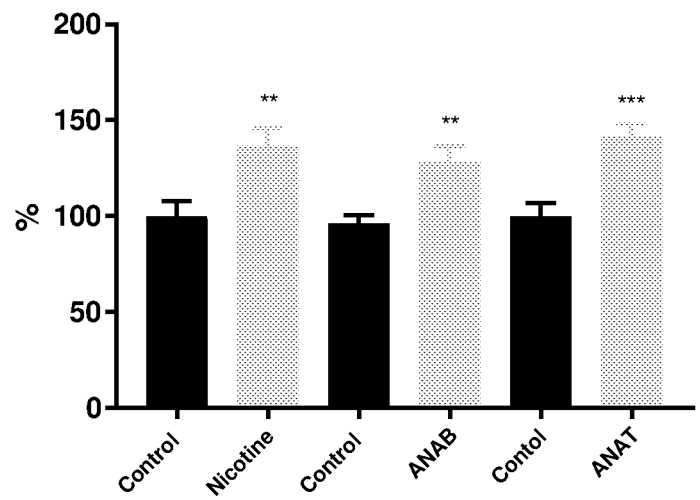
FIG. 2 shows the nicotine content of 5-week-old TN90 leaves expressing a construct which silences Nitab4.5_0003679 g0060.2 (SEQ ID No. 1) by virus-induced gene silencing. Nicotine content is represented relative to control and comprises three biological replicates analysed by t-test. Values are shown as means±SEM. Asterisks indicate statistical significance of P value≤0.001

% Nicotine content of 5-week-old TN90 leaves expressing the indicated constructs is shown in FIG. 2. Content is represented relative to control and comprises three biological replicates analysed by t-test. Values are shown as means±SEM. Asterisks indicate statistical significance of P value≤0.001.

Example 3—Protein Kinase Activity

Wild type protein kinase (with the amino acid sequence set forth in SEQ ID No. 3) and a kinase inactive form having a mutation at amino acid residue 308 of SEQ ID NO. 3 (K308M variant) were transformed into Rosetta 2(DE3) cells and plated onto LB plates supplemented with appropriate antibiotics.

Cultures made from single colonies were grown until OD600=0.3-0.4. Cultures were then moved to the relative induction temperature (37° C.). When the cultures had reached an OD600 of 0.6-0.8, they were induced with 0.5 mM IPTG for 3 hrs. Cells were harvested by centrifugation at 4000 rpm for 20 minutes at 4° C. The pellet was resuspended by pipetting in 2 ml of Lysis Buffer (25 mM HEPES pH7.5, 0.2 M NaCl, 1 mM DTT, 1 mM EDTA, 0.2 mM PMSF, 1 mg/ml lysozyme, 0.01 U/μl Benzonase, Protease Inhibitors) then freeze-thawed at −80° C. centrifuged at 20 k×g for 30 minutes. The supernatant was then diluted ½ in Equilibration buffer (25 mM HEPES pH7.5, 0.2 M NaCl, 1 mM DTT, 1 mM EDTA) and applied to 0.5 ml of Amylose Resin (NEB) that had been pre-equilibrated with 10 CVs of Equilibration Buffer using a gravity flow column. The flow-through fractions were collected and the four columns were then washed with 5 ml (10 CVs) of Wash 1 followed by 5 ml (10 CVs) of Wash 2 (25 mM HEPES pH7.5, 0.2 M NaCl, 1 mM DTT). Finally, the bound proteins were eluted with 4 CVs (2×1 ml) of Elution Buffer (25 mM HEPES pH7.5, 0.2 M NaCl, 1 mM DTT, 10 mM Maltose). The elution fractions were then adjusted to >0.5 mg/ml (measured at A280) and samples used fresh for kinase assays or snap frozen in the presence of 10% glycerol and stored at −80° C.

For the kinase reactions, 40 μl reactions were prepared with the following constituents:

| Component | Volume |
| --- | --- |
| 10X Kinase Rxn Buffer 2* | 6 or 4 μl |
| Myelin Basic Protein (1 mg/ml) | 10 μl = 10 μg/rxn |
| −80 stored Purified Test Kinase (0.43 mg/ml) | 0 or 20 μl = 0 or 8.6 μg/rxn |
| RO water | 30, 26, 20, 16, 10 or 6 μl |

Reactions were incubated at 25° C. for 30 minutes. SDS-PAGE samples were prepared: 40 μl reaction was mixed with 10 μl of 4× Loading dye and denatured at 95° C. for 10 minutes followed by centrifugation at 20 k×g for 2 minutes. 15 μl was loaded per gel=3 μg approx. of myelin basic protein and 2.6 μg approx. of purified test kinase.

Pro-Q (and Instant Blue) Staining:

Samples were loaded onto 12-well Bio-RAD 4-20% Mini-PROTEAN TGX SDS-PAGE Precast Gels which were run at 100 V for 80 minutes. Gels were stained with Pro-Q diamond Phospho protein stain as per the manufacturers instructions and imaged using a Syngene G:BOX imager at the correct Abs and Ems wavelengths.

Finally, gels were stained overnight with Instant Blue Coomassie stain and imaged using a Syngene G:BOX imager.

Results

Figure 8:
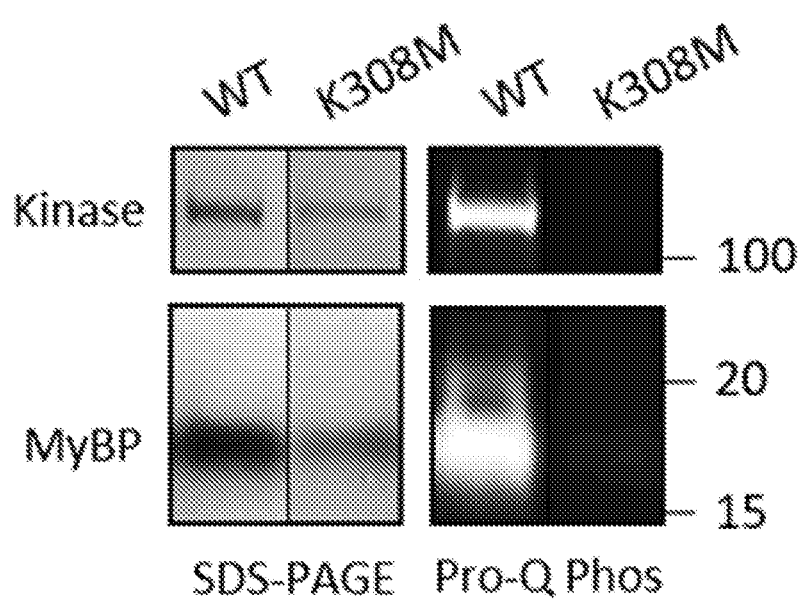
FIG. 8 shows an image of an SDS-PAGE showing the expression of wild-type Nitab4.5_0003679 g0060.2 (SEQ ID No. 3) and the K308M mutant in E. coli. Pro-Q Diamond phosphoprotein gel stain shows the ability of Nitab4.5_0003679 g0060.2 (SEQ ID No. 3) and the K308M mutant to autophosphorylate and phosphorylate myelin basic protein (MyBP). Vertical bars indicate a separation of lanes within the same blot.

SDS-PAGE in FIG. 8 shows the expression of wild type Nitab4.5_0003679 g0060.2 (having the sequence SEQ ID No. 3) and the K308M mutant in *E. coli*. Pro-Q Diamond phosphoprotein gel stain shows the ability of wild type Nitab4.5_0003679 g0060.2 and the K308M mutant to autophosphorylate and phosphorylate myelin basic protein (MyBP). Vertical bars indicate a separation of lanes within the same blot.

FIG. 8 shows that K308 (i.e. the wild type SEQ ID No. 3) is an active protein kinase and that the variant K308M is not an active kinase. K308 is required for protein kinase activity.

Figure 7:
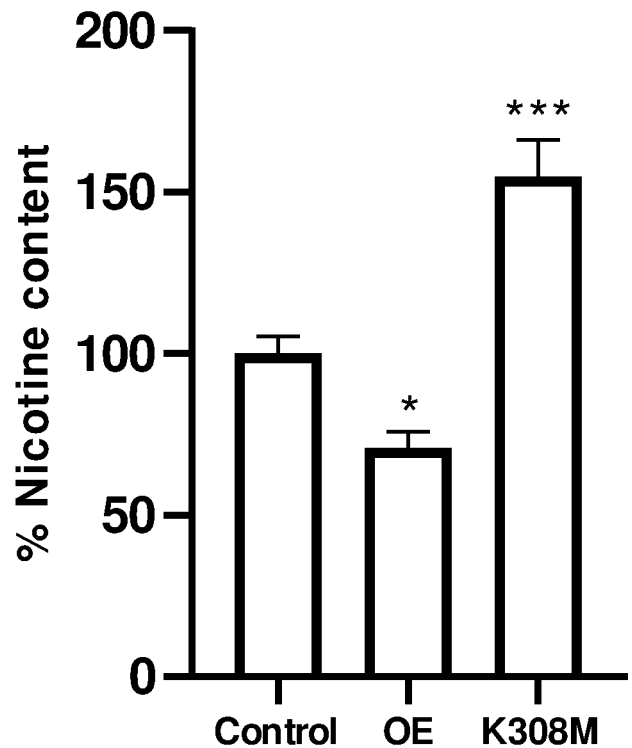
FIG. 7 shows the alkaloid content of 5-week-old TN90 leaves expressing the indicated constructs: OE refers to over expression of the wild type protein kinase (having the amino acid sequence set forth in SEQ ID No. 3), and K308M refers to the variant sequence of SEQ ID No. 3 having the K308M mutation. Content is represented relative to control and comprises three biological replicates analysed by one-way ANOVA and Tukey's multiple-comparison post-test. Values are shown as means±SEM. Asterisks indicate statistical significance of P value≤0.001.

FIG. 7 shows the % alkaloid content of 5-week-old TN90 leaves expressing the indicated constructs: OE refers to over expression of the wild type protein kinase (having the amino acid sequence set forth in SEQ ID No. 3), K308M refers to the variant sequence of SEQ ID No. 3 having the K308M mutation.

The nicotine content is represented relative to control and comprises three biological replicates analysed by one-way ANOVA and Tukey's multiple-comparison post-test. Values are shown as means±SEM. Asterisks indicate statistical significance of P value≤0.001.

FIG. 7 shows that the expression of the K308M mutant (which is an inactive protein kinase) increases nicotine content. K308 acts as a dominant negative.

The invention claimed is:

1. A method of decreasing the alkaloid content and/or content of a tobacco specific nitrosamine (TSNA) or a precursor of a TSNA of a tobacco plant or a part thereof, the method comprising modifying said plant by increasing the expression of a protein kinase which:
   a) comprises the amino acid sequence as set out in SEQ ID No. 3; or a sequence which has at least 95% identity to SEQ ID No. 3 and which comprises a protein kinase domain comprising amino acid residues 281-535 of SEQ ID No. 3; or
   b) is encoded by the nucleotide sequence as set out in SEQ ID No. 1 or 2; or a nucleic acid sequence which has at least 95% identity to SEQ ID No. 1 or 2 and comprises a sequence encoding a protein kinase domain comprising amino acid residues 281-535 of SEQ ID No. 3,
   wherein the content of one or more alkaloids selected from nicotine, anabasine, and anatabine is decreased,
   wherein the alkaloid content and/or content of a tobacco specific nitrosamine (TSNA) or a precursor of a TSNA is decreased, and the expression of the protein kinase is increased, in comparison to a comparable plant or cell culture which has not been modified to increase the expression of the protein kinase.

2. The method according to claim 1, wherein the alkaloid content is decreased in comparison to a comparable plant or cell culture which has not been modified to increase the expression of the protein kinase.

3. A tobacco plant or part thereof or a plant propagation material obtained therefrom or a tobacco cell or cell culture which has been modified to achieve a decrease in alkaloid content and/or content of a tobacco specific nitrosamine (TSNA) or a precursor of a TSNA in comparison to a comparable unmodified tobacco plant or unmodified tobacco cell culture, wherein the modification is the increase of the expression of a protein kinase in comparison to said comparable unmodified tobacco plant or unmodified tobacco cell culture, wherein said protein kinase:
   a) comprises the amino acid sequence as set out in SEQ ID No. 3; or a sequence which has at least 95% identity to SEQ ID No. 3 and which comprises a protein kinase domain comprising amino acid residues 281-535 of SEQ ID No. 3; or
   b) is encoded by the nucleotide sequence as set out in SEQ ID No. 1 or 2; or a nucleic acid sequence which has at least 95% identity to SEQ ID No. 1 or 2 and comprises a sequence encoding a protein kinase domain comprising amino acid residues 281-535 of SEQ ID No. 3,
   wherein the content of one or more alkaloids selected from nicotine, anabasine, and anatabine is decreased.

4. The tobacco plant or part thereof or plant propagation material obtained therefrom or tobacco cell or cell culture according to claim 3, wherein the alkaloid content of the tobacco plant or cell culture is decreased in comparison to a comparable tobacco plant or cell culture which has not been modified to increase the expression of said protein kinase.

5. The tobacco plant or part thereof or plant propagation material or tobacco cell or tobacco cell culture according to claim 3, wherein the nicotine content is decreased.

6. A harvested tobacco leaf, a cut harvested tobacco leaf, a processed tobacco leaf, a non-viable processed tobacco leaf or a cut-processed tobacco leaf of a tobacco plant according to claim 3, or obtainable from a tobacco plant propagated from a propagation material according to claim 3.

7. The processed tobacco leaf, non-viable processed tobacco leaf or cut-processed tobacco leaf according to claim 6, wherein the leaf is processed by curing, fermenting, pasteurising or a combination thereof.

8. A cured tobacco material, or a tobacco blend comprising said cured tobacco material made from the tobacco plant or a part thereof or tobacco cell or cell culture according to claim 3, or a tobacco industry product comprising said cured tobacco material, said tobacco blend or comprising a tobacco plant, part thereof or tobacco cells or cell culture according to claim 3, or comprising a harvested tobacco leaf, a cut harvested tobacco leaf, a processed tobacco leaf, a non-viable processed tobacco leaf or a cut-processed tobacco leaf of a tobacco plant according to claim 3, or obtainable from a tobacco plant propagated from a propagation material according to claim 3.

9. The tobacco industry product according to claim 8, wherein the tobacco product is:
   a) a combustible smoking article;
   b) a smokeless tobacco product; or
   c) a non-combustible aerosol provision system such as a tobacco heating device or an aerosol-generating device.

10. A method of increasing the alkaloid content and/or content of a tobacco specific nitrosamine (TSNA) or a precursor of a TSNA of a tobacco plant or a part thereof, the method comprising modifying said plant by decreasing the activity or expression of a protein kinase which:
    a) comprises the amino acid sequence as set out in SEQ ID No. 3; or a sequence which has at least 95% identity to SEQ ID No. 3 and which comprises a protein kinase domain comprising amino acid residues 281-535 of SEQ ID No. 3; or
    b) is encoded by the nucleotide sequence as set out in SEQ ID No. 1 or 2; or a nucleic acid sequence which has at least 95% identity to SEQ ID No. 1 or 2 and comprises a sequence encoding a protein kinase domain comprising amino acid residues 281-535 of SEQ ID No. 3,
    wherein the activity of the protein kinase is the ability of said protein kinase to phosphorylate a protein, and
    wherein the content of one or more alkaloids selected from nicotine, anabasine, and anatabine is increased,
    wherein the alkaloid content and/or content of a tobacco specific nitrosamine (TSNA) or a precursor of a TSNA is increased, and the activity or expression of the protein kinase is decreased, in comparison to a comparable plant or cell culture which has not been modified to decrease the activity or expression of the protein kinase.

11. A tobacco plant or part thereof or a plant propagation material obtained therefrom or a tobacco cell or cell culture which has been modified to achieve an increase in alkaloid content and/or content of a tobacco specific nitrosamine (TSNA) or a precursor of a TSNA in comparison to a comparable unmodified tobacco plant or unmodified tobacco cell culture, wherein the modification is the decrease of the activity or expression of a protein kinase in comparison to said comparable unmodified tobacco plant or unmodified tobacco cell culture, wherein said protein kinase:
    a) comprises the amino acid sequence as set out in SEQ ID No. 3; or a sequence which has at least 95% identity to SEQ ID No. 3 and which comprises a protein kinase domain comprising amino acid residues 281-535 of SEQ ID No. 3; or
    b) is encoded by the nucleotide sequence as set out in SEQ ID No. 1 or 2; or a nucleic acid sequence which has at least 95% identity to SEQ ID No. 1 or 2 and comprises a sequence encoding a protein kinase domain comprising amino acid residues 281-535 of SEQ ID No. 3,
    wherein the activity of the protein kinase is the ability of said protein kinase to phosphorylate a protein, and
    wherein the content of one or more alkaloids selected from nicotine, anabasine, and anatabine is increased.

12. The tobacco plant or part thereof or plant propagation material obtained therefrom or a tobacco cell or cell culture according to claim 11, wherein the alkaloid content of the tobacco plant or cell culture is increased in comparison to a comparable tobacco plant which has not been modified to decrease the activity or expression of said protein kinase.

13. The tobacco plant or part thereof or plant propagation material obtained therefrom or tobacco cell or cell culture according to claim 12, wherein the tobacco plant is modified to decrease the activity or expression of said protein kinase and the tobacco plant or cell culture exhibits increased alkaloid content in comparison to a comparable tobacco plant or cell culture which has not been modified to decrease the activity or expression of said protein kinase.

14. The tobacco plant or part thereof or plant propagation material or tobacco cell or tobacco cell culture according to claim 11, wherein the nicotine content is increased.

15. A harvested tobacco leaf, a cut harvested tobacco leaf, a processed tobacco leaf, a non-viable processed tobacco leaf or a cut-processed tobacco leaf of a tobacco plant according to claim 11, or obtainable from a tobacco plant propagated from a propagation material according to claim 11.

16. The processed tobacco leaf, non-viable processed tobacco leaf or cut-processed tobacco leaf according to claim 15, wherein the leaf is processed by curing, fermenting, pasteurising or a combination thereof.

17. A cured tobacco material or a tobacco blend comprising said cured tobacco material made from the tobacco plant or a part thereof or tobacco cell or cell culture according to claim 11, or a tobacco industry product comprising said cured tobacco material, said tobacco blend or comprising a tobacco plant, part thereof or tobacco cells or cell culture according to claim 11, or comprising a harvested tobacco leaf, a cut harvested tobacco leaf, a processed tobacco leaf, a non-viable processed tobacco leaf or a cut-processed tobacco leaf of a tobacco plant according to claim 11, or obtainable from a tobacco plant propagated from a propagation material according to claim 11.

18. The tobacco industry product according to claim 17, wherein the tobacco product is:
  a) a combustible smoking article;
  b) a smokeless tobacco product; or
  c) a non-combustible aerosol provision system such as a tobacco heating device or an aerosol-generating device.

19. A mutant of a tobacco plant carrying a heritable mutation in a nucleotide sequence which:
  a) encodes the amino acid sequence as set out in SEQ ID No. 3; or a sequence which has at least 95% identity to SEQ ID No. 3 and which comprises a protein kinase domain comprising amino acid residues 281-535 of SEQ ID No. 3; or
  b) comprises the sequence as set out in SEQ ID No. 1 or 2; or a nucleic acid sequence which has at least 95% identity to SEQ ID No. 1 or 2 and comprises a sequence encoding a protein kinase domain comprising amino acid residues 281-535 of SEQ ID No. 3;

wherein said heritable mutation decreases the activity or expression of the nucleotide sequence encoding a protein kinase and wherein the mutant plant has increased alkaloid content and/or increased content of a tobacco specific nitrosamine (TSNA) or a precursor of a TSNA relative to a comparable tobacco plant which does not carry said heritable mutation,
  wherein the activity of the protein kinase is the ability of said protein kinase to phosphorylate a protein,
  wherein the content of one or more alkaloids selected from nicotine, anabasine, and anatabine is increased, and
  wherein the mutation is at the position which corresponds to position 308 of SEQ ID No. 3 and is a mutation from lysine to methionine.

20. Progeny or seed of a mutant tobacco plant which carries the heritable mutation according to claim 19.

21. A harvested leaf, a processed leaf or cured tobacco material produced from the tobacco plant according to claim 19, wherein said harvested leaf, processed leaf or cured tobacco material has increased alkaloid content and/or increased content of a tobacco specific nitrosamine (TSNA) or a precursor of a TSNA relative to a harvested leaf, a processed leaf or cured tobacco material from a comparable tobacco plant which does not carry said modification in said protein kinase.

* * * * *